(12) United States Patent
Wiedemann et al.

(10) Patent No.: US 7,894,675 B2
(45) Date of Patent: Feb. 22, 2011

(54) METHOD AND APPARATUS FOR AUTOMATIC LINEAR OBJECT IDENTIFICATION USING IDENTIFIED TERRAIN TYPES IN IMAGES

(75) Inventors: Melissa Wiedemann, Kissimmee, FL (US); Larry Phurrough, Orlando, FL (US); Colleen Flynn Gratsch, Coca, FL (US); Richard Skoblick, Oviedo, FL (US); Harry C. Lee, Maitland, FL (US)

(73) Assignee: Lockheed Martin Corporation, Bethesda, MD (US)

(*) Notice: Subject to any disclaimer, the term of this patent is extended or adjusted under 35 U.S.C. 154(b) by 273 days.

(21) Appl. No.: 12/073,809

(22) Filed: Mar. 10, 2008

(65) Prior Publication Data

US 2008/0317345 A1 Dec. 25, 2008

Related U.S. Application Data

(62) Division of application No. 10/622,144, filed on Jul. 18, 2003.

(51) Int. Cl.
*G06K 9/48* (2006.01)
*G06K 9/34* (2006.01)
*G06K 9/46* (2006.01)

(52) U.S. Cl. .................. 382/199; 382/173; 382/190
(58) Field of Classification Search .................. 382/199
See application file for complete search history.

(56) References Cited

U.S. PATENT DOCUMENTS

| | | | |
|---|---|---|---|
| 4,667,190 A | 5/1987 | Fant | |
| 4,835,532 A | 5/1989 | Fant | |
| 5,065,447 A | 11/1991 | Barnsley et al. | |
| 5,142,592 A * | 8/1992 | Moler | 382/200 |
| 5,341,142 A * | 8/1994 | Reis et al. | 342/64 |
| 5,448,686 A | 9/1995 | Borrel et al. | |
| 5,500,904 A | 3/1996 | Markandey et al. | |
| 5,550,937 A | 8/1996 | Bell et al. | |
| 5,555,555 A | 9/1996 | Sato et al. | |
| 5,612,901 A | 3/1997 | Gallegos et al. | |

(Continued)

OTHER PUBLICATIONS

Fast Image Segmentation by Sliding in the Derivative Terrain, Yao et al., Proc. SPIE vol. 1607, 1991, pp. 369-379.*

(Continued)

*Primary Examiner*—David P Rashid
(74) *Attorney, Agent, or Firm*—Buchanan Ingersoll & Rooney PC

(57) ABSTRACT

A method and apparatus are provided for identifying linear objects in an image. Terrain types in the image are identified, and a gradient vector image, which identifies a gradient magnitude value and a gradient direction value for each pixel of the image, is generated from the image. Lines in the gradient vector image are identified using the identified terrain types in each portion of the image. It is determined whether the identified lines are perpendicular, collinear, or parallel to another line among the identified lines in the gradient vector image. Lines among the identified line are eliminated which are determined to not be perpendicular, collinear, or parallel to another line among the identified lines in the gradient vector image. Linear objects are identified using the remaining identified lines which have not been eliminated.

15 Claims, 33 Drawing Sheets

U.S. PATENT DOCUMENTS

| | | | |
|---|---|---|---|
| 5,612,928 A | 3/1997 | Haley et al. | |
| 5,631,970 A | 5/1997 | Hsu | |
| 5,640,468 A | 6/1997 | Hsu | |
| 5,742,710 A | 4/1998 | Hsu et al. | |
| 5,859,929 A | 1/1999 | Zhou et al. | |
| 5,870,502 A | 2/1999 | Bonneau et al. | |
| 5,917,935 A | 6/1999 | Hawthorne et al. | |
| 5,946,417 A | 8/1999 | Bonneau et al. | |
| 5,978,520 A | 11/1999 | Maruyama et al. | |
| 5,995,668 A | 11/1999 | Corset et al. | |
| 6,002,794 A | 12/1999 | Bonneau et al. | |
| 6,026,177 A | 2/2000 | Mong et al. | |
| 6,052,485 A | 4/2000 | Nelson et al. | |
| 6,084,989 A | 7/2000 | Eppler | |
| 6,134,353 A * | 10/2000 | Makram-Ebeid | 382/259 |
| 6,195,444 B1 | 2/2001 | Simanovsky et al. | |
| 6,240,369 B1 | 5/2001 | Foust | |
| 6,263,091 B1 * | 7/2001 | Jain et al. | 382/125 |
| 6,310,967 B1 | 10/2001 | Heine et al. | |
| 6,337,925 B1 * | 1/2002 | Cohen et al. | 382/199 |
| 6,404,920 B1 | 6/2002 | Hsu | |
| 6,404,923 B1 | 6/2002 | Chaddha | |
| 6,415,053 B1 * | 7/2002 | Norimatsu | 382/199 |
| 6,507,670 B1 | 1/2003 | Moed | |
| 6,542,621 B1 | 4/2003 | Brill et al. | |
| 6,597,818 B2 | 7/2003 | Kumar et al. | |
| 6,603,880 B2 | 8/2003 | Sakamoto | |
| 6,618,490 B1 | 9/2003 | Cham et al. | |
| 6,741,744 B1 | 5/2004 | Hsu | |
| 6,810,153 B2 | 10/2004 | Komura et al. | |
| 6,842,698 B2 | 1/2005 | Howard et al. | |
| 7,184,590 B2 | 2/2007 | Lee | |
| 2002/0057823 A1 | 5/2002 | Sharma et al. | |
| 2002/0057838 A1 * | 5/2002 | Steger | 382/197 |
| 2002/0114517 A1 | 8/2002 | Wolfson et al. | |
| 2002/0159636 A1 | 10/2002 | Lienhart et al. | |
| 2003/0038975 A1 | 2/2003 | Ohara et al. | |
| 2003/0081836 A1 * | 5/2003 | Averbuch et al. | 382/199 |
| 2003/0123736 A1 | 7/2003 | Xu | |
| 2003/0144585 A1 | 7/2003 | Kaufman et al. | |
| 2003/0185420 A1 | 10/2003 | Sefcik et al. | |
| 2003/0190075 A1 | 10/2003 | Averbuch et al. | |
| 2003/0220746 A1 | 11/2003 | Ghosh et al. | |
| 2005/0002570 A1 | 1/2005 | Clark et al. | |
| 2005/0013486 A1 | 1/2005 | Wiedemann et al. | |
| 2008/0063238 A1 | 3/2008 | Lee et al. | |
| 2008/0219506 A1 | 9/2008 | Wiedemann et al. | |
| 2008/0219555 A1 | 9/2008 | Wiedemann et al. | |

OTHER PUBLICATIONS

Toboggan-Based Intelligent Scissors with a Four-Parameter Edge Model, Mortensen et al., IEEE, 1999, pp. 452-458.* http://en.wikipedia.org/wiki/Sobel_operator titled "Sobel Operator", Wikipedia, accessed Mar. 27, 2009; last modified Mar. 25, 2009, 15:31.

Wiedemann et al., Copending U.S. Appl. No. 10/622,144, filed Jul. 18, 2003 entitled "Method and Apparatus for Automatic Object Identification".

Lee et al., Copending U.S. Appl. No. 11/980,635, filed Oct. 31, 2007 entitled "Method and Apparatus for Automatic Object Identification".

Wiedemann et al., Copending U.S. Appl. No. 12/073,765, filed Mar. 10, 2008 entitled "Method and Apparatus for Automatic Object Identification".

Wiedemann et al., Copending U.S. Appl. No. 12/073,777, filed Mar. 10, 2008 entitled "Method and Apparatus for Automatic Object Identification".

Cham, T. et al., "A Statistical Framework for Long-Range Feature Matching in Uncalibrated Image Mosaicing." Computer Vision and Pattern Recognition, 1998, pp. 1-6.

* cited by examiner

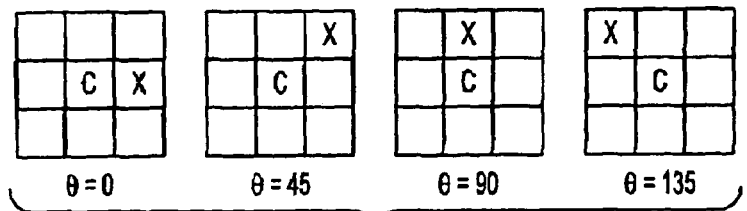
FIG. 3
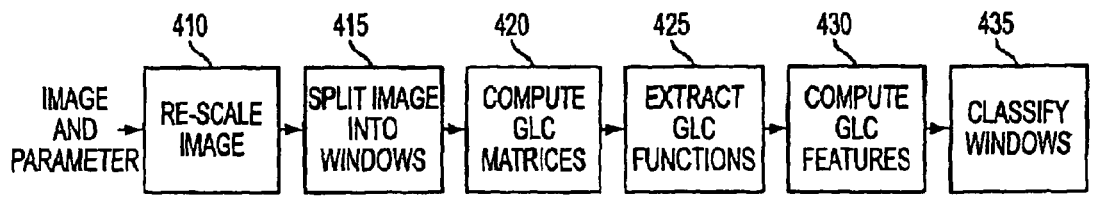
FIG. 4
ENERGY
$$En = \sum_{i=0}^{n-1}\sum_{j=0}^{n-1}(G(i,j))^2$$
ENTROPY
$$Et = \sum_{i=0}^{n-1}\sum_{j=0}^{n-1}(G(i,j)\log(G(i,j)))$$
CONTRAST
$$Ct = \sum_{i=0}^{n-1}\sum_{j=0}^{n-1}(G(i,j) \times (i-j)^2)$$
INVERSE_DIFFERENCE_MOMENT
$$En = \sum_{i=0}^{n-1}\sum_{j=0}^{n-1}\frac{G(i,j)}{1+(i-j)^2}$$
CORRELATION
$$Cr = \sum_{i=0}^{n-1}\sum_{j=0}^{n-1}\frac{i \times j \times G(i,j) - \mu_x \times \mu_y}{\sigma_x \times \sigma_y}$$
FIG. 5

| DIRECTIONS 3 & 7 | DIRECTIONS 1 & 5 | DIRECTIONS 2 & 6 | DIRECTIONS 4 & 8 |
|---|---|---|---|
| O O O O O | O X X X O | O O O X O | O X O O O |
| X O O O X | O O X O O | O O O X X | X X O O O |
| X X C X X | O O C O O | O O C O O | O O C O O |
| X O O O X | O O X O O | X X O O O | O O O X X |
| O O O O O | O X X X O | O X O O O | O O O X O |
C = CENTER PIXEL   X = NON-ZERO PIXEL   O = DON'T CARE PIXEL
FIG. 10
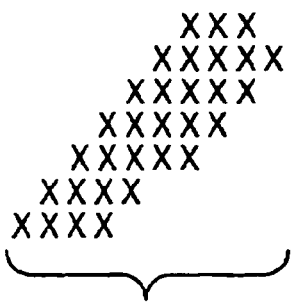
FIG. 11A
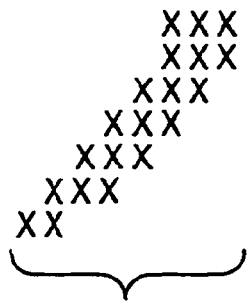
FIG. 11B
```
X 1 X      X 1 X      X X O      O X X
X C 1      1 C X      1 C X      X C 1
O X X      X X O      X 1 X      X 1 X
```
1 = NON-ZERO PIXEL, O = ZERO PIXEL, X = DON'T CARE
FIG. 12
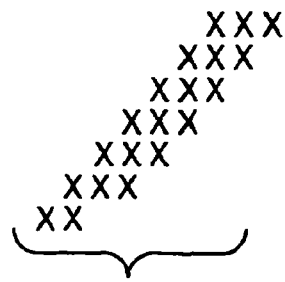
FIG. 13A
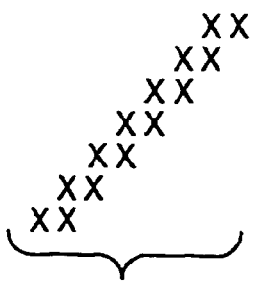
FIG. 13B

3 AND 7

1 AND 5

4 AND 8

2 AND 6

EDGES DIRECTIONS AND MAGNITUDES

THINNING EDGES

NO NOISE PRESENT

NOISE PRESENT

DIRECTION 1 = DIRECTION 1 AND DIRECTION 2
DIRECTION 2 = DIRECTION 2 AND DIRECTION 3
DIRECTION 3 = DIRECTION 3 AND DIRECTION 4
DIRECTION 4 = DIRECTION 4 AND DIRECTION 5
DIRECTION 5 = DIRECTION 5 AND DIRECTION 6
DIRECTION 6 = DIRECTION 6 AND DIRECTION 7
DIRECTION 7 = DIRECTION 7 AND DIRECTION 8
DIRECTION 8 = DIRECTION 8 AND DIRECTION 1

```
E E O      O E E      O E O      O E O
O C O      O C O      O C O      O C O
O E O      O E O      E E O      O E E
       TEMPLATES FOR VERTICAL POINT GAP

C = CENTER PIXEL, VALUE 1    E = PIXEL VALUE 1    O = ZERO PIXEL VALUE

E O O      O O E      O O O      O O O
E C E      E C E      E C E      E C E
O O O      O O O      E O O      O O E
       TEMPLATES FOR HORIZONTAL POINT GAP
```

WHERE e' = MAXIMUM OF { a, b, c, d, e, f, g, h, i }

WHERE e' = MINIMUM OF { a, b, c, d, e, f, g, h, i }

```
  1  1  1      -1  0  1      0  1  1      -1 -1  0
  0  0  0      -1  0  1     -1  0  1      -1  0  1
 -1 -1 -1      -1  0  1     -1 -1  0       0  1  1
 HORIZONTAL    VERTICAL    DIAGONAL 1     DIAGONAL 2
```

|  | HORIZONTAL | | VERTICAL | | DIAGONAL 1 | | DIAGONAL 2 | |
|---|---|---|---|---|---|---|---|---|
| GRADIENT SIGN | + | − | + | − | + | − | + | − |
| DIRECTION | 1 | 5 | 3 | 7 | 2 | 6 | 4 | 8 |

$$B_8 = 2 \times \sum_{i=1}^{15} B_i - \left( \sum_{i=1}^{15} A_i + \sum_{i=1}^{15} C_i \right)$$

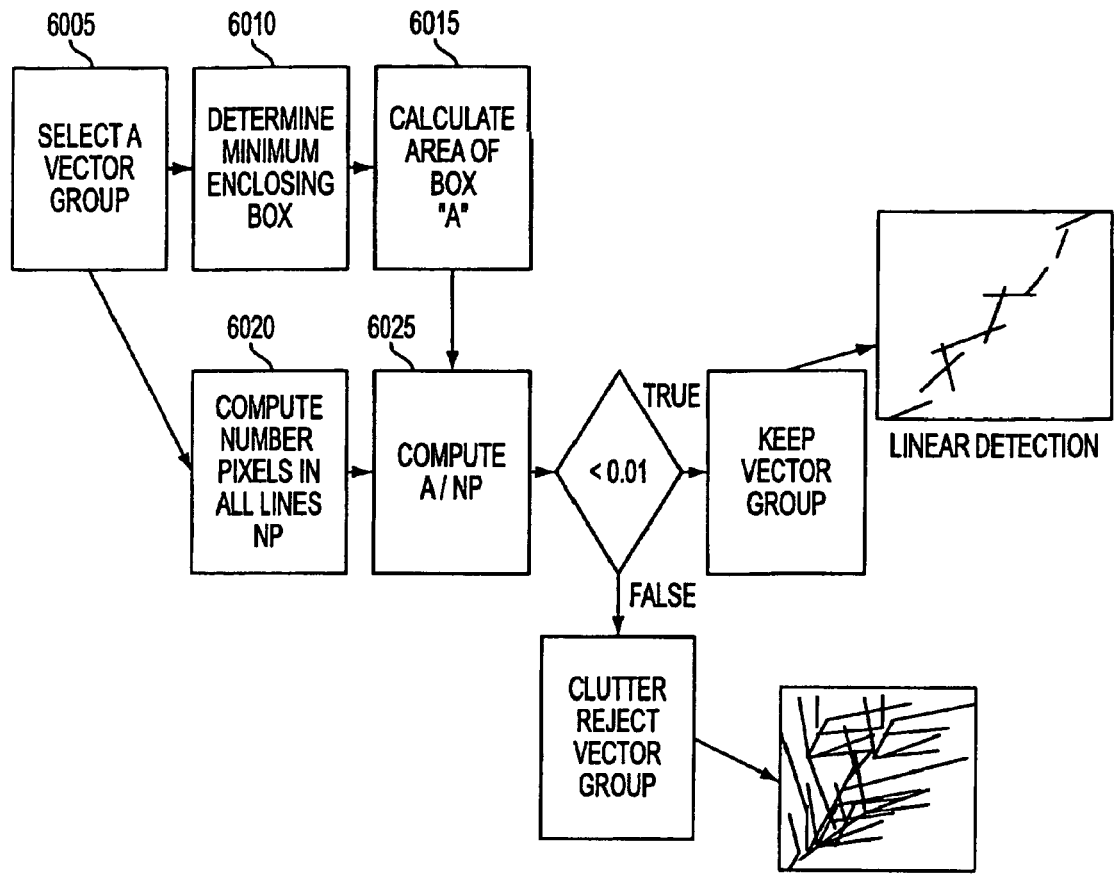

FIG. 60

$$M^1 = \|m^1_{ij}\| \text{ WHERE } m^1_{ij} \text{ IS THE DIRECT DISTANCE}$$
BETWEEN NODE $i$ AND $j$ IN PIXELS $$M^2 = \|m^2_{ij}\| \text{ WHERE } m^2_{ij} \text{ IS THE DIRECT DISTANCE}$$
BETWEEN NODE $i$ AND $j$ IN PIXELS USING A MOST ONE INTERMEDIATE NODE $$M^2 = M^1 \otimes M^1$$
$$M^4 = M^2 \otimes M^2$$
IN GENERAL THE FOLLOWING IS TRUE
$$M^{n+m} = M^n \otimes M^m$$
WHEN $M^t \equiv M^{t+\alpha}$ WHERE $\alpha$ IS A POSITIVE NUMBER ALL PATHS ARE CONNECT

FIG. 61

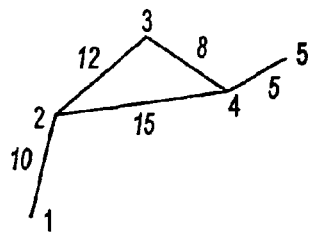
FIG. 62A
$$M^1 = \begin{matrix} 0 & 10 & 0 & 0 & 0 \\ x & 0 & 12 & 15 & 0 \\ x & x & 0 & 8 & 0 \\ x & x & x & 0 & 5 \\ x & x & x & x & 0 \end{matrix}$$
FIG. 62B
$$M^3 = \begin{matrix} 0 & 10 & 22 & 25 & 30 \\ x & 0 & 12 & 15 & 20 \\ x & x & 0 & 8 & 13 \\ x & x & x & 0 & 5 \\ x & x & x & x & 0 \end{matrix}$$
FIG. 62D
$$M^2 = \begin{matrix} 0 & 10 & 22 & 25 & 0 \\ x & 0 & 12 & 15 & 20 \\ x & x & 0 & 8 & 13 \\ x & x & x & 0 & 5 \\ x & x & x & x & 0 \end{matrix}$$
FIG. 62C
$M^3 = M^4$
FIG. 62E
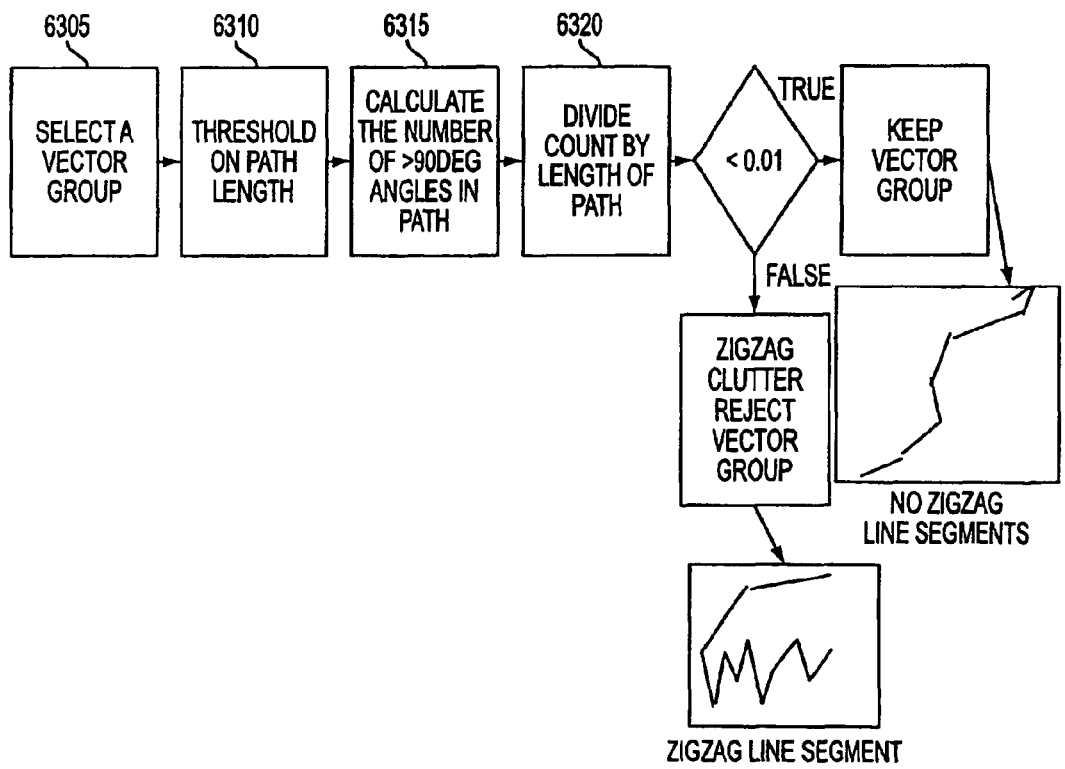
FIG. 63

METHOD AND APPARATUS FOR AUTOMATIC LINEAR OBJECT IDENTIFICATION USING IDENTIFIED TERRAIN TYPES IN IMAGES

CROSS REFERENCE TO RELATED APPLICATION

This application is a divisional of U.S. application Ser. No. 10/622,144, filed Jul. 18, 2003, now pending.

BACKGROUND

1. Field of Invention

The present invention relates to processing of image data. More particularly, the present invention relates to methods and apparatus for identifying objects in images.

2. Background Information

Historically, reconnaissance information has provided important information used in planning military operations. For example, prior to the advent of photography, scouts would be sent out to collect information regarding natural resources such as lakes and rivers, enemy troop information and the like. With the advent of photography, these scouts would provide reconnaissance information by capturing a scene of enemy installations, battlefields, and the like, using photographs. As technology advances, new methods are provided for collecting reconnaissance information. For example, it is quite common today to have reconnaissance planes, manned or remotely controlled, or satellites capture a scene for reconnaissance purposes. In addition to conventional photographic techniques, a scene can be captured using infrared detectors and the like.

Typically scenes captured by reconnaissance techniques have been analyzed by humans in order to determine the content of the captured scene. For example, a human would analyze a photograph to determine the location of bodies of water, the location of enemy troops and the location of man-made objects such as buildings and lines of communication. The human who analyzed the photograph would then have to relay the determined information to people in the field, for example, to an airplane pilot in order to identify targets. However, using humans to analyze photographs is very labor intensive. Further, there can be a considerable delay between the time when a scene is captured and the time in which the information in the captured scene is relayed to persons in the field.

SUMMARY OF THE INVENTION

In accordance with one embodiment of the present invention, a method and apparatus are provided for identifying objects in an image. In accordance with this embodiment, an image with a first resolution is received. The image is processed at a second resolution to identify an object. The image is processed at the first resolution using the identified object to identify another object, wherein the first resolution is higher than the second resolution.

In accordance with one embodiment of the present invention, a method and apparatus are provided for automatically identifying objects in an image. An image is received. A second image is generated identifying areas of the image which border regions of different intensities. A third image is generated identifying portions of the image for which an average gradient magnitude of the portion is greater than a threshold. The second image is processed to produce a fourth image, the fourth image identifying lines in the image. The image is segmented into a plurality of regions. It is determined which of the plurality of regions is a background region not containing said objects. Adjacent regions which are not background regions are merged. Objects in the merged adjacent regions are identified.

In accordance with one embodiment of the present invention, a method and apparatus are provided for automatically identifying bodies of water in an image. A first image at a first resolution is received. Said image at a second resolution is processed to produce a second image identifying bodies of water in the image at said second resolution. Said image is processed at a third resolution to produce a third image identifying bodies of water in the image at said third resolution. Bodies of water are automatically identified in the first image using said second and third image.

In accordance with one embodiment of the present invention, a method and apparatus are provided for automatically identifying objects in an image. Terrain types in the image are identified. A second image is generated identifying areas of the image which border regions of different intensities by identifying a gradient magnitude value for each pixel of the image. A filtered image is generated from the second image, the filtered image identifying potential objects which have a smaller radius than the size of a filter and a different brightness than background pixels surrounding the potential objects. The second image and the filtered image are compared to identify potential objects as an object, a potential object is identified as an object if the potential object has a gradient magnitude greater than a threshold gradient magnitude, and the threshold gradient magnitude is based on the terrain type identified in the portion of the image where the potential object is located.

In accordance with one embodiment of the present invention, a method and apparatus are provided for identifying linear objects in an image. Terrain types in the image are identified. A gradient vector image is generated from the image, the gradient vector image identifying a gradient magnitude value and a gradient direction value for each pixel of the image. Lines in the gradient vector image are identified using the identified terrain types in each portion of the image. It is determined whether the identified lines are perpendicular, collinear, or parallel. Lines which are not perpendicular, collinear, or parallel with another line in the gradient vector image are eliminated. Linear objects are identified using the remaining lines.

In accordance with one embodiment of the present invention, a method and apparatus are provided for identifying objects in an image. A gradient vector image is generated from the image, the gradient vector image identifying a gradient magnitude value and a gradient direction for each pixel of the image. Lines in the gradient vector image are identified. It is determined whether the identified lines are perpendicular. It is determined whether more than a predetermined number of pixels on each of the lines identified as perpendicular have a gradient magnitude greater than a predetermined threshold. It is determined whether the individual lines which are identified as perpendicular are within a predetermined distance of each other. A portion of the image is identified as an object if the identified lines are perpendicular, more than the predetermined number of pixels on each of the lines have a gradient magnitude greater than the predetermined threshold, and are within a predetermined distance of each other.

In accordance with one embodiment of the present invention, a method and apparatus are provided for identifying linear objects in an image. An image with a first resolution is received. A filtered image is generated from the image, the filtered image identifying potential objects which have a smaller radius than the size of a filter and a different brightness than pixels surrounding the potential objects. A second image is received identifying regions in the image with the first resolution which are not to be processed. A third image is generated by removing regions in the filtered image which are identified in the another image as regions in the image which are not to be processed. Lines are identified in the third image. A fourth image is generated by removing lines identified in the third image which do not meet predetermined criteria. Linear objects are identified in the image using the remaining lines in the fourth image.

In accordance with one embodiment of the present invention, a method and apparatus are provided for identifying linear objects in an image. An image with a first resolution is received. The image is processed to produce an image at a second resolution. A filtered image is generated from the image at the second resolution. A second image identifying portions of the image with the first resolution which are not to be processed is received. A third image is generated by removing portions of the filtered image which are identified in the second image as portions of the image which are not to be processed. Lines in the third image are identified. A fourth image is generated by removing lines identified in the third image which do not meet predetermined criteria. Linear objects in the image are identified using the remaining lines in the fourth image.

In accordance with one embodiment of the present invention, a method and apparatus are provided for identifying linear objects in an image. A first and second image identifying linear objects are received, the first image having a first resolution and the second image having a second resolution. The first and second images are processed to produce a third image, wherein the processing combines linear objects from the first and second image. Linear objects in the image are identified using the third image.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein:

FIG. 3 illustrates matrices employed for the determination of gray level cocurrence.

FIG. 4 illustrates processing performed to identify terrain employing gray level cocurrence processing in accordance with exemplary embodiments of the present invention.

FIG. 5 illustrates the calculation of various features employed in the gray level cocurrence processing.

FIG. 10 illustrates the four templates employed for edge thinning processing.

FIGS. 11A and 11B illustrate a line segment before and after edge thinning.

FIG. 12 illustrates the patterns employed to remove the 4-connected pixels.

FIGS. 13A and 13B respectively illustrate a line segment before and after deletion of 4-connected pixels.

FIG. 60 illustrates density clutter rejection processing in accordance with the present invention.

FIG. 61 illustrates the relation between various distance matrices in accordance with exemplary embodiments of the present invention.

FIGS. 62A-62E illustrate a best path analysis in accordance with exemplary embodiments of the present invention.

FIG. 63 illustrates zigzag clutter rejection processing in accordance with exemplary embodiments of the present invention.

DETAILED DESCRIPTION

Overview

Figure 1:
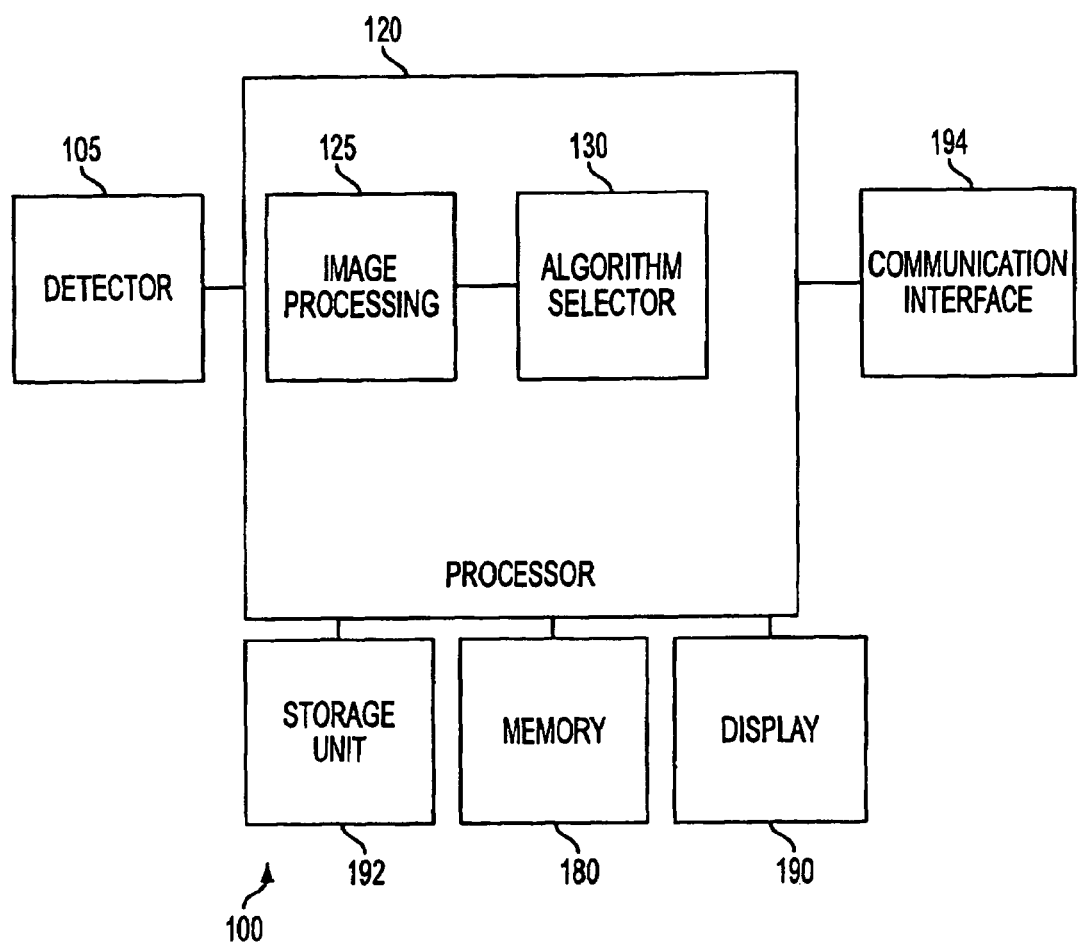
FIG. 1 is a block diagram of a system for processing image data in accordance with exemplary embodiments of the present invention.

FIG. 1 is a block diagram of a system 100 for processing image data in accordance with exemplary embodiments of the present invention. The system 100 includes a detector 105, a processor 120, a memory 180, a display 190, a storage unit 192 and a communication interface 194. The processor includes an image processing block 125 and an algorithm selector 130. The display 190 can be any type of display for outputting information in a human readable form including a cathode ray tube monitor, an LCD monitor, a printed piece of paper, or the like. Further, processor 120 can be hard-wired circuits, or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM).

Detector 105 can comprise an infrared imaging device, a thermal imaging device, a regular photographic device or the like. Memory 180 can be any type of memory including random access memory (RAM) electronically erasable memory (EPROM), or the like. Storage unit 192 can be any type of storage including magnetic or optical drives, a local drive or a network drive, and a floppy disk, hard drive, CD-ROM, DVD-ROM, DVD-RAM, or a tape drive. Communication interface 194 can comprise any type of interface for connecting to a communication network, such as a data or voice network, a land-line or wireless network, or the like. It will be recognized that one of ordinary skill in the art would understand how to build a communication interface, and hence, a detailed description of this interface is omitted.

Detector 105 captures an image of a scene and provides the image to processor 120. In addition to the captured scene, the detector can provide metric data associated with the captured scene. The metric data can include geographic location, terrain type, ground sample distance, weather, viewing conditions, band frequency of the sensor band, degrees of freedom of the sensor, viewing angles, and/or positional vector. The image processing block 125 receives the captured scene and processes the associated image data using one or more processing algorithms to produce one or more processed signals. Specifically, as will be described in more detail below, the processing algorithms can be specifically designed to identify various objects in the image data such as bodies of water, vehicles, buildings or communication lines.

The processed signals are input to the algorithm selector 130. The algorithm selector automatically selects among the processed signals, each of the processed signals being associated with a different detection algorithm, based upon predetermined conditions associated with the captured scene, e.g., weather, time of day, type of terrain and temperature. The processor then outputs the selected processed signals to display 190, storage unit 192 and/or communication interface 194. For more information regarding the operation of the algorithm selector the interested reader should refer to U.S. patent application Ser. No. 10/196,168 filed Jul. 17, 2002 "Algorithm Selector", the entire contents of which is herein expressly incorporated by reference.

Figure 2:
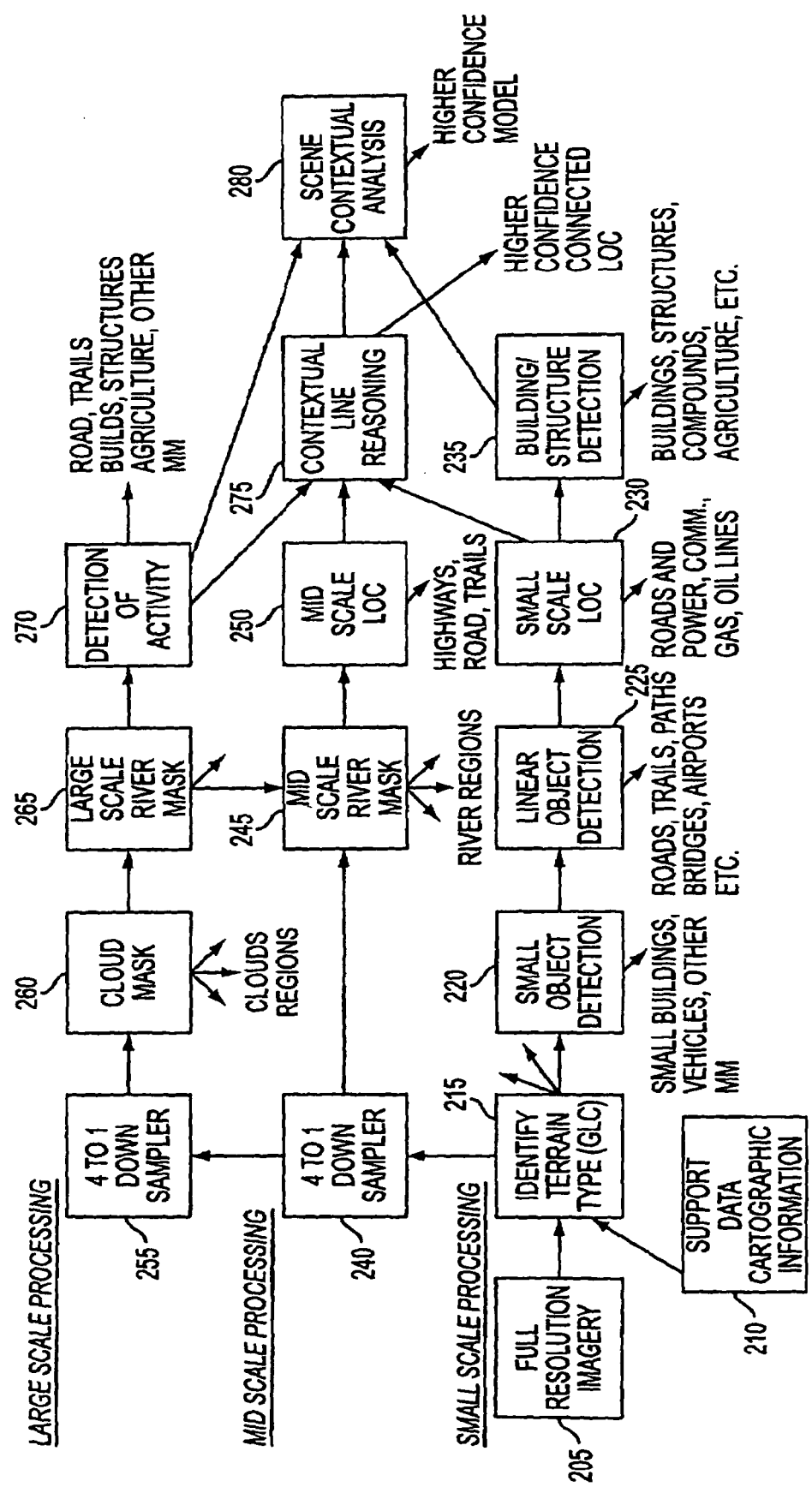
FIG. 2 is a block diagram of the various functional processing blocks of the image processing block of FIG. 1.

FIG. 2 is a block diagram of the various functional processing blocks of image processing block 125. As illustrated in FIG. 2, the present invention operates using three different resolutions of the received image. Specifically, small scale processing is performed on the image in its original resolution or first resolution, mid scale processing is performed on a downsampled version of the original image at a second resolution, and large scale processing is performed on a downsampled version of the image at the second resolution in a third resolution. In accordance with exemplary embodiments of the present invention, large scale processing is performed first, mid scale processing is performed next, and small processing (except for processing block 215) is performed last. By performing the processing in this order, information obtained in the higher scale processing (e.g., a cloud mask) can be employed in lower scale processing (e.g., small object detection).

As illustrated in FIG. 2, the small scale processing begins with the input of an image with a first resolution 205, and support data and cartographic information 210. This information is input into a terrain type identification processing block 215 which identifies terrain types present in the image. In accordance with exemplary embodiments of the present invention, the type of terrain is identified by employing gray level co-occurrence. Continuing with the small scale processing, the output of the terrain type identification processing is input to a small object detection block 220. Next, linear objects are detected by processing block 225. The linear object detection processing block 225 provides an output identifying roads, trails, paths, bridges, airports and the like. The small scale lines of communication processing block outputs an identification of roads, power lines, communication lines, gas lines, oil lines, and the like. The building and structure detection block 235 outputs an identification of buildings, structures, compounds, agriculture and the like.

The mid scale processing is performed on a downsampled version of the image with a first resolution 205 using an output of four-to-one downsampling block 240. The output of four-to-one downsampling block 240 is an image at a second resolution which is received by a mid scale river mask processing block 245. Mid scale river mask processing block 245 outputs an identification of river regions. The mid scale lines of communication processing block 250 outputs an identification of highways, roads, trails and the like.

The large scale processing is performed on a downsampled version of the mid scale imagery. This is achieved by downsampling the image at a second resolution using the four-to-one downsampling processing block 255 to produce an image at a third resolution. The downsampled imagery is then provided to cloud mask processing block 260. Cloud mask processing block 260 outputs an identification of cloud regions. A large scale river mask processing block 265 outputs an identification of river regions. The activity detection processing block 270 outputs an identification of roads, trails, buildings, structures, agriculture and other manmade activity.

The output of processing the imagery at the various resolution levels is combined in a contextual line reasoning processing block 275 and in a scene contextual analysis processing block 280. The contextual line reasoning processing block 275 and the scene contextual analysis processing block 280 receive images identifying objects in the image with a first resolution from the various processing blocks in FIG. 2 and employ a variety of criteria to improve the confidence in the detected objects. It should be recognized that FIG. 2 is merely intended as an overview of the various processing performed by image processing block 125. Accordingly, the order in which the various processing blocks in FIG. 2 are illustrated within the particular scale of processing is not necessarily the order in which these processes are performed. The particular order of the processing will be evident from the relationship of the various processing blocks in the description below. Now that an overview of the entire system has been presented, a detailed description of the various processing blocks illustrated in FIG. 2 will now be presented.

Gray Level Cooccurrence

As illustrated in FIG. 2, the present invention employs a gray level cooccurrence processing to identify terrain types present in the original image. Gray level cooccurrence is an image processing operator used to derive a set of features that can determine texture properties of an image. The gray level cooccurrence is defined as a matrix $P(i,j,d,\theta)$ made up of probabilities that gray level i occurs near gray level j, at a distance d pixels apart, with an angular orientation of $\theta$ degrees. In practice, multiple $\theta$ values are used, and one gray level cooccurrence matrix is computed for each of these $\theta$. Multiple d values can also be used, in which case, a set of matrices is computed for each d value. FIG. 3 illustrates four $\theta$ neighborhoods which are applied over an input image. In FIG. 3, C is the pixel that determines the i index value of the matrix, and X is the pixel that determines the j index value of the matrix. Although there are four additional $\theta$ values that are reflections of the four neighborhoods illustrated in FIG. 3, there is no need to compute separate matrices for these since they can be combined with the computation of their symmetric counterpart by incrementing the (j,i) bin of the gray level cooccurrence matrix at the same time as the (i,j) is incremented in the matrix. Dividing each individual matrix cell by the sum of all cell values normalizes the gray level cooccurrence matrix. The value in each (i,j) cell then becomes the probability that the (i,j) gray level pair occurs in the image.

The gray level cooccurrence is employed in the present invention in the detections of clouds in the large scale imagery and in general terrain type detection for small scale imagery. Gray level cooccurrence uses the spatial relationship of individual pixel gray values in the image to produce a set of texture feature measurements for a particular image region. The present invention employs these feature measurements in multi-class statistical classification to determine the terrain class of unknown regions in an image.

FIG. 4 illustrates the overall processing flow employed in the present invention. Since the pixel values in the image can be as high as 65,535, or 16 bit values, the gray level cooccurrence matrix would be too large to fit into a memory. To remove this problem the pixels are rescaled to 8 bits, or 255 valued numbers in processing step 410. This results in a more manageable gray level cooccurrence matrix. The rescaling can be accomplished with the following formula:

$$I_{out}(i, j) = \frac{I_{in}(i, j) - \min}{\max - \min} \times 255$$

After rescaling the image is split into fixed size windows that are 128×128 pixels in processing step 415. Each window is then individually processed in accordance with the remainder of the processing steps illustrated in FIG. 4. A set of gray level cooccurrence matrices is tallied for each 128×128 window, these matrices including the four matrices for the four angles illustrated in FIG. 3. Next the matrices are processed by the functions illustrated in FIG. 5. These functions include energy, entropy, contrast, inverse difference moment, and correlation. This produces five sets of four values each. These five sets of values are next converted into gray level cooccurrence features in processing step 430. Specifically, two features are calculated for five sets, namely, the mean, and range (maximum value minus minimum value) of each of the four sets. This results in a total of ten gray level cooccurrence features for each window. Finally, each window is classified into the various terrain types employing the gray level cooccurrence features using a statistical classifier. One skilled in the art will recognize how to make and use such a statistical classifier.

Clouds and Manmade Activity Detection

Figure 6:
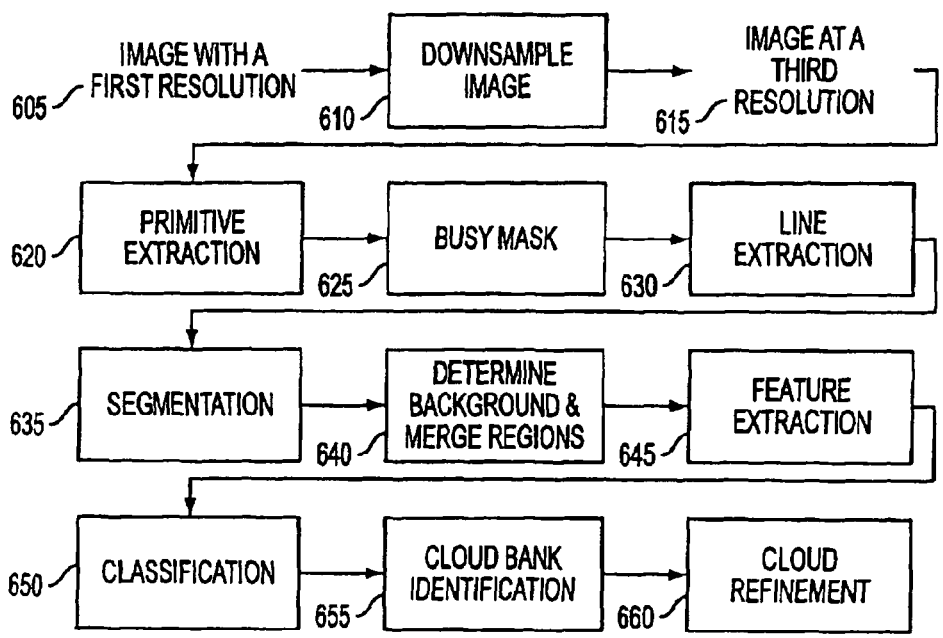
FIG. 6 is an overview of the various processing employed by the cloud mask processing and activity detection blocks of FIG. 2.

The processing performed for the cloud mask processing block 260 and the activity detection processing block 270 are similar, and hence, will be presented together. Processing which differs between these processing blocks will be highlighted in the description below. FIG. 6 is an overview of the various processing employed by cloud mask processing block 260 and activity detection processing block 270. The image with a first resolution and metric data 605 are received by these processing blocks and the image is downsampled in processing block 610. The downsampling produces an image at a third resolution 615 which is provided to a primitive extraction processing block 620. Since the cloud and activity detection is performed on large scale images, the image with the first resolution is downsampled twice by processing block 610. The primitive extraction processing block 620 processes the image data to produce a second image which identifies areas in the image which border regions of different intensities. Next, a busy mask processing block 625 processes the downsampled image to produce a third image which identifies portions of the input image for which an average gradient magnitude of the portion is greater than a threshold level.

Next, line extraction processing block 630 processes the second image which is output by primitive extraction block 620 to produce a fourth image which identifies lines in the image. The third image, output from the busy mask, is then updated with the fourth image to preserve the linear features. Hence no linear features are included in the busy mask. This image is then segmented into a plurality of regions by segmentation processing block 635. Next, the background regions are determined and merged in processing block 640. The objects that are desired to be detected are identified by feature extraction processing block 645. The extracted features are then classified in processing block 650. It is at this point that the activity detection processing block would output an identification of roads, buildings, agriculture and other types of manmade activity. However, the cloud mask processing block would perform further processing using the output of classification processing block 650. Specifically, the output of classification processing block 650 is employed to identify cloud banks in processing block 655, and the detection of clouds is refined in processing block 660.

Figure 7A:
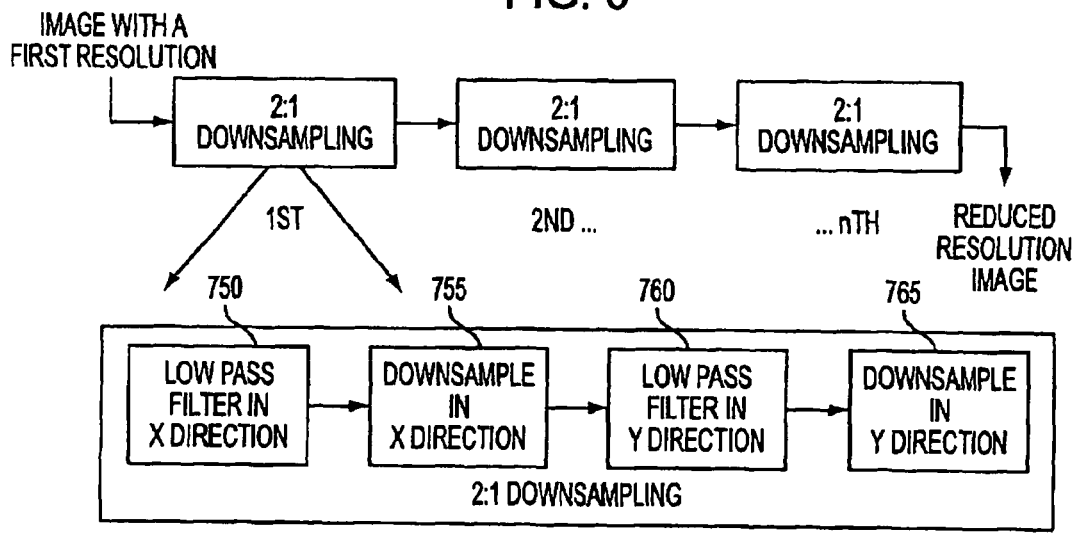
FIGS. 7A-7C illustrate an exemplary technique for downsampling an image with a first resolution.
Figure 7B:
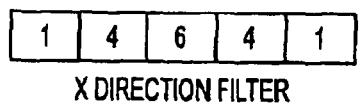
Figure 7C:
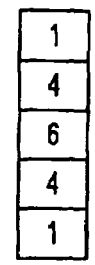

FIG. 7A illustrates an exemplary technique for downsampling the image with a first resolution. Specifically, the image with a first resolution is downsampled by employing a 6×6 low pass convolution filter. This filter is effective in removing aliasing caused by high frequencies. The full 6×6 convolution filter is illustrated in FIG. 7B, which is a combination of the X direction filter of FIG. 7C and the Y direction filter of FIG. 7D. In order to reduce processing operations, the present invention decomposes the full 6×6 convolution filter kernel into an X direction filter and a Y direction filter. Accordingly, the original resolution image is initially low pass filtered in the X direction 750. Next, the original resolution image is downsampled in the X direction 755 and then low pass filtered in the Y direction 760. Finally, the output of the low pass filtering operation in the Y direction is downsampled in the Y direction 765. The output of this downsampling process can be input into an identical downsampling processing block if lower resolution imagery is desired. Since the identification of clouds and manmade activity detection is performed using large scale processing, the original resolution image at a first resolution is downsampled twice.

Figure 8:
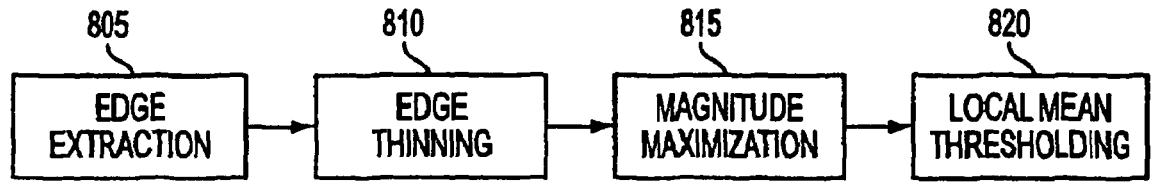
FIG. 8 illustrates an overview of the processing performed by the primitive extraction processing block of FIG. 6.

FIG. 8 illustrates an overview of the processing performed by the primitive extraction processing block 620. The primitive extraction processing block initially extracts edges from the image at a third resolution by processing block 805. Processing block 810 performs a thinning operation on the extracted edges. Next, the gradient magnitudes of the pixels are maximized in processing block 815. The maximized gradient magnitudes are then compared to a local mean threshold in processing block 820. Processing block 820 outputs an image of the identified primitives.

Figure 9A:
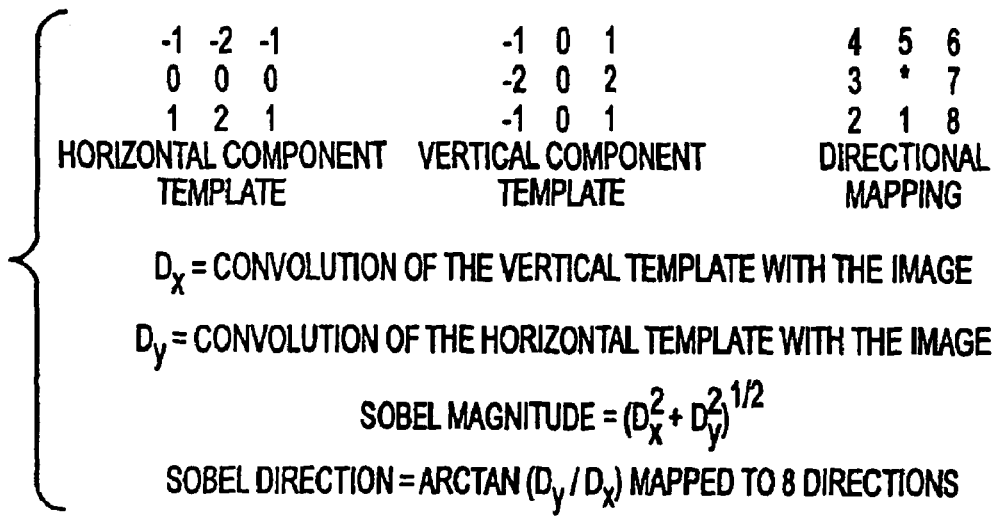
FIGS. 9A and 9B illustrate exemplary Sobel templates in accordance with the present invention.
Figure 9B:
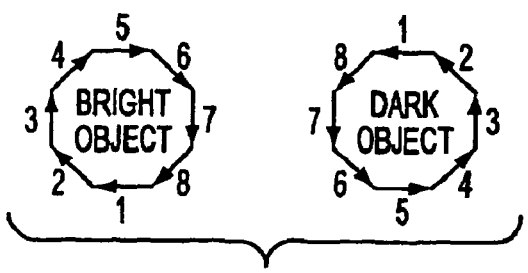

The edge extraction processing block 805 is employed to identify areas of the image which border regions of different intensities using a Sobel operator. The areas of an image which are identified by a Sobel operator as bordering regions of different intensities are referred to in the art as edges. Accordingly, it is common in the art to refer to the operation performed by a Sobel operator as edge extraction. The Sobel operator is a conventional image processing routine which is an approximation to the gradient (edge magnitude) of a digital image and can be computed using a template operator. FIGS. 9A and 9B illustrate the Sobel templates. Specifically, the vertical template is convolved with the image to produce a horizontal gradient $D_x$. The image is also convolved with the horizontal template to produce a vertical gradient $D_y$. The gradient magnitude for each pixel is calculated by summing a square of the horizontal gradient with a square of the vertical gradient and taking the square root of the sum. An arc tangent operation of the result of a division of the vertical gradient by the horizontal gradient provides the gradient direction. In accordance with exemplary embodiments of the present invention, the Sobel direction is mapped to eight directions in accordance with the directional assignments illustrated in FIG. 9B. It will be recognized that pixel locations where the gradient magnitude is high represents transition areas or edge locations in the image. The result of the processing using the Sobel operator is the generation of an image which identifies edges, i.e., areas of the image which border regions of different intensities. Once the edges are extracted, the mean, maximum, minimum and standard deviation of the gradient magnitude image is calculated. This information is used in the busy mask processing block 625 and in the segmentation processing block 635 as will be described in more detail below.

The edge thinning processing block 810 performs an edge thinning operation on every pixel to preserve maximal edge responses. Effectively, the non-maximal responses in a direction normal to the edge response, i.e., across the edge, are suppressed. FIG. 10 illustrates the four templates employed for this edge thinning processing. Specifically, one of the four templates illustrated in FIG. 10 is applied at each location in the gradient magnitude image. The gradient direction, one through eight, at any given pixel location determines which template to use. If the gradient magnitude of the center pixel is less than the gradient magnitude at any of the locations in the template marked by an "X", then the center pixel is a non-maximal edge and it is not included in the edge map image, i.e., it is set to a value of zero. If, however, the center pixel's gradient magnitude is greater than, or equal to, the edge magnitude at the "X" positions of the template, then the center pixel represents a locally maximal edge response and its magnitude is included in the edge map image.

The edge map image output from edge thinning processing block 810 is provided to gradient magnitude maximization processing block 815. In this processing block, the gradient magnitudes of the pixels are maximized so that each pixel on a line has its gradient magnitude set to the value of the pixel with the greatest gradient magnitude on the same line. These new gradient magnitudes are then fed into a threshold routine. The threshold routine first performs a line segment cleaning procedure to thin the line segments and to delete the four connected pixels. Next, the junction pixels and their immediate neighbors are temporarily removed. Then all pixels on the same line segment are assigned the maximum gradient magnitude value of that line. The final step of this process restores the deleted junction pixels and their neighbors. These steps are now described in detail.

The line segment cleaning procedure converts the edges in the edge map image into a set of connected pixels that form line segments, although not necessarily straight line segments. The line segments must have a property that each has only two endpoints, unless it is a closed curve, in which case it has no endpoints. To achieve this, the edge pixels are thinned, four-connected pixels are deleted, and junction pixels are deleted.

The edge thinning processing often leaves edges that are more than one pixel wide. To reduce the width of these edges to a single pixel, a thinning process is employed that repeatedly "peels" pixels for each side of the edges until a one pixel wide line remains. This thinning process is illustrated in FIGS. 11A and 11B. Specifically, FIG. 11A illustrates a line segment before edge thinning and FIG. 11B illustrates a line segment after edge thinning.

As illustrated in FIG. 11B, the thinned edges are both four-connected and eight-connected. To facilitate the identification of junction pixels, the four connected pixels are removed if this does not cause a break in the edge connectivity. FIG. 12 illustrates the patterns employed to remove the four-connected pixels. In the patterns of FIG. 12, a non-zero pixel, i.e., a "1" location, in the image is deleted, i.e., set to zero, if it fits one of the four patterns. FIG. 13A illustrates a line segment before deletion of four-connected pixels and FIG. 13B illustrates a line segment after the deletion of four-connected pixels.

Figures 14A, 14B, 14C:
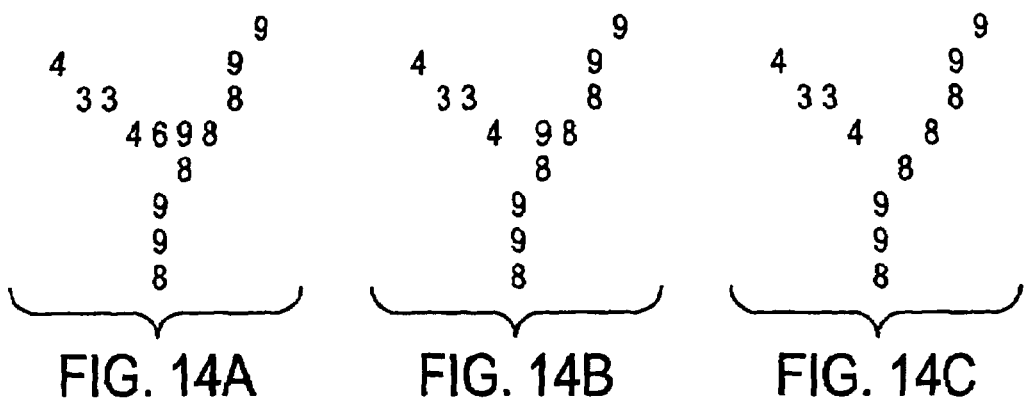
FIGS. 14A-14C illustrate the deletion of junction pixels.

FIGS. 14A-14C illustrate the deletion of junction pixels. The numbers in FIGS. 14A-14C represent the gradient magnitudes of particular pixels in an image. As illustrated in FIG. 14A, three-connected groups of edge pixels frequently come together at a point. One of the three groups is deleted so that only line segments that can be identified by a pair of end points remain. Since most of the junction points are due to noise, the edge group that has the smallest gradient magnitude at the junction is disconnected, as illustrated in FIG. 14B. The four-connected pixel removal described above is then performed which results in the pixel arrangement illustrated in FIG. 14C.

Figures 15A, 15B:
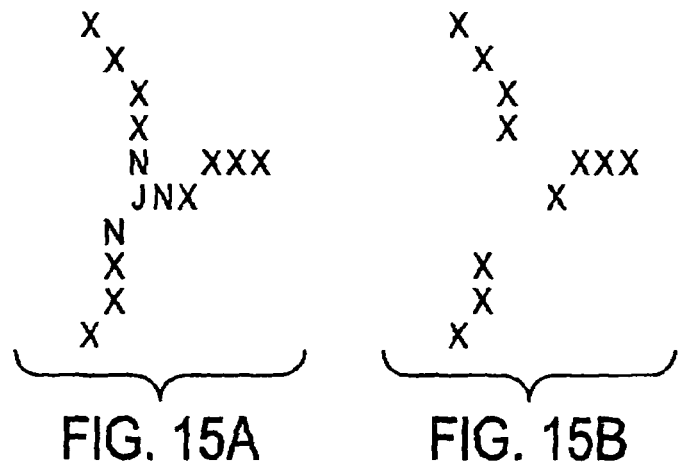
FIGS. 15A and 15B respectively illustrate a segment before and after the junction has been removed.

After line segment cleaning is performed in the magnitude maximization process, the junction pixels and their immediate neighbors are temporarily removed. FIGS. 15A and 15B illustrate a segment before and after the junction has been removed. In FIGS. 15A and 15B "J" represents a junction pixel, "N" represent a pixel within a 3×3 neighborhood of the junction pixel, and "X" represents non-background pixels. To determine whether a pixel is a junction pixel, its eight neighbors are checked in a circular fashion. If more than two transitions from background to edge to background are found, the center pixel is determined to be a junction pixel. It will be recognized that a background pixel is one whose gradient magnitude is zero. Using the junction illustrated in FIG. 15A, first the junction pixel and all of its neighbors in its 3×3 neighborhood are removed producing the result illustrated in FIG. 15B. The information regarding the junction pixel and the pixels within its 3×3 neighborhood is saved so that these pixels can be restored later in the processing.

Next, all pixels on the same line segment are set to the highest gradient magnitude value of that line segment. This is performed by labeling the line segments, finding the maximum gradient value for each labeled line, and then setting all pixels with the same label to that maximum gradient magnitude value.

As discussed above, the information regarding the deleted junction pixels and their 3×3 neighbors was saved. Accordingly, the deleted junction pixels and their neighbors are restored, at the same time setting their gradient magnitude to the highest value in each pixel's 3×3 neighborhood. This step ensures that the previously deleted pixels have the maximum value of the line segment to which they are connected.

The last step of the primitive extraction processing includes applying a local mean gradient magnitude threshold to delete weak edges in the image. This threshold is a percentage of the mean gradient magnitude value for an N×N neighborhood. The size of the neighborhood depends on the resolution of the image. The percentage threshold is related to the size of the neighborhood. For example, if the resolution is greater than 1.85 meters, a 16×16 neighborhood and a threshold percentage of 3.5 are used. Otherwise, a 32×32 neighborhood is employed with a threshold percentage value of 3.0. Accordingly, the image output from magnitude maximization processing block 815 is processed such that the gradient magnitudes of each pixel in the N×N neighborhood are set to the mean gradient magnitude for the N×N neighborhood, thereby generating a local mean image. The percentage value is then multiplied with the local mean image to obtain a scaled local mean image which is used to threshold the image output from magnitude maximization processing block 815. Those pixels that have a corresponding gradient magnitude below the threshold value are deleted in the image output from magnitude maximization processing block 815. This ends the processing for the primitive extraction processing block 620.

The majority of the low level processing algorithms have a goal of extracting the most important edges or lines while removing much of the noise or clutter pixels. This is usually achieved using a technique known as thresholding. However, it has been recognized that to achieve optimal results a single image may require different thresholds for different areas or sub-images. An algorithm processing an image should be aware of these requirements in order to perform the required dynamic thresholding. The present invention employs a busy mask to denote areas that require higher gradient magnitude thresholds than the blander areas of the image. In other words, the busy mask processing block 625 generates a third image identifying portions of the image for which an average gradient magnitude of the portion is greater than a threshold. The end result is a more accurate output image with less noise and clutter pixels.

Figure 16:
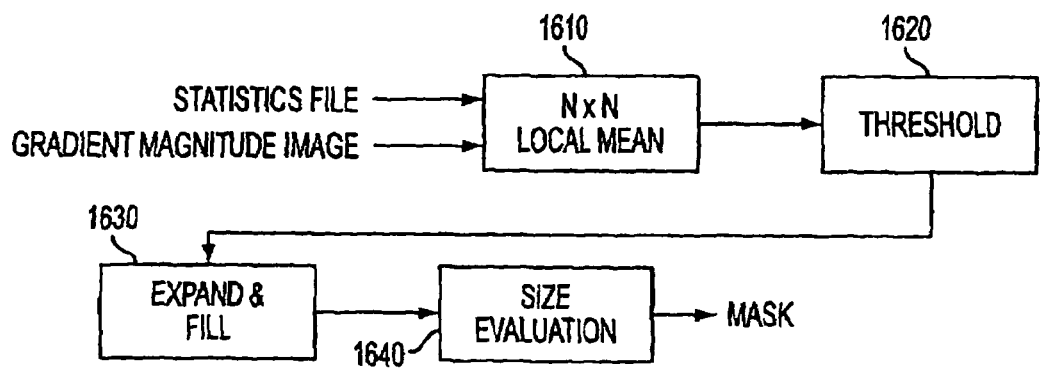
FIG. 16 illustrates the overall operation of the busy mask processing block of FIG. 6.

FIG. 16 illustrates the overall operation of the busy mask processing block 625. The present invention employs a gradient operator to measure the "busyness" for each pixel compared to its neighbors by computing the gradient magnitude of each pixel. The greater the gradient magnitude, the busier the texture. Accordingly, one input to the busy mask processing block is the gradient magnitude image created from the Sobel operator. A second input is the statistics file generated by the primitive extraction processing block 620. As illustrated in FIG. 16, the statistics file and gradient magnitude image are input to processing block 1610 where an average of the gradient magnitudes is computed over an N by N neighborhood to obtain a local measurement of the gradient magnitudes for a particular portion of the image. The window size for the local mean processing is determined based on the resolution of the imagery, and can be either, for example, a 16×16 or a 32×32. The output of the local mean processing block 1610 is input to threshold processing block 1620. The threshold processing block 1620 compares the values of the local mean for each portion of the image to a global mean of each of the local means. The output of the threshold processing block 1620 is input to processing block 1630 where any small holes in the mask are filled by a series of 3×3 dilations, i.e., expansions. The output of the expand and fill processing block 1630 is input to size evaluation block 1640. The size evaluation block 1640 removes portions of the image that are less than a predetermined size, e.g., less than 5,000 pixels. The result of the size evaluation processing block 1640 is output as a busy mask, i.e., a third image identifying portions of the image for which an average gradient magnitude of the portion is greater than a threshold.

Figure 17:
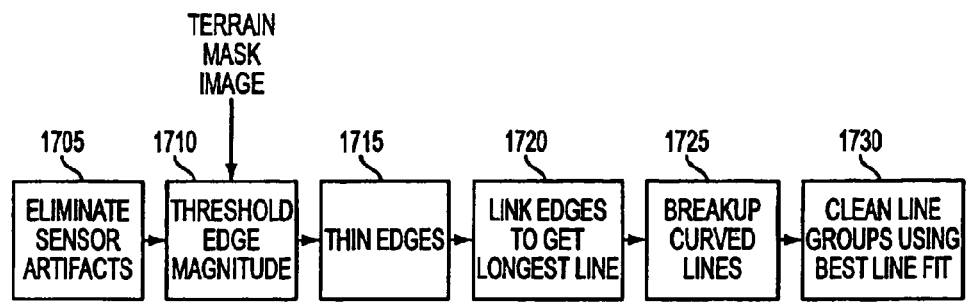
FIG. 17 illustrates the processing performed by the line extraction processing block of FIG. 6.

After creating the busy mask, the line extraction is performed to generate a line mask image. Specifically, having completed the gradient magnitude thresholding in the primitive extraction processing block 620, the stronger edges are then converted into straight lines. FIG. 17 illustrates the processing performed by line extraction processing block 630. Initially, sensor artifacts are eliminated in processing block 1705. These sensor artifacts are removed since they can significantly skew the edge statistics and line analysis. The sensor artifacts are detected and eliminated based upon the type of sensor being processed. For example, for scanned sensor arrays artifacts appears as long line segments in the scan direction. For steering arrays, scan sensor artifacts appear as fixed pattern noise. Accordingly, in either case the artifacts are detected and eliminated from the extracted edge image using known techniques.

To reduce the edge data and to create a binary mask of the strongest edges in the original resolution image, processing block 1710 applies gradient magnitude threshold to the gradient vector image received from processing block 1705. Processing block 1710 also receives a terrain mask image produced by terrain identification processing block 215. Specifically, processing block 1710 employs the terrain mask image to determine a local threshold for each particular type of terrain in the image. The threshold is a percentage of the mean gradient magnitudes for each terrain region, and can be for example, a value of 1.5%. Those pixels which have a corresponding gradient magnitude below the threshold are deleted. The terrain mask image provided by terrain identification processing block 215, in addition to an identification of terrain type, can contain information on clouds, rivers, river edges, and vegetation in the image. This information is employed to mask the cloud, river, river edges, and vegetation in the image to prevent false nominations of man-made activity. However, since information about clouds and rivers may not have been determined yet, the terrain mask may comprise only the identification of the terrain types present in the image.

As discussed above, the present invention employs a local threshold to prevent the deletion of objects, and to reduce clutter. For example, if a region in an image were composed of forest or rocks with an object in an adjacent field, and a global gradient magnitude threshold were used, the threshold might remove the object because the busyness of the forest or rocks would make the threshold extremely large. Similarly, by employing a global gradient magnitude threshold, if a region is bland with the exception of a few rocks, the threshold will be low which will allow more clutter through in the rocky area.

Processing block 1715 receives the thresholded gradient vector image to thin the remaining edges in the image. At each edge pixel one of the four templates illustrated in FIGS. 18A through 18D is employed, depending upon the gradient direction of the particular pixel. As illustrated in FIGS. 18A through 18D, each template is employed for two edge directions. In FIGS. 18A-18D "e" represents an edge pixel and "x" represents pixels which are examined for the thinning procedure.

Figure 18A:
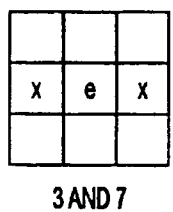
FIGS. 18A-18D illustrate the edge thinning templates employed in accordance with exemplary embodiments of the present invention.
Figure 18B:
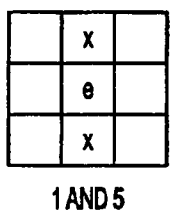
Figure 18C:
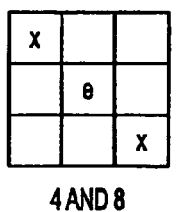
Figure 18D:
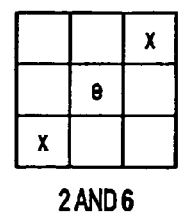
Figure 19A:
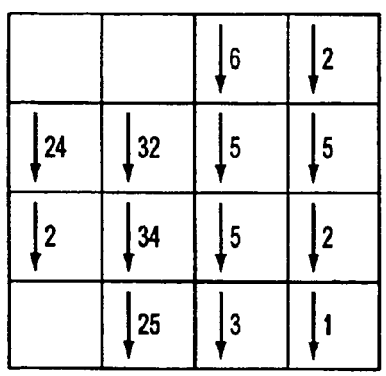
FIGS. 19A and 19B respectively illustrate a plurality of pixels before and after edge thinning.
Figure 19B:
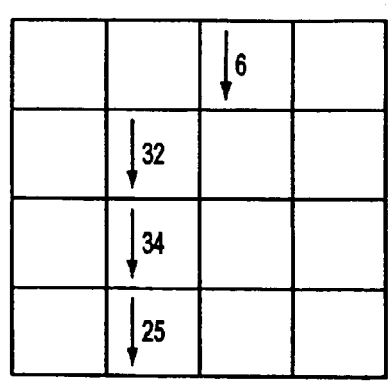

FIGS. 19A and 19B respectively illustrate a plurality of pixels before and after edge thinning. In FIG. 19A each remaining gradient vector pixel has a gradient direction of 7. Accordingly, at each gradient vector pixel the template illustrated in FIG. 18A is employed. Specifically, at each edge pixel the pixels to the left and right of the particular pixel are examined. If the pixel to the left or to the right does not have a gradient direction of 7, this pixel is set to zero and not further considered. The pixels to the left or right which have the same gradient direction as the pixel being considered are examined to determine their gradient magnitude. If the gradient magnitude of the pixel being considered is greater than or equal to both the pixel on the left and the right which has the same gradient direction as the pixel being considered, the pixel being considered is retained. If the pixel being considered does not have a gradient magnitude greater than or equal to both the left and right pixels with the same gradient direction, then the gradient magnitude for that pixel is eliminated from the output image.

As illustrated in FIG. 19A, in the top row the gradient magnitude of 6 is greater than the gradient magnitude of 2; in the next row the gradient magnitude of 24 is less than the gradient magnitude of 32, which is greater than the gradient magnitude of 5; the gradient magnitude of 34 is greater than the gradient magnitudes of 2 and 5; and the gradient magnitude of 25 is greater than the gradient magnitude of 3. Accordingly, in the top row of the gradient magnitude of 6 is retained, in the next row the gradient magnitude 32 is retained, in the next row the gradient magnitude 34 is retained, and in the last row illustrated in FIG. 19B the gradient magnitude 25 is retained.

Figure 20A:
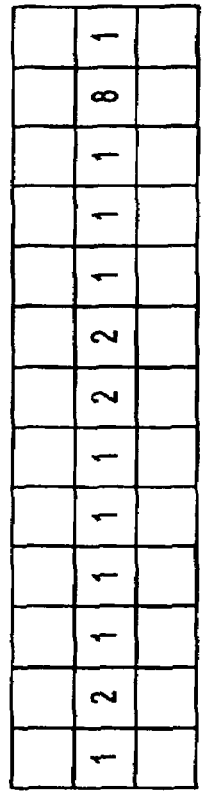
FIGS. 20A and 20B respectively illustrate a thinned edge representation with no noise and a thinned edged representation with noise.
Figure 20B:
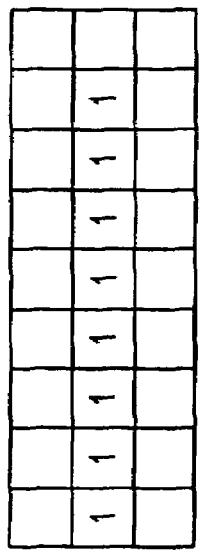
Figure 20C:
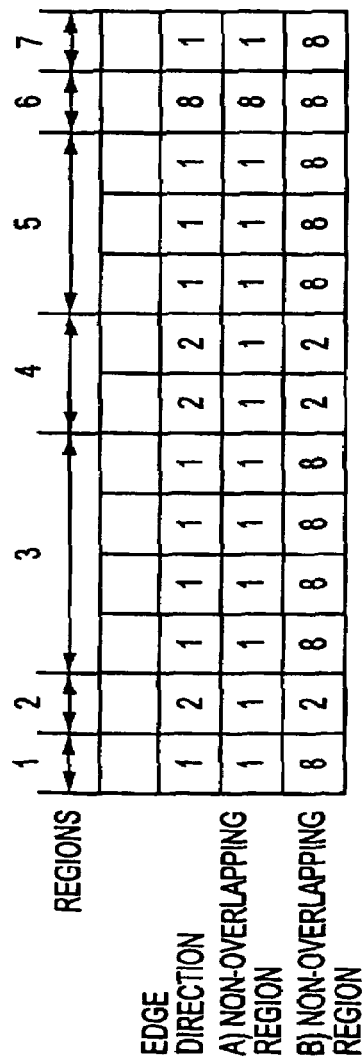
FIG. 20C illustrates the segmentation of a thinned edge with noise in accordance with exemplary embodiments of the present invention.

After the thinning operation has been performed on every pixel in the gradient vector image, an image with the remaining thinned edges is passed to processing block 1720. Processing block 1720 attempts to convert the thinned edges into straight line segments by linking the thinned edges. The present invention employs the gradient directions in the attempt to link the edges. Ideally, a straight horizontal edge will consist only of gradient directions labeled "1", as illustrated in FIG. 20A. However, noise may be present in the image. Accordingly, as illustrated in FIG. 20B, a horizontal edge consisting of only directions labeled "1" may appear to have other directions present, e.g., "2" or "8". To prevent the identification of many small regions in the image, in view of the presence of noise in the image, the present invention groups like directions into similar regions. Accordingly, a gradient direction labeled with direction "1" can be grouped with either a gradient direction of "2" or "8". If this grouping were not performed, then the noise would result in many small regions rather than a few large regions. For example, as illustrated in FIG. 20C, due to the noise the edge directions illustrated in FIG. 20B would be broken down into seven different regions. To overcome this problem, as illustrated in FIG. 20B, two non-overlapping regions are created. Non-overlapping region "A" is formed from all gradient directions of "1", "3", "5", and "7". Similarly, non-overlapping region "B" comprises gradient directions "numeral 2", "4", "6", and "8". Region "A" will be selected since it contains twelve "1"s, while region "B" contains 10 "8"s. The forming of regions performs a smoothing process that assists in removing some of the noise in the linked edges.

Processing block 1725 receives the gradient vector image with the linked edges from processing block 1720 to breakup any curved lines. It has been recognized that regions with a slight curvature may be incorrectly represented in the image as a straight line. Specifically, when grouping gradient directions, edges with gradual curves may not be properly separated resulting in one long region, rather than several short regions, being extracted in the image. To prevent this regions are broken into 30 pixel regions and then the best-fit line is computed for the small regions. If an edge is straight and longer than 30 pixels, the edge will be detached into several lines no longer than 30 pixels in length, but will be reconnected in subsequent processing steps as described below.

Figure 21A:
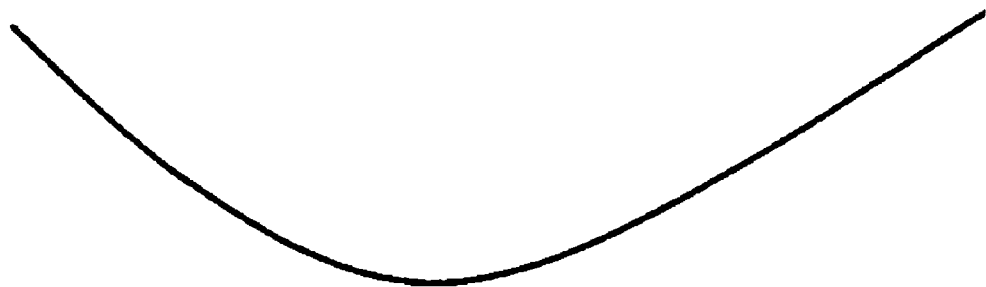
FIGS. 21A and 21B respectively illustrate a region with a slight curvature and a best fit line for the region with a slight curvature.
Figure 21B:
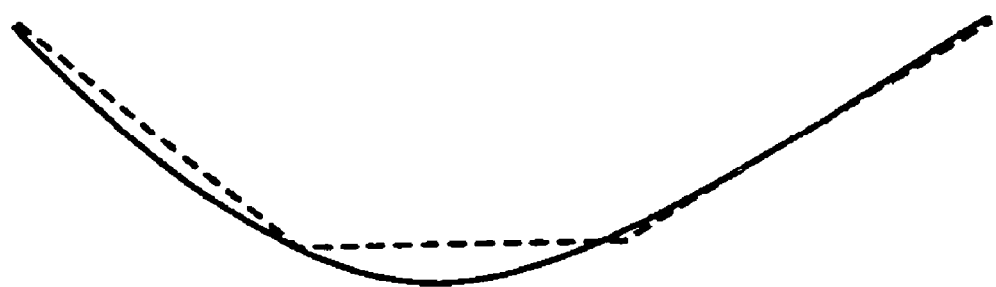

Once the edges are broken into 30 pixel segments a straight line approximation can now be calculated for each region. This straight line approximation is computed by calculating the slope and center of mass for each region. A straight line that best fits the calculated slope and center of mass is created. This reduces each region into a straight line of a single pixel width. FIG. 21A illustrates a region with a slight curvature, while FIG. 21B illustrates the straight line approximation of this region. Once the line segments are extracted, pertinent data for each line is calculated, including the slope, the end points, the Y-intercept, and length. This data is then placed into a line segment table. For optimal processing, line segments are organized by their slope as a value between 0 and 179 degrees. Line strength is a feature that measures the percentage of pixels on a line segment which passes the gradient magnitude threshold. The line strength feature is helpful in deleting clutter lines. A metric is incorporated that takes care of line length, allowing for greater slope tolerance in shorter line segments. An image containing the shorter cleaner line segment is output from processing block 1730, thereby ending the processing of line extraction processing block 630.

After line extraction processing has been performed, segmentation processing is performed. The present invention employs an edge-based segmentation technique and the Perkins segmenter to perform segmentation. Two key parameters with which drive the performance are the edge threshold and the minimum region size. Typically, a programmer must commit to some static configuration of these parameters prior to processing the image. This will lead to non-optimal results since each image or image sub-area will have its own optimal segmenter arrangement. Accordingly, by employing an adaptive segmentation technique that automatically adjusts the parameters to suit the particular scene in the image, the present invention will provide superior performance to that of a non-adaptive version of the same technique.

Figures 22, 23:
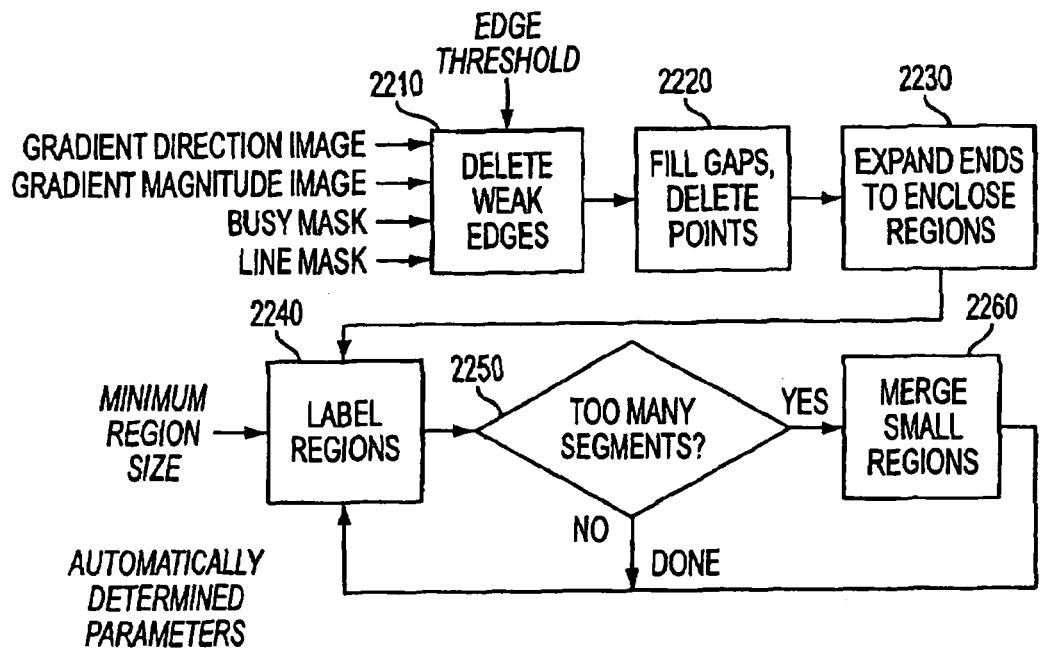
FIG. 22 illustrates the processing performed by the segmentation processing block of FIG. 6.
FIG. 23 illustrates the templates for vertical and horizontal point deletion or gap filling.

FIG. 22 illustrates the processing performed by segmentation processing block 635. In general, the segmentation processing block segments the image into a plurality of regions. Each region will either be an object of interest or a background region. As illustrated in FIG. 22, the inputs to the segmenter are the gradient magnitude image, the gradient direction image, the busy mask image, and the line mask image. The first step in the segmentation processing is to threshold the gradient magnitude image in order to delete the noise and clutter pixels. Processing block 2210 employs a two step threshold approach. First, a local mean operator is used to delete the weak edges in a 5×9 neighborhood. The line mask image is employed to preserve linear features that may be on weak edge segments. For each neighborhood in the gradient magnitude image, the local mean is calculated and all pixels with a gradient magnitude less than a certain percentage of the local mean, and which are not masked by the line mask image, are deleted. The corresponding pixels in the gradient direction image are removed as well. Next, a global threshold is applied to the gradient magnitude image. The present invention employs two distinct global thresholds, one for pixels in the busy mask area and one for bland areas of the image. The thresholds are a percentage of the mean gradient magnitude value for the entire image. The segmenter automatically determines the percentage used. The line mask image is again used to preserve weak lines that are possible linear features. Those pixels that have a corresponding gradient magnitude below the threshold value and do not have a corresponding pixel in the line mask image are deleted. The associated pixels in the gradient direction image are also removed.

Next, vertical and horizontal gaps of one pixel between edges are selectively filled by processing block 2220. The templates illustrated in FIG. 23 are employed to fill the gaps. Specifically, if any of the templates match the image data, the center pixel value is set to a "1". Once these gaps have been filled, isolated edges less than 4 pixels in length are deleted.

Processing block 2230 fills small gaps and preserves small regions of uniform intensity. The present invention employs an iterative cycle of expansion, labeling, and contraction of the edge pixels. A region is a group of one or more non-zero adjacent pixels. In accordance with the present invention, active edge points are edge pixels that touch only one region, i.e., edge pixels which are isolated. Inactive edge pixels are adjacent to two different regions. Initially, all edge points are active. At the beginning of each iteration, the edge pixels that are connected to two different regions are changed to inactive.

Expansion involves dilation of the active edge points to close small gaps. In this step, pixels being changed to edge points are labeled as temporary edge points. The resulting connected regions are then given a unique label and finally the temporary edge points are contracted, i.e., thinned. It is important that the edges are thinned to a single pixel width so that when an edge point is along the boundary of two regions it will be immediately adjacent to pixels of both regions. The temporary edge points can be removed in the contraction operations if they have not been successful in closing a gap in the boundary. Next, the regions are uniquely labeled, e.g., numbered, and small regions less than an automatically determined number of pixels are eliminated in processing block 2240.

The last step in the segmentation process involves the determination of whether the gradient magnitude image is properly segmented. This is performed to prevent over-segmentation from occurring. Accordingly, after segmenting the image, processing block 2250 determines the number of regions obtained. If this is greater than a reasonable number, then smaller regions, which usually represent edge noise, are merged into the background in processing block 2260. A value which represents a reasonable number of regions is dependent upon the number of pixels which make up the image and upon how busy the image is. In an exemplary embodiment, the reasonable number value can be set using the range 250-500. Next, a new region count is determined. This check ensures that weaker edges that are part of larger regions are preserved without over-segmenting the image. The output from the segmentation processing block is an image of labeled regions, sequentially assigned values from one to the total number of regions segmented.

As described above, the edge thresholds and the minimum region size are automatically determined parameters for the Perkins segmentation process. A rule base is employed in the segmentation process to derive these values. The edge thresholds are dependent upon the average gradient magnitude strength of the entire image at the original resolution, the busy mask, and the terrain type. The edge threshold is a percentage of the average gradient magnitude strength. To determine the edge threshold, the higher the average gradient magnitude strength, the lower the percentage, and hence, a lower edge threshold used. The minimum region size is based upon the resolution of the image and can range from 5 to 50 pixels.

After segmenting the image, background regions are determined and various regions are merged by processing block 640. The segmentation process results in the entire image being divided into separate regions. The next step is to determine which of those regions are actually background regions, thereby leaving only those non-background regions to be run through the rest of the processing. Normally, the background region will be the largest region in terms of number of pixels. However, this may not always be the case. Accordingly, in the present invention, a check for "spanning" regions that are segmented due to edges that pass from one image border to another is performed. Hence, the background regions are determined based on their area and their adjacency to the image borders. Regions that span from top to bottom or from left to right are assigned as background. A region that is located at a corner is assigned as background if it is larger than a percentage of the image, the percentage based upon the image resolution. The result of this process ensures all background regions are labeled the same unique number, i.e., each pixel in a background region is set to the value "1".

Many edge-based segmenters tend to break larger regions into several small regions, especially when the thresholds are set low to extract accurate boundaries for all regions of interest. Therefore, after segmentation and background determination, the present invention merges adjacent regions into one unique region. This technique consists of marking the outer edges of adjacent regions, and then removing the inner edges between them to form the new merged region. Region merging is performed to avoid disrupting the desired boundaries, while reducing the number of regions to process. Accurate boundaries result in feature computations that are more exact, and therefore, allow for more correct classifications. Another reason the region merging technique is employed in the present invention is to obtain a more precise area calculation for the object of interest.

After region merging, the objects of interest will be located in regions which have been labeled as being unique from the background. In addition to the objects of interest, clutter objects may exist in the segmented regions which have been labeled as non-background regions. The feature extraction processing block 645 attempts to quantitatively describe an object in a region. Once the regions contained in an image have been segmented, statistics are accumulated which numerically characterize each region. As with the segmentation process, specific features for the given application must be derived.

The first feature that is calculated to help distinguish the objects of interest from the clutter in the image is the size of the regions containing the objects. A broad size evaluation is performed for each region to achieve a very general size elimination procedure. First a pixel count is performed for each region. Next, the area of a pixel is calculated for the image at the third resolution. The area of each region is then computed and compared to a maximum and a minimum value. If a region is too small or too large, it is merged into the background. Seldom will any object be rejected as being too big, but many small clutter objects are eliminated. The maximum and minimum region sizes are based upon the image resolution. The maximum region size employed can be, e.g., 40 million per area of a pixel, and the minimum region size is 20,000 per area of a pixel. The regions that pass the broad size evaluation are then analyzed further.

It is at this point that the processing performed to identify clouds diverges from the process performed to identify manmade objects. To identify manmade objects, the statistical features used are average gradient magnitude, standard deviation of gradient magnitude, and area, perimeter, width and length of the region. In addition to these, three other features are also calculated. The first determines how many regions were originally in the segment before the adjacent regions were merged. This feature can help distinguish between cultivated agriculture, which will have many regions comprising the segment, and a large singular manmade item such as an airfield or road, which will have fewer regions on the segment. The next two features count the number of parallel lines and collinear lines that overlay each segment. These features are also important in discerning between agriculture and roads/buildings. After these features are calculated, the next step is performed in the classification processing block 650.

Continuing with the processing to identify manmade activity, the definition of an object for this processing is one of four classes: road, structure, agriculture, or other manmade activity. Hence, the classifier separates the manmade objects from the clutter. To reduce false alarms, the classifier also identifies scan lines and any other sensor anomalies. Each region that passes the broad size evaluation is passed through a rule-based classifier that determines one of the classes of scan line, agriculture, road, structure, other manmade activity, or clutter. The rules are executed in the following order for each region.

First the scan line set is called. The average gradient magnitude of the region is compared to the average gradient magnitude of the image, and the standard deviation of the gradient magnitudes is examined for each region. Agriculture rules are invoked next. These rules measure the size of the region, the number of parallel lines in the region, the number of regions originally comprising the region, and the number of collinear lines in the region. If the object is not agriculture, then the rules that determine linear activity are employed. These rules use the region's area, the region's length to width ratio, the number of parallel and collinear lines in the region, and the number of regions in the image.

The last set of rules to be invoked are the building rules. These rules employ the area, the length, the width, the perimeter, the length to width ratio, and the number of parallel lines to classify regions. The objects that are not assigned a class by any of these rules default to clutter. Accordingly, the output of the classification processing block 650 is an image with identified regions of manmade activity, these identified regions each containing an object.

Returning now to the feature extraction processing block 645, the subsequent processing for identification of clouds will now be described. To identify clouds, the statistical features which are employed are average gradient magnitude, standard deviation of gradient magnitude, area, perimeter, width, and length. In addition to these three other features are calculated. The first determines how many regions were originally in the region before the adjacent regions were merged. The next two features count the number of parallel lines and collinear lines that overlay each region. After these features are calculated, the next step is classification.

A cloud threshold is calculated based upon the original image terrain which can be determined a priori, e.g., either by terrain identification processing block 215 or via cartographic information 210, whether snow is likely (determined a priori and from checking the image maximum and average intensities of the original image), the average intensity and the standard deviation of the original image. This cloud threshold is used here and in subsequent cloud detection modules in the determination and classification of cloud regions. To reduce the cloud false alarm rate, bright objects that are not clouds, such as snow, ice, or reflection on bodies of water, are classified into the category of snow/ice. The classifier also marks scan lines, which are linear image anomalies caused by sensor scanning. Each segment that passed the broad size evaluation is passed through a rule-based classifier that determines one of the classes of: scan line; cloud; snow/ice; or other, i.e., non-cloud. The rules are executed in the following order for each segment.

First, the scan line set is called, followed by the snow/ice rule set. For both sets, the average gradient magnitude of the region is compared to the average gradient magnitude of the image and the standard deviation of gradient magnitudes is examined for each region. For snow/ice, these bright objects usually have average gradient magnitudes that are much greater than the image's mean gradient magnitude, and the deviation is often high. The next set of rules invoked are those which classify clouds. These rules also examine the average gradient magnitude and standard deviation of each region, and determine if the shape of a region is cloud-like, i.e., non-rectangular. The absence of linear structure is also required by the cloud rules.

Figure 24:
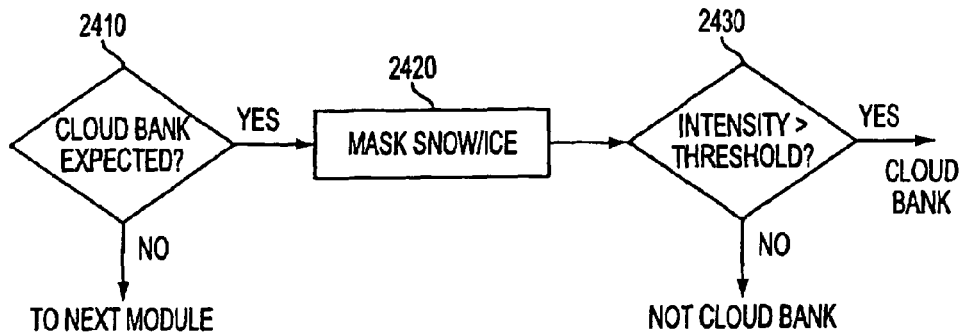
FIG. 24 illustrates exemplary processing performed by cloud bank identification processing block of FIG. 6.

While the majority of clouds are segmented and classified correctly by the processing described above, the cloud banks may not always be segmented. Cloud banks are larger areas of total cloud coverage. Cloud banks are identified as areas of high gradient magnitude and are usually in the busy mask as separate regions. FIG. 24 illustrates the processing performed by cloud bank identification block 655. To identify cloud banks, the likelihood of their existence is checked by examining certain image statistics. These image statistics include the standard deviation of gradient magnitudes for the entire image at the third resolution, the maximum gradient magnitude for the entire image at the third resolution, and the range of gradient magnitudes (max-min) for the entire image at the third resolution. If the standard deviation, e.g., greater than 100, and the maximum gradient magnitude is large, e.g., greater than 900, and the gradient magnitude range is wide, e.g., the difference between the maximum and minimum gradient magnitude values is greater than 500, then the cloud bank module continues. If these conditions are not met, then the processing of the image by the cloud bank identification block 655 is complete and further processing is performed by cloud refinement block 660.

If the cloud bank is expected ("YES" path of decision step 2410), then the snow/ice found by the classification module is masked in (step 2420) to ensure that they will not be identified as a cloud bank. Next, the average gradient magnitude of each region in the busy mask is compared to the cloud threshold. Those regions that have a gradient magnitude value greater than the threshold are considered cloud banks and passed into the cloud ("YES" path out of decision step 2430). Those regions which do not have an intensity value greater than the threshold are identified as not being cloud banks and the processing for these segments of the image ends.

Figure 25:
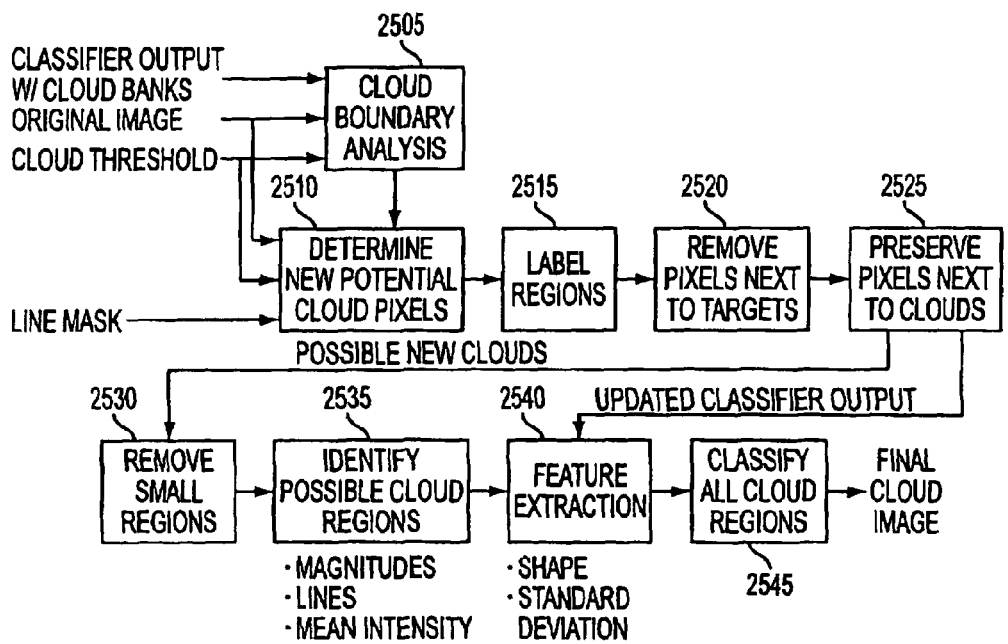
FIG. 25 illustrates a functional flow of the cloud refinement processing block of FIG. 6.

The purpose of the cloud refinement module is to provide a more accurate boundary around the cloud/cloud banks, and to detect new cloud regions that were not segmented, and therefore, could not be classified as clouds. FIG. 25 illustrates a functional flow of the cloud refinement processing block 660. The first step is the cloud boundary analysis. The input to the cloud boundary analysis processing block 2505 is the classification image which has any objects found by other classifiers, all clouds and snow/ice identified in the classification module, and any cloud banks that were found. All pixels in the original downsampled image at a third resolution that correspond to any pixels in the classification image that are labeled cloud or cloud bank are checked to see if their intensity values are above the cloud threshold. If the intensity values are not above the threshold, then the pixels in the classification image are set to zero. After this deletion of pixels, it is possible that regions which are too small to be clouds are still labeled as clouds. Next, any cloud region less than 11 pixels are deleted. In processing block 2510, new potential cloud pixels are determined. Specifically, the identification of any clouds that were not segmented/classified, or were not part of a cloud bank are identified. All pixels that have not been classified are examined to determine whether they are above the cloud threshold, with the requirement that no linear structure is under them. A new possible cloud region image is generated from those pixels that meet these requirements. These new possible cloud regions are uniquely labeled by processing block 2515.

Next, any region that is adjacent to an object is removed and any new region that is adjacent to a cloud is labeled as a cloud by processing blocks 2520 and 2525. Adjacency can be defined as a 3×3 neighborhood. All remaining regions are then checked for sufficient size, e.g., greater than 10 pixels, and small regions are deleted in processing block 2530.

Next, the regions are examined to determine if they have cloud-like characteristics by processing block 2535. The rules used for this decision process determines if each region is a possible cloud by examining the mean intensity of the region, the number of linear features and magnitude pixels under the region, and the area. All regions that meet the criteria are labeled and output as a separate image. This image, along with the updated classification image, are then passed to feature extraction processing block 2540. Feature extraction processing block 2540 again checks the features on the new, as well as the updated cloud regions, to ensure that they are still cloud-like. The last step is performed by processing block 2540 to classify all the new or updated regions into cloud or snow/ice. The image terrain type, the likelihood of snow, the cloud threshold, the region size, the region average intensity and intensity standard deviation (for the original image at a third resolution processed blocks 2510-2540), average gradient magnitude and gradient magnitude standard deviation (for the updated classification image), and a gray level co-occurrence feature are used to classify the regions and generate the final cloud image.

Bodies of Water

This portion of the processing identifies bodies of water, and bright or dark non-water regions in visual imagery. The bodies of water can include a river, lake or ocean. In addition to identifying bodies of water, the present invention also identifies the banks or edges of the water as being distinct from the body of water. The techniques of the present invention can process extremely large images corresponding to hundreds of mega-pixels. The present invention employs the complete pixel dynamic range in the identification of bodies of water, and in particular employs a multi-resolution approach which outputs two images, one at each resolution. These outputs will be herein referred to as river mask images.

Figure 26:
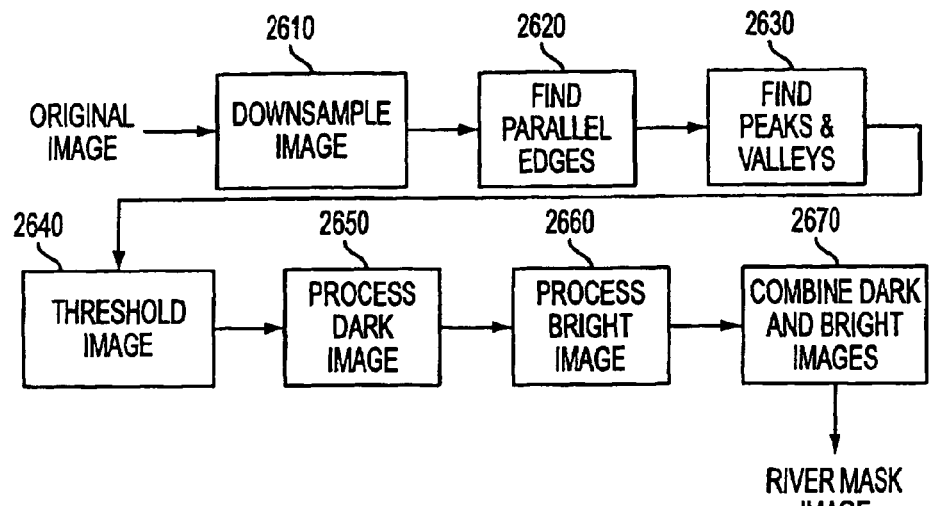
FIG. 26 illustrates the large scale processing performed to identify bodies of water in accordance with exemplary embodiments of the present invention.

In the multi-resolution approach of the present invention, the coarse resolution imagery, i.e., the original image downsampled to a third resolution, will be between 16 and 32 meters, while the medium resolution imagery, i.e., the original image downsampled to a second resolution, is between 4 and 8 meters resolution. FIG. 26 illustrates the large scale processing performed to identify bodies of water. If the original image is not at the proper resolution then the image will be downsampled as illustrated in processing block 2610. Since the processing illustrated in FIG. 26 operates using large scale processing, the original resolution image will be downsampled twice to achieve an image at a third resolution, i.e., the coarse resolution image. It will be recognized that the downsampling performed can employ the same techniques described above in connection with FIGS. 7A-7D. In addition, although FIG. 26 illustrates a separate downsampling processing block, the downsampled image produced by the cloud identification processing module in processing block 610 can be employed instead of performing a new downsampling on the original image to produce the coarse resolution image at a third resolution. Using the downsampled image parallel edges are identified by processing block 2620.

Figure 27:
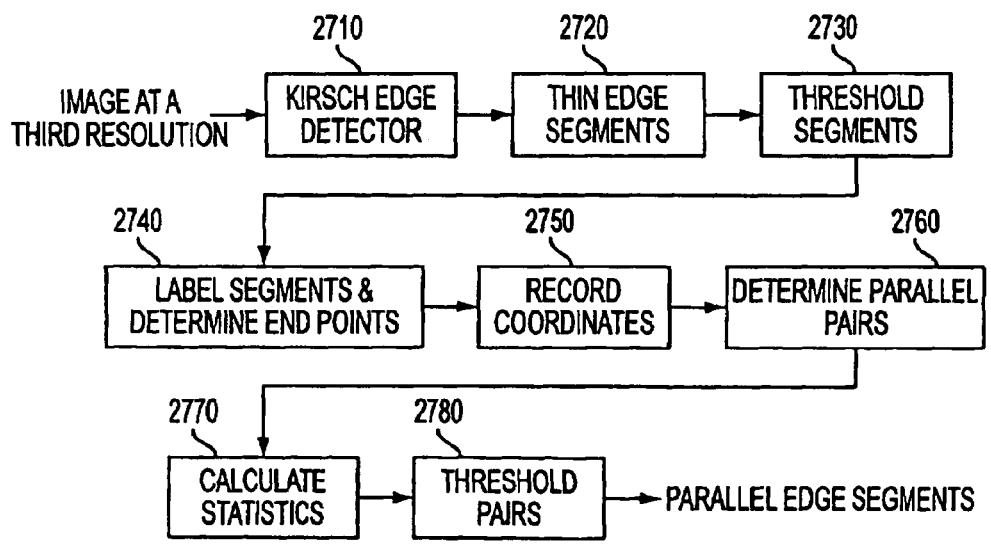
FIG. 27 illustrates the processing performed in parallel edge processing block of FIG. 26.

FIG. 27 illustrates the processing performed by the find parallel edges processing block 2620. The downsampled image at a third resolution is processed by Kirsch edge detector processing block 2710 to identify edges, i.e., areas of the image which border regions of different intensities, in the image at a third resolution. Processing block 2720 thins the identified edges to single pixel line segments. Next processing block 2730 applies a threshold to remove weak lines, i.e., lines which have small gradient magnitude values, from the thinned edge image. The threshold can be set such that, for example, the top 50% of the lines are retained. Processing block 2740 uniquely labels the lines remaining after thresholding and identifies end points for each labeled line. Processing block 2750 records the X, Y coordinates of each pixel on each labeled line.

Processing block 2760 is invoked to determine which edges are parallel. For each labeled line, each pixel on the line is compared to all the pixels on the other lines. Statistics are calculated to determine if two labeled lines are parallel. To determine if two labeled lines are parallel, each labeled line's starting pixel is compared to all of the other lines pixels to find the minimum distance. This minimum distance pixel of the second line is then compared to every pixel of the first line to find the second minimum distance. If these two distances do not differ by more than 10%, the starting points have been found, and the first set of end points of the parallel portion of the line pair is stored. This same technique is then employed to find the second set of end points using the labeled line's ending pixel instead of the starting pixel. The two sets of end points are then checked to see if they cross, and then the processing block 2770 computes statistics. The statistics are the average of the distance between the two lines, the standard deviation of the distance change, and the length of the parallel match of each line pair. The statistics are used to determine whether a parallel line pair should be considered further as part of a river segment. Accordingly, processing block 2780 applies a threshold, based upon collected statistics, to the line pairs. The threshold can be based on the average distance and standard deviation of change, and is selected such that the smaller the average distance and the standard deviation of change are for the parallel lines, the more likely this pair is retained. After thresholding, a parallel edge segment image is then output to processing block 2630.

To identify the peaks and valleys, processing block 2630 generates an intensity histogram of the original image at a third resolution. From the intensity histogram the peaks and/or valley points are selected. It will be recognized that the peaks of an intensity histogram are those intensity values which are associated with a large number of pixels, while the valley is the intensity value associated with the fewest number of pixels. Processing block 2640 selects an upper and lower threshold at the peaks and/or valley points to separate the image into two distinct images, a bright image and a dark image. The bright and dark image are then processed separately.

The dark image is processed by processing block 2650. Initially, in the image output from the find parallel edges processing block 2620, the parallel line pairs are connected and the regions inside the connected parallel line pairs are filled, and then labeled. Each pixel within the region is checked to determine if it overlaps a non-zero pixel in the dark image. A tally of the number of pixels that overlaps with the dark image is counted for each region. A result image of dark processing is generated. Those regions that have at least 100 pixels tallied are written into the dark result image as dark water regions. A border is added around these regions. The remaining regions are written into the dark result image as dark, non-river regions. Any region that is in the dark image that does not overlap with the filled parallel line regions is also written into the dark result image as dark non-river region. A border is also added around these regions.

Processing block 2660 processes the bright image. Initially, in the image output from the find parallel edges processing block 2620, the parallel line pairs are connected and the regions inside are filled and then labeled. Each pixel within the region is checked to determine if it overlaps a non-zero pixel in the bright image. For each region a tally of the number of pixels that overlaps with the bright image is counted. A result image of bright processing is generated. Those regions that have at least 100 pixels tallied are written into the bright result image as bright river regions, and a border is added around those regions. The remaining regions are written into the bright result image as bright non-river regions. Any region that is in the bright image that does not overlap with the filled parallel line regions is also written into the bright result image as bright, non-river region. A border is added around these regions. Finally, the results of the dark and bright processing are combined in processing block 2670 to produce a third image identifying bodies of water in the image at a third resolution, thus ending the processing performed on the coarse resolution image.

Figures 28, 29A, 29B:
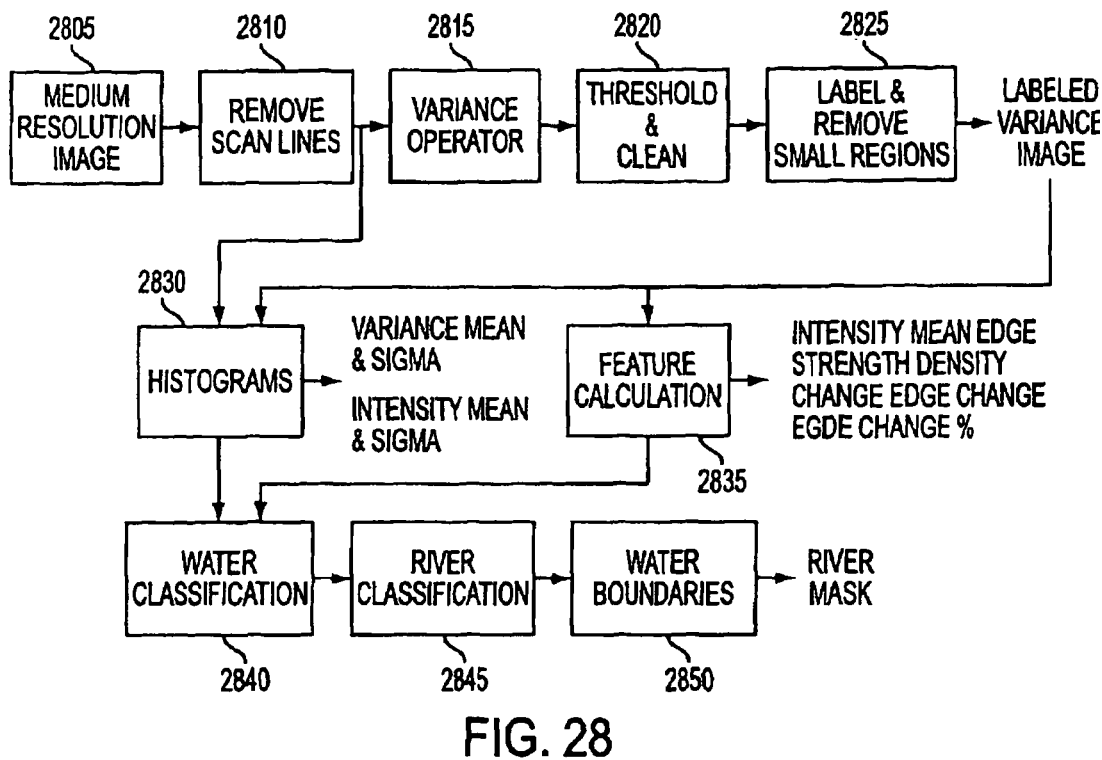
FIG. 28 illustrates the processing performed on the medium resolution image for identification of bodies of water in accordance with exemplary embodiments of the present invention.
FIGS. 29A and 29B respectively illustrate the filter employed in the variance operator processing block of FIG. 28, and the calculation of the values of the filter.

FIG. 28 illustrates the medium resolution processing. The medium resolution processing employs two primary features to distinguish water areas. The first feature is the intensity variance, which should be small between adjacent pixels in water areas in this type of resolution image. Second, the pixel intensity values in water areas are generally darker than the background in the image, except with frozen water or high glare conditions. Accordingly, the medium resolution processing identifies bodies of water by isolating dark pixel regions that have very low variance.

If the original resolution image exists, and if a medium resolution image has not already been produced, processing block 2805 downsamples the original resolution image to a medium resolution image at a second resolution. Next processing block 2810 removes scan lines. Since one primary feature measurement employed in the medium resolution processing is low variance, it is desirable to remove anomalies caused by scan lines in the intensity image at a second resolution. Specifically, scan lines tend to have high variance and may cause identified water regions to separate. To correct for this anomaly, processing block 2810 identifies groups of pixels that have a Δ between intensity values of adjacent pixels that is less than 5. If such a group of pixels exists, the processing block then looks in the next column of the image at a second resolution to see if there is a similar group of pixels that have a Δ of intensity values that is also less than 5. Next an average difference of intensity values across the columns is determined, and this average difference of intensity values is employed as a Δ correction for that column. To correct the data for a particular column, all of the Δ's for all previous columns are summed up to, and including, the current column, and each pixel's value is modified in that column by the Δ correction amount. This corrected intensity image is employed in all further processing at the medium resolution to identify bodies of water.

Processing block 2815 applies a variance filter to the image output by processing block 2810. FIG. 29A illustrates the filter employed by processing block 2815 and FIG. 29B illustrates how to calculate the values for the filter. The filter essentially measures the intensity variations from the mean intensity of the pixels. After the variance filter has been applied, a threshold is applied by processing block 2820 to remove any pixels in the variance output whose value is greater than 10. Processing block 2820 then cleans the variance output image using a spatial filter to perform a series of erosions followed by a series of dilations. The use of a spatial filter to perform erosions and dilations is described in more detail below in connection with FIGS. 33A and 33B. Processing block 2825 labels every region with a unique value and determines the number of pixels in each region. Any region smaller than 100 pixels is removed.

Processing block 2830 calculates histograms of both the variance image output by processing block 2825 and the corrected intensity image output by processing block 2810. Processing block 2830 next cleans the labeled variance image. To clean the labeled variance image it is first expanded twice. Specifically, the expansion involves changing the value of every zero pixel that has a non-zero neighbor to its neighbor's value. Next, the expanded image is shrunk twice. Shrinking is the reverse of the expansion process. The expansion and shrinkage fills in the holes in the labeled regions, as well as smooths the borders of the regions.

Processing block 2835 calculates features for each labeled region in the cleaned variance image. The first set of features is density change, edge change and edge change percent. These features are selected because water tends to have a uniform variance and smooth edges. The density change feature measures the amount of holes in the region. The edge change is a measure of the angle change going from one pixel to the next along the outline of the region. The edge change percent is the edge change value from the original to the cleaned variance image.

The next set of features which are calculated include edge strength and intensity mean. Due to the change in intensity going from water to land, the edge strength along the water is usually high. The edge strength feature is determined using the average edge strength for the entire region border. In addition, since the pixel values of the intensity image for water are low, another feature which is calculated is the intensity mean for each labeled region. Accordingly, processing block 2835 outputs the features of intensity mean, edge strength, density change, edge change, and edge change percent for each labeled region. Processing block 2830 outputs secondary features of variance mean, variance sigma, intensity image mean, and intensity image sigma for the entire image. These features are employed by water classification processing block 2840 to determine which regions are water. Of those regions which identified as water, the ones that are most river-like are identified by processing block 2845 and labeled by this processing block as a river. To classify bodies of water as a river, the length and width of the region is employed. Specifically, a ratio of length-to-width is employed. Since rivers are typically much longer than they are wide, a larger value of this ratio is more likely to be a river. Next, the water boundaries are identified by processing block 2850 which outputs an image with pixels labeled as water or river.

Small Scale Processing

Figure 30:
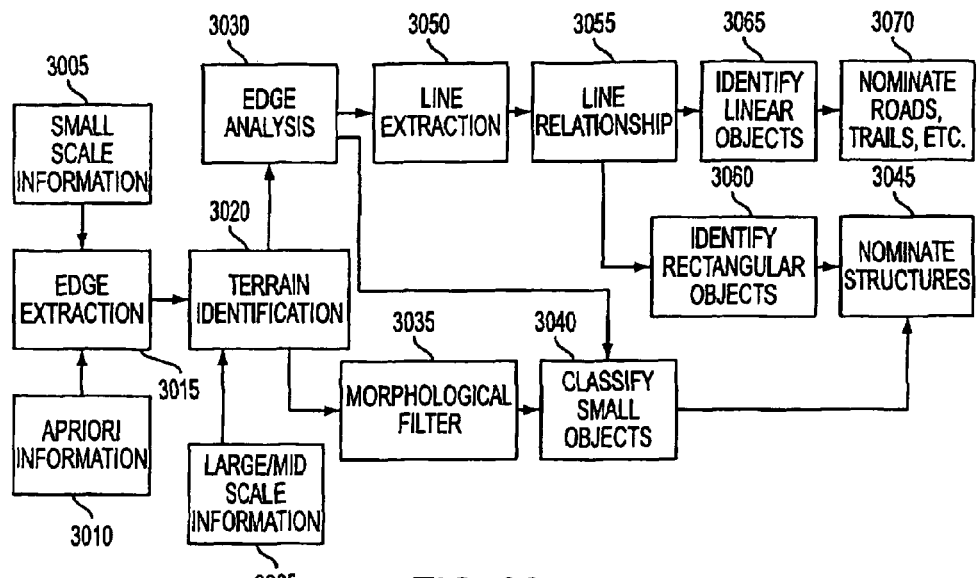
FIG. 30 illustrates the various processing performed on the small scale image.

As illustrated in FIG. 2, there are four types of processing which employ the original resolution imagery, this type of processing being collectively referred to as small scale processing. These four types of processing include small object detection processing, linear object detection processing, small scale lines of communication processing, and building/structure detection processing. Detection of lines of communication is performed using both midscale (images at a second resolution) and small scale (images at the first resolution) resolution imagery. Hence, the small scale lines of communication processing will be described in connection with midscale lines of communication processing. FIG. 30 illustrates the processing components employed for small scale processing except for small scale lines of communication processing. Not all of the processing blocks illustrated in FIG. 30 are employed in each of the small scale processing. However, the particular processing blocks employed in each of the different types of small scale processing will be identified below in connection with the description of such processing, and duplicate descriptions of the processing blocks which are employed in more than one of the small scale processing types are omitted in the description below.

As illustrated in FIG. 30, small scale information 3005 and a priori information 3010 are provided to an edge extraction processing block 3015. The edge extraction processing block 3015 provides information to terrain identification processing block 3020. Terrain identification processing block 3020 also receives large scale and mid-scale information 3025 from the processing performed on the downsampled versions of the original resolution image. The terrain identification processing block provides outputs to edge analysis processing block 3030 and morphological filter 3035. Edge analysis processing block 3030 and morphological filter 3035 provide outputs to small object classification processing block 3040, which in turn, provides an output to structure nomination processing block 3045. Edge analysis processing block 3030 also provides an output to line extraction processing block 3050. Line extraction processing block provides an output to line relationship processing block 3055. Line relationship processing block 3055 provides an output to rectangular object identification processing block 3060 and to linear object identification processing block 3065. Rectangular object identification processing block 3060 provides an output to structure nomination processing block 3045. Linear object identification processing block 3065 provides an output to linear object nomination processing block 3070. Now that an overview of the various processing blocks employed in the small scale processing have been generally described, a detailed description of each of these processing blocks follows in connection with each type of small scale processing.

Small Object Detection

The present invention employs small scale information 3005, a priori information 3010, edge extraction processing block 3015, terrain identification processing block 3020, large/mid scale information 3025, edge analysis processing block 3030, morphological filter processing block 3035, small object classification processing block 3040, and structure nomination processing block 3045.

Edge extraction processing block 3015 processes the original resolution image to identify the edge direction, edge magnitude, local intensity mean. The edge directions and edge magnitudes are computed at every pixel. The edge extraction can be performed using a Sobel operator in the manner described above in processing block 805 of FIG. 8 to produce a gradient magnitude image. The local intensity mean is computed by convolving the image with a 16×16 kernel of all 1's and dividing the result by 256. The gradient magnitude local mean is obtained in a similar manner, where the gradient magnitude image is employed instead of the original intensity image. The gradient magnitude local mean image provides a good measure of the image busyness. This image describes the texture or activity of an image, object or pixel. The greater the magnitude, the busier the texture around a pixel. Edge extraction information 3015 is provided to terrain identification processing block 3020. Terrain identification processing block is employed to identify terrain types in the image. As will be described in more detail below, depending upon the particular terrain identified in portions of the image, different algorithms and thresholds will be employed for detecting objects.

The small object detection processing employs morphological filter 3035 to generate a filtered image identifying compact bright and dark regions. These regions are selected as potential objects, and the edge analysis processing provides additional information for identifying small objects in the image. The small object detection processing is designed to detect objects which are less than 8 pixels by 8 pixels in the original resolution image. The small object detection processing will also detect larger objects, since medium and some large objects may appear small in the gradient magnitude produced by edge extraction processing block 3015 due to noise or obscuration. It should be recognized that since small objects do not contain many pixels, these objects are harder to extract edge information from. The larger the objects, the more edge information can be extracted from them to ensure it is a man-made object being detected, and not clutter. It has been recognized that since the edge information cannot be used reliably by itself, other features are also employed to detect small objects and then classify them.

Figure 31:
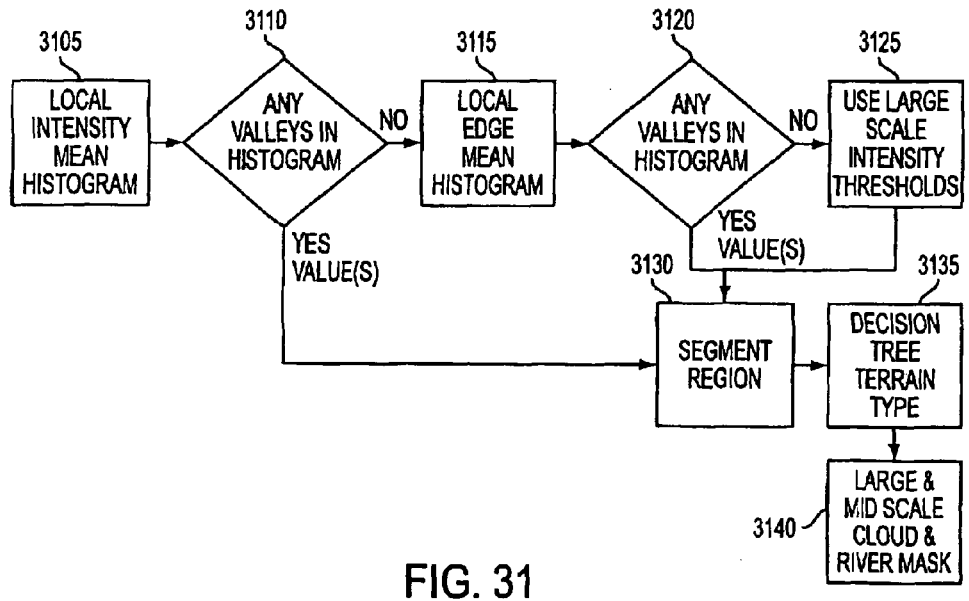
FIG. 31 illustrates the processing performed by terrain identification processing block of FIG. 30.

FIG. 31 illustrates the processing performed by terrain identification processing block 3020. The terrain identification processing block produces an image mask which identifies terrain types in the image. Since terrain types can change at pixel boundaries in a particular image, this image mask identifies terrain down to the pixel level. This terrain mask image will be employed in later processing to determine particular threshold settings, and particular algorithms which should be employed for different portions of the image. The present invention employs three types of information to generate the terrain mask image. The first type of information is global information about the image that is determined by image parameters and statistics obtained by examining the entire image. Since a priori information may exist as to which portion of the world is in the image, this a priori information can be employed in generating the terrain mask image. The second type of information employed is mask images generated from the large scale and mid scale processing. Specifically, the large scale cloud mask, and the large and mid scale river masks are employed to generate the terrain identification mask image. The third type of information employed is terrain information which is determined in the terrain identification processing block by the analysis of both the local intensity mean and the local gradient magnitude mean for portions of the image. For example, the local values can be determined for portions which are 256 pixel areas.

FIG. 31 illustrates the processing performed by terrain identification processing block 3020. Initially, a local intensity mean histogram is generated (step 3105). Next, the local intensity mean histogram is examined to determine if there are any valleys which exist in the histogram (step 3110). If there are no valleys in the local intensity mean histogram ("NO" path out of decision step 3110), then the local gradient magnitude mean histogram is examined (step 3115). Next it is determined if there are any valleys in the local gradient magnitude mean histogram (step 3120). If no valleys were present in the local gradient magnitude mean histogram ("NO" path out of decision step 3120), then thresholds from the large scale processing are employed to classify the pixel terrain (step 3125). If there were valleys in the gradient magnitude mean histogram ("YES" path out of decision step 3110), or if there were any valleys identified in the local gradient magnitude mean histogram ("YES" path out of decision step 3120), or after the large scale processing intensity thresholds have been identified (step 3125), then the image is segmented into bright and dark regions (step 3130). The region segmentation step 3130 employs either the valleys identified in the histogram, or the large scale intensity thresholds to segment the image into regions. The segmented regions must be greater than, for example, 1024 pixels to be retained. The image with the segmented regions is then employed to identify the terrain type in the different regions of the image (step 3135). As illustrated in FIG. 31, large and mid scale cloud and river masks are employed in the determination of terrain type in different regions of the image. These large and mid scale cloud and river masks will take precedence in the identification of terrain in the image over any other decision with respect to classification of the terrain in the image.

Figure 32:
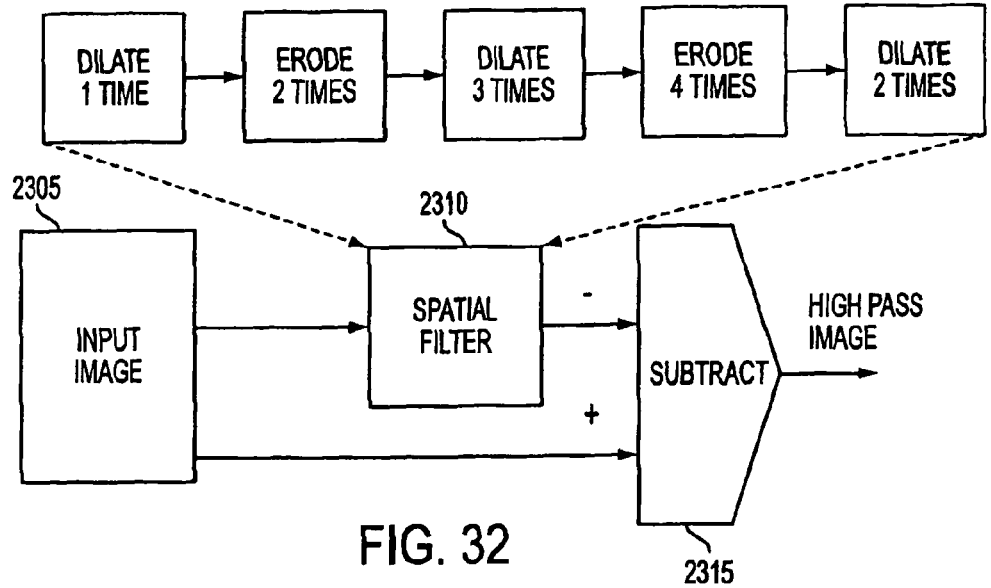
FIG. 32 illustrates an exemplary morphological filter in accordance with exemplary embodiments of the present invention.

Most of the small objects in an image will be much brighter or darker than their immediate background. Accordingly, to detect small bright or dark objects, the present invention employs a morphological filter 3035. The morphological filter will identify potential objects that are less than the filter's equivalent radius and which are different in brightness than the potential object's surrounding background. FIG. 32 illustrates an exemplary morphological filter. As illustrated in FIG. 32, an input image 3205, i.e., the image produced by edge extraction processing block 3015, is provided to a spatial filter 3210. The input image is also provided to subtraction processing block 3215. Subtraction processing block 3215 also receives a spatially filtered image from spatial filter 3210. Subtraction processing block 3215 subtracts the spatially filtered image from the input image, and outputs a high pass filtered image identifying potential objects which have a smaller radius than the size of the filter and a different brightness than background pixels surrounding the potential objects.

Figure 33A:
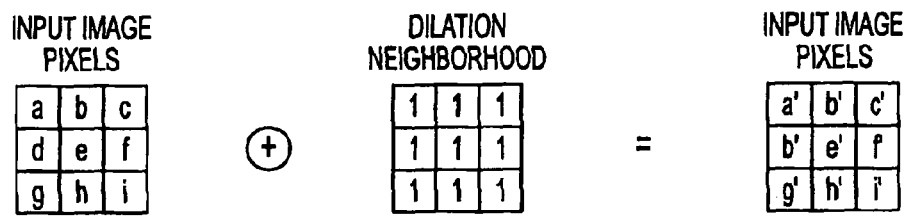
FIGS. 33A and 33B respectively illustrate the components employed in the dilation processing and the components employed in the erosion processing of the morphological filter in accordance with exemplary embodiments of the present invention.
Figure 33B:
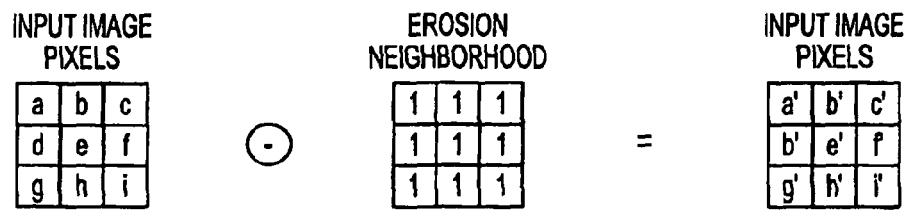

As illustrated in FIG. 32, the spatial filter employs a series of dilations and erosions. FIG. 33A illustrates the components employed in the dilation processing, while FIG. 33B illustrates the components of the erosion processing. As illustrated in FIG. 33A, a dilation operation involves convolving a 3×3 portion of the input image with a 3×3 dilation neighborhood containing all one values. As illustrated in FIG. 33B, the erosion operation involves a deconvolution of a 3×3 portion of the input image with an erosion neighborhood of all ones. The dilation and erosion performed by the spatial filter essentially acts as a low pass filter in the space domain. Specifically, the spatial filter removes regions of limited spatial extent less than the size of the composite filter. The number of successive dilates or erodes determines the size and pixels that are effected by the operator. The use of a series of erosions and dilations tends to "wash away" or "fill" any small intensity cracks or spikes, leaving only the low frequency information.

Prior to providing an output to small object classification processing block 3040, morphological filter 3035 thresholds the high pass image from subtraction processing module 3215 for bright and dark objects. Since the present invention can accommodate various terrain types, the present invention employs a dynamic and a static threshold. The dynamic threshold is based on 0.8% of the maximum and minimum intensity histogram values produced by the morphological filter. Accordingly, if the image is bland, then there is very little difference in intensity between objects and the background, resulting in a high clutter extraction. To prevent this from happening a fixed threshold is employed. The fixed threshold sets a minimum intensity value for bright objects to pass to the output image of morphological filter 3035, and a maximum intensity value for dark objects to pass on to the output of morphological filter 3035. The fixed threshold values will vary depending on the type of terrain being processed. Accordingly, an image which possesses, for example, four different type of terrain, may employ four different fixed thresholds, each different fixed threshold employing a minimum intensity value for bright objects and a maximum intensity value for dark objects.

Figures 34A, 34B, 35:
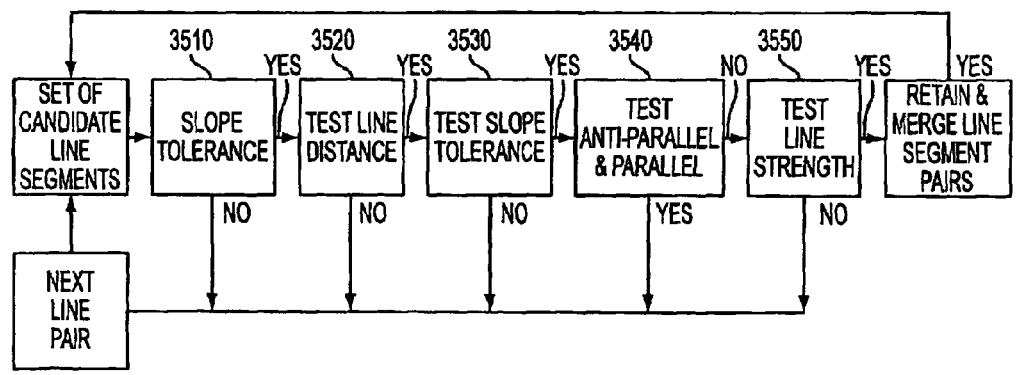
FIGS. 34A and 34B respectively illustrate the Kirsch edge operator templates and the determination of the sign of the maximum magnitude.
FIG. 35 illustrates a method for determining whether line segments are collinear.

The present invention employs a Kirsch edge operator for the edge analysis performed by edge analysis processing block 3030. The Kirsch edge operator outputs edges in one of eight directions, every forty-five degrees. As illustrated in FIG. 34A, the Kirsch edge operator employs all four templates for convolution with each pixel's neighborhood. The template that produces the maximum magnitude is selected. Next, the sign of this maximum magnitude is examined using the table in FIG. 34B to determine which entry the maximum magnitude matches. This table identifies the edge direction, and the absolute value of this maximum magnitude becomes the magnitude. For example, if Diagonal 1 produced the maximum magnitude of negative 231, since its value is negative, the edge direction for this pixel is 6 and the magnitude of the edge is 231.

The output of edge analysis processing block 3030 and morphological filter 3035 are employed in the small object classification processing block 3040. Specifically, the output of edge analysis processing block 3030 is thresholded and compared with the thresholded output of the morphological filter to perform further clutter rejection. The threshold employed on the output of the morphological filter 3035 has already been described. The threshold applied to the output of edge analysis processing block 3030 are two different thresholds for the gradient magnitudes of the edges. Both of these thresholds are dynamic. One threshold is based on 6.5 times the average local gradient magnitude, and the other threshold is based on 0.05% of the maximum histogram value of the local gradient magnitude. The maximum histogram threshold guarantees that the object is the maximum in the region, and the average threshold prevents clutter in a bland region from being extracted. Accordingly, if the object segmented by the morphological filter contains a strong edge that has passed the gradient magnitude threshold, then the object is retained and stored as a small object in the small object mask image. If the object segmented by the morphological filter does not pass the gradient magnitude threshold, it is removed from the small object mask image.

Since different regions within an image have different textures and brightnesses, the regions are processed separately. Specifically, the small object classification processing block processes all regions identified in the terrain identification processing block except for regions identified as cloud and river regions by the large scale and mid scale processing. By employing separate thresholds for each region identified in the image, the present invention avoids having a threshold which is too low for busy areas, such as vegetation or bright busy areas, which would result in a false detection. In addition, by employing separate thresholds for different regions, a threshold which is too high for bland areas, such as, shadow or bright bland areas, is prevented. A threshold which is too high for bland areas would lead to missed detections. The small object detection processing block is the only small scale processing which operates on the regions marked by the vegetation mask image to detect any small objects that may be surrounded by trees or bushes. Accordingly, the small object classification processing block 3040 outputs an image mask identifying small objects in the original resolution image to structure nomination processing black 3045. The structure nomination processing block 3045 then employs this mask image in other processing.

Linear Object Detection

Linear object detection processing detects manmade linear objects such as roads, paths, bridges, walls, plow lines, or any other manmade linear structures. Referring now to FIG. 30, the linear object detection employs small scale information 3005, a priori information 3010, edge extraction processing block 3015, terrain identification processing block 3020, large/mid scale information 3025, edge analysis processing block 3030, line extraction processing block 3050, line relationship processing block 3055, linear object identification processing block 3065, and roads/trails nomination processing block 3070. The processing for primitive extraction processing block 3015 and terrain identification processing block 3020, as well as edge analysis processing block 3030 have been described above, and hence, a detailed description of these processing blocks is omitted. The processing performed by line extraction processing block 3050 is similar to that described above in connection with FIGS. 17-21. The main difference being that the minimum line length is 8 pixels for small scale processing compared to 30 pixels for large scale processing.

The gradient magnitude and gradient direction images produced by edge extraction processing block 3015 is received along with an original resolution image by line extraction processing block 3050. The line extraction processing block 3050 converts edges, i.e., areas of the image which border regions of different intensities, into straight line segments to obtain objects with a single straight edged line, instead of several small lines. The line extraction process is described above in connection with FIGS. 17-21.

Returning now to FIG. 30, line relationship processing block 3055 receives an input from line extraction processing block 3050. Depending on terrain type, thousands of line segments may be extracted per image. Since most of the objects identified using the original resolution image are manmade objects which are linear or are rectangular in shape, the present invention employs the relationship of the identified lines to identify objects. This processing involves the connection of collinear line segments into longer straight line segments, determining which line segments are parallel (for linear object detections), and which line segments are perpendicular (for rectangular object detections). The remaining lines that have no relationships will be discarded.

FIG. 35 illustrates a method for determining whether line segments are collinear, and hence, should be one single line segment instead of two smaller line segments. Due to noise, obstructions, or other inconsistency in extracting edges, line segments may have gaps where they should be continuous. These gaps may result in only a partial detection of an object, the partial detection appearing as noise in the image, and thus being discarded as clutter. Accordingly, the method illustrated in FIG. 35 attempts to connect collinear line segments which have been disconnected due to noise, obstructions or other inconsistencies in the image. The method in FIG. 35 will also reattach the line segments that were purposely disconnected when curved lines were broken up in the method illustrated in FIG. 17. The method illustrated in FIG. 35 smooths and connects small line segments into long continuous lines. As illustrated in FIG. 35, each line segment is compared to every other line segment within the slope tolerance discussed above in connection with the line segment table, i.e., 0 to 179°. For each pair of lines there are several conditions that must be met, if the pair of lines pass all of the tests, a new line composite segment will replace the two lines in the line segment table.

The slope tolerance requirement will have been met since only lines in the line segment table within the slope tolerance are compared to each other. The line distance test step 3520 checks the gap between the two line segments to determine whether it is within a predefined distance. This predefined distance must be no longer than the average of the two line lengths. To prevent lines that overlap from being connected, a distance greater than zero is required.

The test slope tolerance step 3530 calculates an imaginary line from the farthest endpoints of the two lines. The slope of the imaginary line is compared with the slope of the two lines. The difference between the slope of the imaginary line and the original pair of lines must be within a few degrees to pass this test. Next, the line pairs are tested to determine whether they are anti-parallel or parallel in step 3540. This step prevents the combining of lines with opposite gradient directions. A gradient direction is considered anti-parallel to another gradient direction if it is pointed 180° or more in the opposite direction. For example, a gradient direction of "2" is anti-parallel to a gradient direction of "6"; and a gradient direction of "1" is anti-parallel to an edge direction of "5". Anti-parallel lines are usually found on opposite boundaries of long objects with some finite width, such as a road or a highway. If the lines are anti-parallel ("Yes" path out of decision step 3540), then the two lines fail this test and the next line pair is considered. If, however, the lines are determined to be parallel ("No" path out of decision step 3540), then the line strength of the two line segments are tested at step 3550. Two lines will be recognized as related if their line strengths are similar. The line strengths of two lines will be considered similar if the difference between strengths is not more than 25%. It should be recognized that the more similar the strengths are, the more relaxed the distance requirement test may be. If two line segments pass the line strength tests ("Yes" path out of decision step 3550), then the two line segments are retained, and merged into a single line segment. Using the processing illustrated in the method of FIG. 32, a large number of lines are combined and weeded out of further processing.

Figure 36:
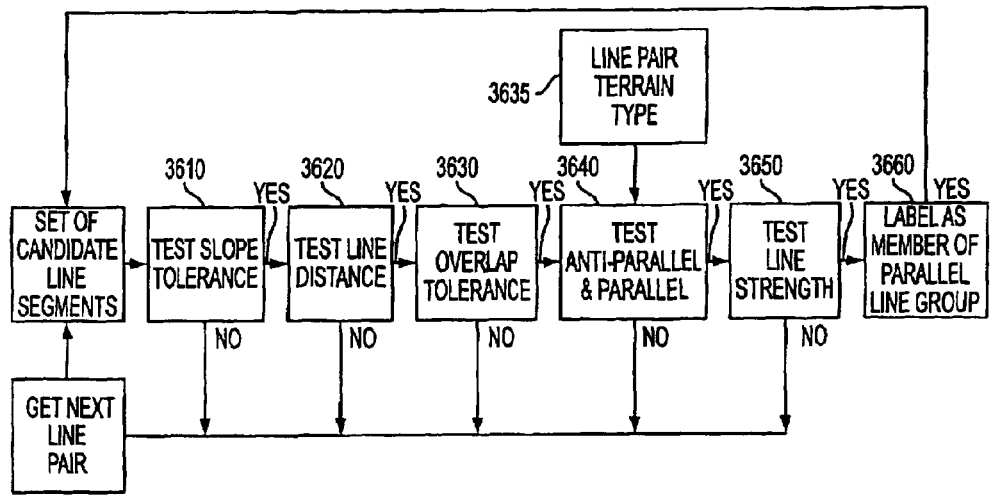
FIG. 36 illustrates the processing performed in the determination of whether two lines are parallel in accordance with exemplary embodiments of the present invention.

FIG. 36 illustrates the processing performed to determine if two lines are parallel. Each line segment in the line segment table is compared to every other line segment to determine whether there is a parallel relationship between the lines. Initially, it is determined whether the two lines are parallel based on their slopes (step 3610). It will be recognized that two lines may in fact be parallel although, based on their slopes, the two lines would in fact eventually intercept. This would be due to noise in the image, and is accounted for in step 3610 by employing a slope tolerance instead of requiring an exact parallel slope relationship. The longer the lines are, the stricter the slope tolerance.

The line distance test (step 3620) determines whether the two lines are within a predetermined distance of each other. This predetermined distance will be based on the resolution of the imagery and the type of objects to be identified. One skilled in the art could easily calculate such a predetermined distance. Next, any overlap between two line segments is tested to ensure that the overlap is a minimum length, this minimum length being based on the image resolution (step 3630). In step 3635, the terrain type of the two line pairs is determined and provided to step 3640. The two lines are discarded if they are not within the same terrain type. Step 3640 tests whether the lines are anti-parallel or parallel. If the lines are anti-parallel or parallel ("Yes" path out of decision step 3640), then the gradient magnitude of the two line segments is tested in step 3650. The gradient magnitude of each line must be nearly the same for both lines to be considered parallel. This is intended to reduce some lines which are due to natural features of the terrain. The strength feature is computed by dividing the number of pixels, which pass the gradient magnitude threshold, by the total pixel length of the line. If the strength feature of the two lines is within a predetermined amount of each other, then the two lines are labeled as members of a parallel line group (step 3660). If the two line segments fail any of these tests, they are not considered parallel.

Figure 37:
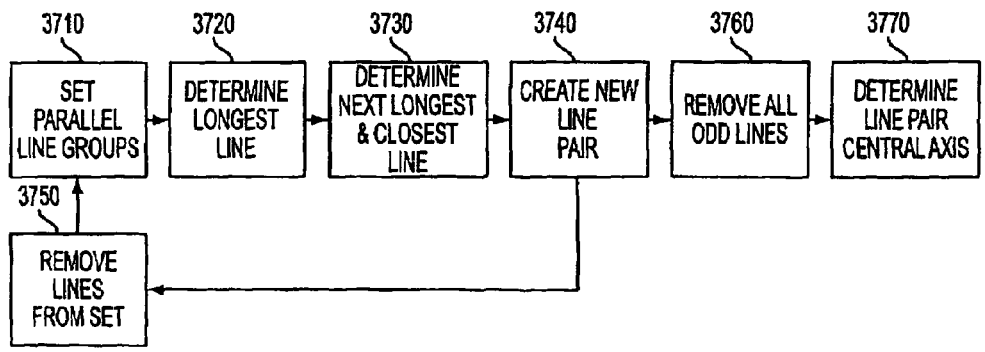
FIG. 37 illustrates the grouping of parallel line pairs in accordance with exemplary embodiments of the present invention.

The final processing performed by line relationship processing block 3055 is grouping parallel line pairs. This grouping is illustrated in FIG. 37. This grouping of the lines into parallel line pairs is accomplished by examining each parallel group and ranking by line size. The longest lines being the highest ranked. Accordingly, the longest line is determined (step 3720) and is then compared with every other line in the parallel group to find the next longest and closest line (step 3730). A new parallel pair is created when the best match is found (step 3740). The remaining lines in the parallel group are processed the same until all the lines have a best parallel match (steps 3710-3750). Once a line is a part of a parallel pair, it is no longer considered in the grouping process (step 3750). If there is an odd number of lines in the parallel group the last line is discarded (step 3760). Finally, a central axis is determined for each line pair (step 3770).

Figure 38:
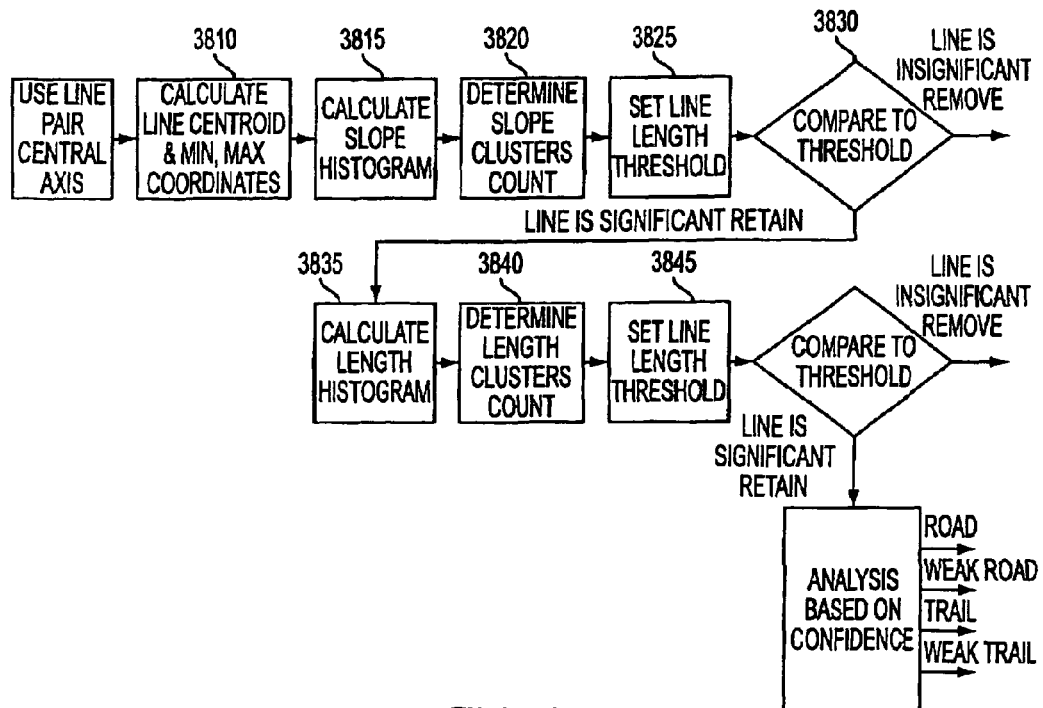
FIG. 38 illustrates the processing performed by the identification and nomination processing block of FIG. 30.

After the relationships of the lines are identified by processing block 3055, the linear objects are identified in processing block 3065 and roads, trails, and the like, are nominated as identified objects by processing block 3070. The processing performed by blocks 3065 and 3070 is illustrated in FIG. 38. As illustrated in FIG. 38, the central axis of a line pair identified as parallel is employed for determining a center line, and the minimum and maximum X and Y coordinates for the line pair (step 3810). Next, a histogram of the slope of all of the parallel line pairs is calculated (step 3815), and a slope cluster count is determined (step 3820). The slope cluster count in the slope histogram is employed for determining the line length threshold (step 3825). Accordingly, if a large number of lines have similar slopes, the length threshold is raised, whereas if the lines are not of similar slope, the length of threshold is lowered. If there are a large number of lines with similar length, the length threshold is raised, since it is likely that these lines are natural features of the terrain. All of the lines are compared to the threshold (step 3830), and lines which are below the threshold are removed as insignificant, while lines which pass the threshold are passed to the next step. Next, a length histogram is calculated for all of the remaining lines (step 3835), and the length cluster count is determined (step 3840). A line length threshold is then set based upon the length cluster count is employed for setting another line length threshold (step 3845). The remaining lines which are below the new line length threshold are removed as insignificant. The remaining lines are identified as significant, and are analyzed based upon a confidence value. The confidence value can be based upon line length and average edge strength. Accordingly, loner lines with high edge strength values have greater confidence values. This analysis outputs an image identifying roads, weak roads, trails, and weak trails, thus ending the processing for identifying linear structures in the original resolution image.

Building and Structure Detection

Referring again to FIG. 30, the processing performed for building and structure detection includes processing blocks 3005, 3010, 3015, 3020, 3025, 3030, 3050, 3055, 3060, and 3045. The processing performed in connection with processing blocks 3005, 3010, 3015, 3020, 3025, and 3030, have been described above in connection with small object detection. The processing performed in connection with blocks 3050 and 3055 have been described above in connection with the identification of linear objects. Since the details of these processing blocks have been described above, a further description of these processing blocks is omitted.

Figure 39:
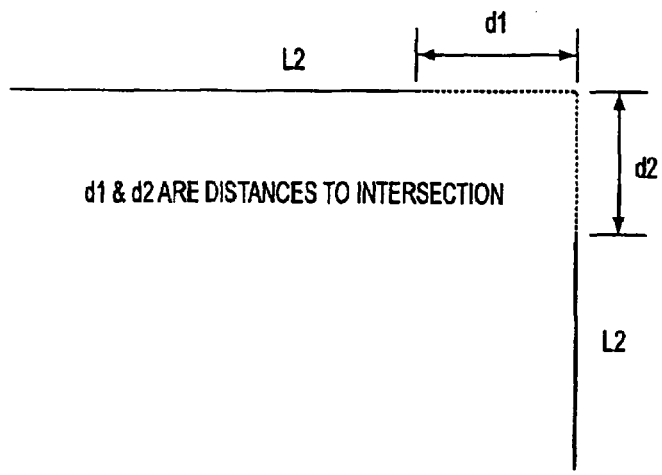
FIG. 39 illustrates the extension of perpendicular line segments.

Perpendicular lines are employed to detect buildings, structures and other manmade objects. These other manmade objects can include compounds, agricultural fields, and some vehicles. To identify such objects, lines that are perpendicular and intersect within a certain distance are extracted from the image. It should be recognized that perpendicular in this context is not meant to be an exact 90° angle, but instead is used to label a grouping of lines that can create a 90° angle in object space. When viewing objects at any oblique viewing angle, not perpendicular to a surface, the right angles of the surfaces in object space can project either greater or less than 90° in image space. Using the sensor pointing geometry and a flat earth assumption, the actual angle can be predicted. However, this prediction may not be useful due to noise and error of the extraction routines. Accordingly, the present invention places a tolerance on the variation of an acceptable 90° angle, which can be, for example, a variation between 65 and 115° This variation was determined to be acceptable through experimentation. As illustrated in FIG. 39, two line segments, if extended, could be perpendicular to each other. To determine whether two lines which could be made perpendicular by extending the line segments could be part of the same rectangular object, the present invention employs three requirements that these lines must meet. The first requirement is that the lines be perpendicular within the angle tolerance of 65 to 115°; the lines must have a specific gradient magnitude strength; and the two lines must be within a specific distance of each other.

The strength requirement is employed to reduce clutter from the resultant image. Most manmade rectangular objects, such as buildings, have very distinct, strong edges i.e., large gradient magnitudes compared to the area surrounding the edges. The strength requirement necessitates that the line strength feature for both line segments being compared is greater than 90%. In other words, more than 90% of the pixels on the line segment have passed the gradient magnitude threshold. A line strength requirement of 90% is sufficient for the detection of buildings or the detection of strong agricultural objects. If it is desired to detect weak agricultural objects, the percentage should be lowered to 30%.

Figure 40:
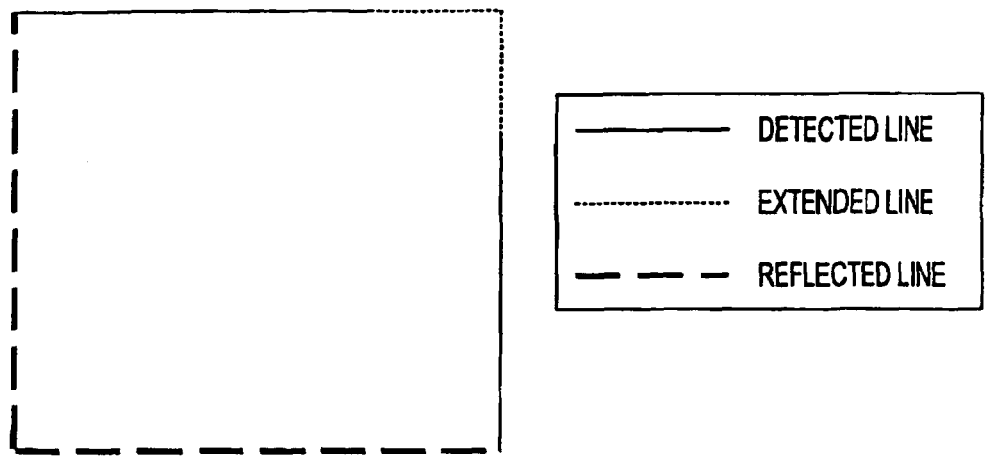
FIG. 40 illustrates the extension and reflection of two perpendicular line segments.

The distance requirement compares all lines that have passed the angle tolerance and strength requirement to determine if they intersect, or will intersect if they were extended. This distance between the actual line to the intersection must not be more than half of the actual line length for either line, or greater than 12 pixels, whichever is less. Accordingly, referring again to FIG. 39, distance d1 must not be greater than half the length of the horizontal line, and must also be less than 12 pixels for the line to be extended. Similarly, distance d2 must not be greater than half the length of the vertical line, and less than 12 pixels. If two lines are found to have a perpendicular relationship, then if necessary, the lines are extended to create the intersection, and reflected to create a closed region segment. This extension of the lines and reflection of the lines is illustrated in FIG. 40.

Figure 41A:
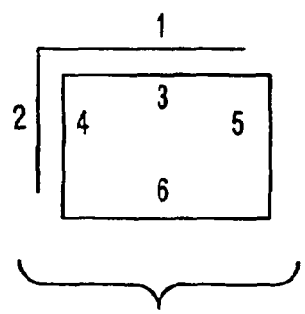
FIG. 41A illustrates extracted lines from an image from a top view of a simple perfect building.
Figure 41B:
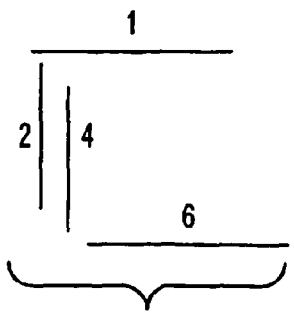
FIG. 41B illustrates an exemplary illustration of lines actually extracted from an image.

FIG. 41A illustrates lines extracted from an image from a top view of a simple perfect building. Lines 1 and 2 depict the shadow edges of the building, while lines 3-6 depict the actual building walls. The building illustrated in FIG. 41A is an ideal case, however due to noise, only partial lines will probably be extracted from the original image. FIG. 41B illustrates a more realistic illustration of the lines which would be extracted from an image. In FIG. 41B, wall lines 3 and 5 were not extracted from the original image, while shadow lines 1 and 2, and wall lines 4-6 were only partially extracted. Accordingly, as illustrated in FIG. 41C, wall line 4 will be extended to shadow line 1, and these lines will be reflected to form an enclosed rectangular object.

Figure 41C:
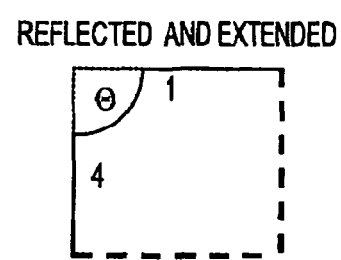
FIG. 41C illustrates the reflection and extension of line segments of the image extracted in FIG. 41B.
Figure 42A:
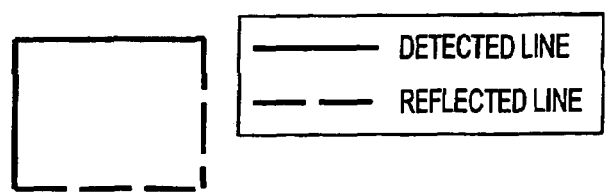
FIG. 42A-42C illustrate a structure confidence feature which reduces the connection of a building wall to a shadow line in accordance with exemplary embodiments of the present invention.
Figure 42B:
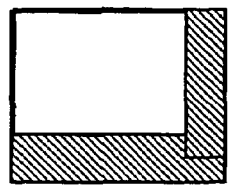
Figure 42C:
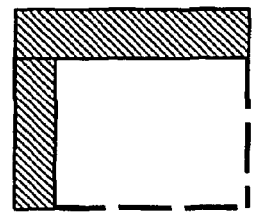

To avoid connecting a building wall with a shadow line as illustrated in FIG. 41C, the present invention employs a structure confidence feature to reduce the likelihood that these types of lines will be connected. FIG. 42A illustrates two detected and two reflected lines. As illustrated by the dashed region in FIG. 42B, a search for wall evidence is performed by looking for lines which are parallel with the extracted lines and are within a certain distance of the parallel lines. The lines found during the search for wall evidence will typically be smaller than the extracted lines, otherwise these lines would be extracted with the other lines. The certain distance is a distance which is consistent with the dimensions of typical buildings. These confidence features will be employed to help retain rectangular patterns and label them as building structures. Confidence is kept track of by maintaining a count of the number of parallel lines that exist for each perpendicular relationship. The more complicated a building, the higher the parallel line count, and hence, the higher the confidence. Information from the segmentation approach described above in connection with small object detection in the form of segmentation is employed to increase the confidence of these perpendicular relationships. The segments are tested to determine if they can be walls, shadows, or whole building structures. The present invention employs the contrast values of these segments to determine if they are shadows.

Figure 43A:
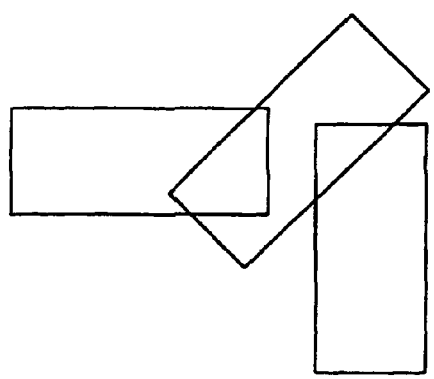
FIGS. 43A and 43B respectively illustrate rectangular objects which overlap with two other rectangular objects and a representation of these rectangular objects employing only the outside edges of the non-overlapping regions of the rectangular objects.
Figure 43B:
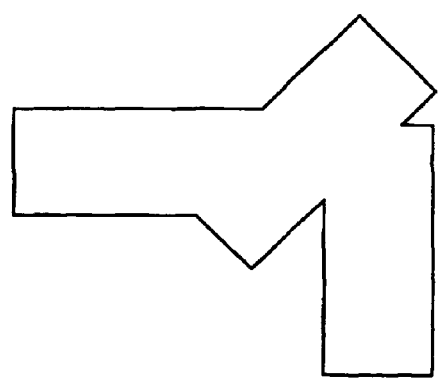

Rectangular manmade objects consist of buildings, compounds, agricultural fields and vehicles. To detect any rectangular object existing in the original resolution image, a new object segment is created from overlapping perpendicular segments. To create these segments, the background of the image is labeled and any perpendicular line segment touching the background is tagged as an outer line segment. Accordingly, as illustrated in FIG. 43A, a rectangular object which overlaps two other rectangular objects will be identified by the polygon illustrated in FIG. 43B, employing only the outside edges in the non-overlapping regions of the rectangles.

Figure 44:
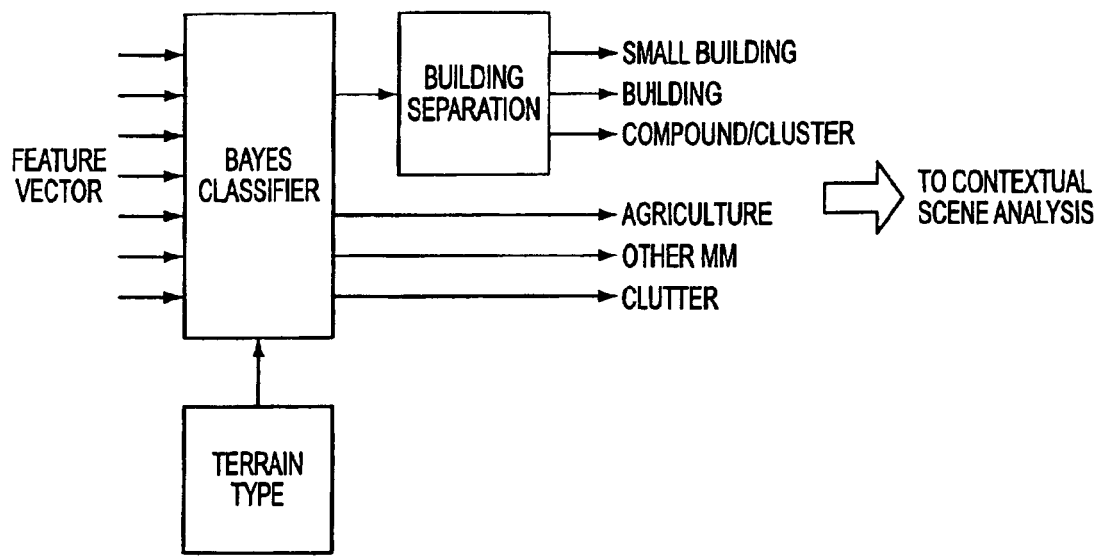
FIG. 44 illustrates the nomination of objects using a Bayes classifier.

Finally, as illustrated in FIG. 44, objects are nominated by employing a Bayes classifier. The Bayes classifier employs various extracted features to classify the identified objects. The first feature is the area based on area per pixel. Area is employed to assist in the categorization of the objects into different feature bins, small, medium and compound, since different size objects have different features. A second feature is the average intensity. The average intensity is actually two intensity values, one for the intensity of a segment, the other the intensity of the immediate background in the image. A third feature is the standard deviation of a whole segment and the immediate background in the image. A fourth feature is the average intensity of the whole image. A fifth feature is the gray contrast which measures the delta between the segment intensity and the background intensity. A sixth feature is the gradient magnitude which measures the edge activity inside the segment, as opposed to just outside the segment. A seventh feature is the average mean gradient magnitude which is a 16×16 convolution of gradient magnitude values on a segment. An eighth feature which is extracted is the morphological filter statistics which include the mean, standard deviation, minimum and maximum values from this filter. A ninth value is the structure confidence which is a count of the number of lines that are parallel to the perpendicular relationship. It should be recognized that the size of a structure will affect this count. A tenth feature is the texture energy filters, which is a standard set of 5×5 convolution filters that measure the texture pattern in an image region.

Using the extracted features, the Bayes classifier categorizes the objects into building, agricultural, or other manmade activity, and clutter. The buildings are further subdivided into small building, building and compound/building cluster. Since the terrain type is known a priori, a separate classifier can be used. Area, brightness, edge strength, and geometric structure can characterize buildings. A majority of the clutter falls into two groups, vegetation and crevices. Two classifiers are employed for forest terrain types, and two classifiers for arid terrain types. These classifiers are trained on different data sets. The output from each classifier can be used separately and the results added. Alternatively, both classifiers must nominate a candidate segment for it to be categorized as a building.

Lines of Communication

The present invention employs small scale resolution imagery, i.e., the original first resolution image, and mid scale resolution imagery, i.e., the first resolution image downsampled to a second resolution, for the detection of lines of communication. Lines of communication are manmade structures used for transmitting or transporting products such as information, electric power, gas, oil, fresh water, wastewater, and transportation structures such as surfaced roads, dirt, railroads, and paths. Lines of communication may appear to lack continuity in an image. For example, lines of communication buried pipe or transmission lines may appear as cuts through the forest. Lines of communication may manifest themselves as strong linear structures containing multiple line segments in the imagery, or due to shadows or some other obscuration. Hence, the present invention attempts to bridge this loss of information. Since lines of communication can have a variety of sizes and thicknesses from, for example, a dirt path to a multi-lane superhighway, the present invention employs both small scale and mid scale resolution images for the detection of lines of communication.

Figure 45:
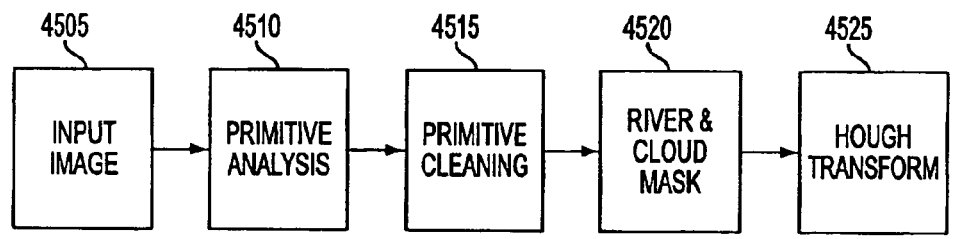
FIG. 45 illustrates a generic process employed in the identification of lines of communication in small and mid scale resolution imagery.

FIG. 45 illustrates a generic process which is employed in both the small and mid scale resolution processing. Primitive analysis processing 4510 is performed on an input image 4505, either at a small scale or mid scale resolution. The primitive analysis processing 4510 processes the input image at the pixel level to identify simple structures that are elements of lines of communication. The primitive analysis processing 4510 outputs an image identifying structures in the input image. The image output by the primitive analysis processing 4510 is input to primitive cleaning processing 4515 to prune and/or thin the primitives. In this processing step, primitive connectivity can be tested to eliminate extra elements. The primitive cleaning processing 4515 outputs an image to river and cloud mask processing step 4520. In the river and cloud mask processing step 4520, the image output by primitive cleaning processing step 4515 is masked with the river and cloud mask to prevent processing of any primitives which are located in portions of the image identified as rivers and portions of the image identified as clouds. This image is output from river and cloud mask processing step 4520 to Hough transform processing step 4525. The Hough transform processing step 4525 tests large groupings of the identified primitives to determine if they are to some degree co-linear. This processing step will group the processed primitives into larger line segments.

Figure 46:
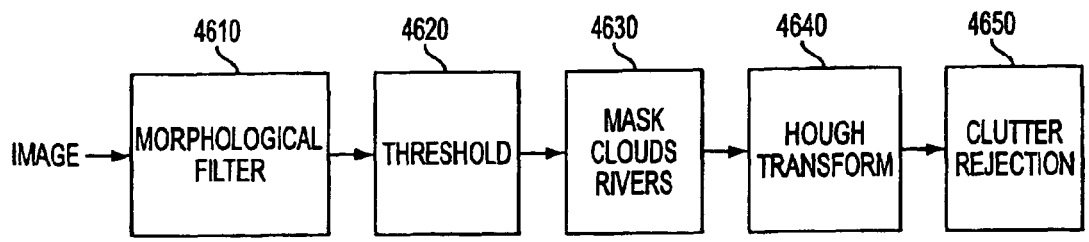
FIG. 46 illustrates the processing performed for the identification of lines of communication in the small scale imagery.

FIG. 46 illustrates the processing performed for the identification of lines of communication in the small scale imagery. The original resolution image is input to morphological filter processing block 4610. The morphological filter processing block 4610 employs the morphological filter described above in connection with FIGS. 32 and 33, and hence, for a detailed description of this processing, one should refer to the description above. The image output from morphological filter processing block 4610 is input to threshold processing block 4620. The threshold processing block 4620 employs an intensity histogram of the image output from morphological filter processing block 4610 to compute a threshold. The threshold is based on a specified percentage of the intensity histogram. The threshold should be selected with a bias value to allow both dark and bright intensities in the imagery to be examined.

The thresholded image from processing block 4620 is input to processing block 4630 where the image is compared with an image which identifies regions which have either rivers or clouds. To avoid false detections, regions which have either rivers or clouds are not to be processed in the identification of lines of communication. Accordingly, the intensity values for regions of the thresholded image which have rivers or clouds is set to zero to avoid false nominations of lines of communication being identified in these regions of the image. The image output from processing block 4630 is input to Hough transform processing block 4640.

Figure 47A:
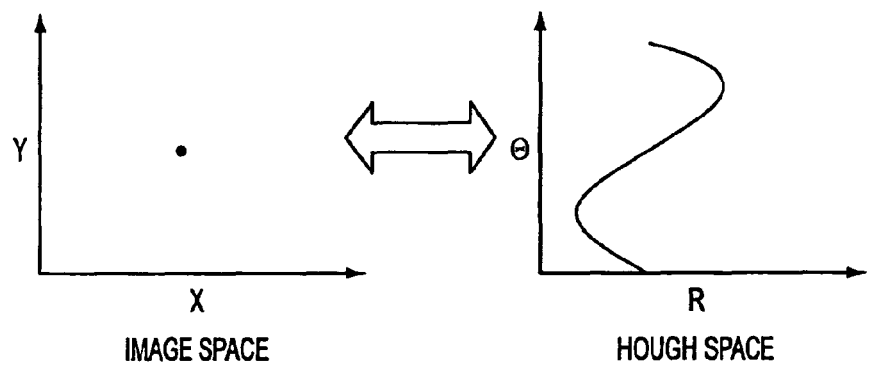
FIGS. 47A and 47B illustrate mappings between image space and Hough space.
Figure 47B:
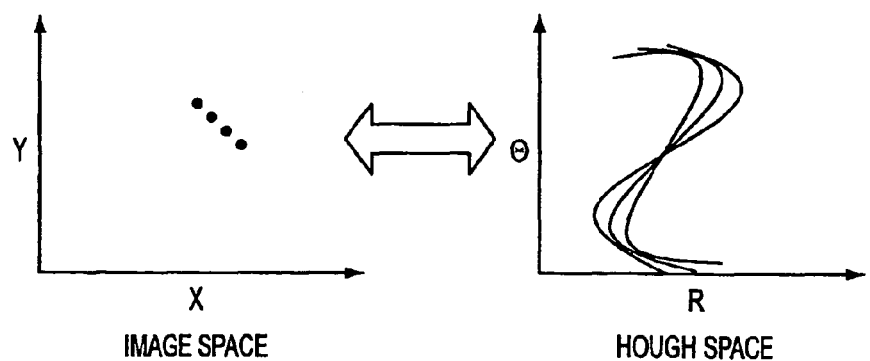
Figure 48:
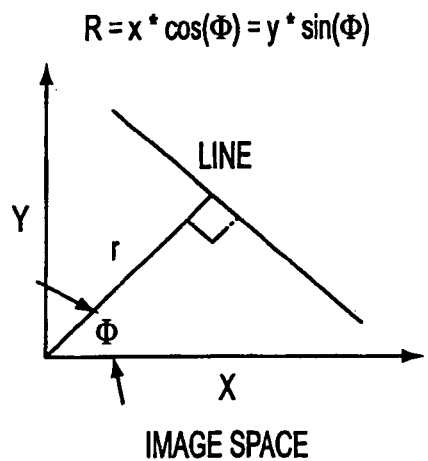
FIG. 48 illustrates the mapping function for mapping from image space into Hough space.

The Hough transform processing block 4640 is performed on the image to identify all line segments of importance in the image. The Hough transform maps an image into an alternate discrete space, where each element or cell indicates how many pixels in the image lie on a line with a particular angle and location. FIG. 47A illustrates the mapping of a single point in image space into Hough space. A single point gets mapped from image space into Hough space as a sinusoidal curve. FIG. 47B illustrates a series of points being mapped into Hough space. As illustrated in FIG. 47B, different sinusoidal curves result from each point being mapped. It will be noticed that all the curves illustrated in FIG. 47B pass through a single point in Hough space. Accordingly, multiple points of a line in image space will result in multiple sinusoidal curves in Hough space passing through a single point. Therefore, a large number of sinusoidal curves all passing through the same point in Hough space, correspond to long lines in image space. Since the mapping from image space to Hough space is reversible, once each point in image space is mapped into Hough space, the lines in image space can be determined by looking for high counts in Hough space. FIG. 48 illustrates the mapping function for mapping from image space into Hough space. The Hough transform is performed on the image by processing 128×128 pixel overlapping windows. The use of overlapping windows improves the detection rate by reducing edge effects caused by objects crossing window borders, and also allows for the detection of smaller lines of communication or lines of communication that have a slight curvature.

Figure 49:
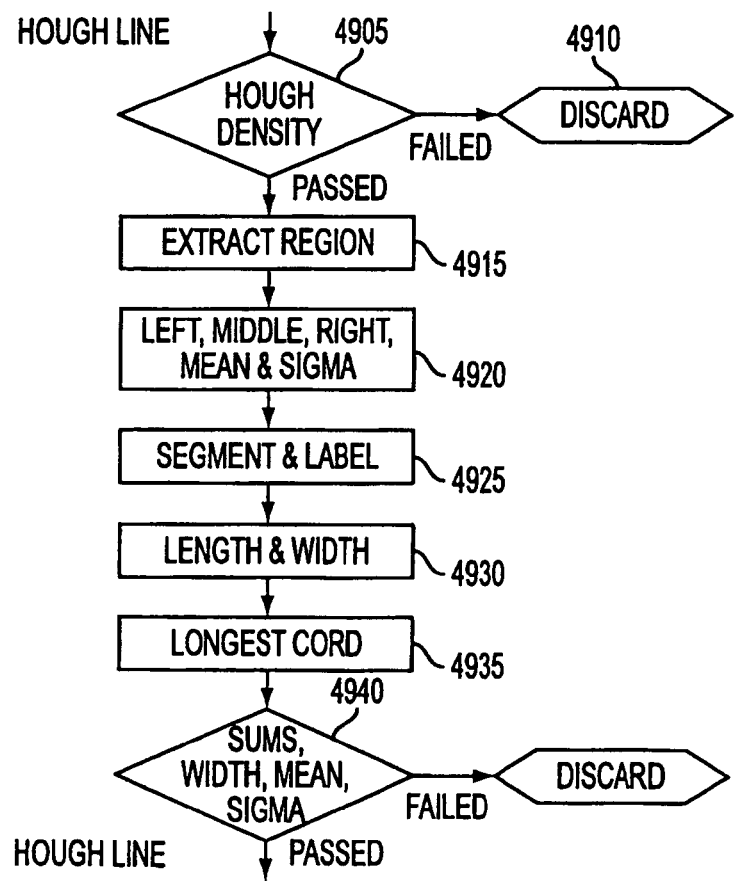
FIG. 49 illustrates clutter rejection processing in accordance with exemplary embodiments of the present invention.

Returning now to FIG. 46, since a large number of possible outputs are selected by Hough transform processing block 4640, processing block 4650 acts as a cleaning stage to limit the number of lines identified in the image. FIG. 49 illustrates the processing of clutter rejection processing block 4650 in more detail. The clutter rejection processing block 4650 processes each line identified in the image output from Hough transform processing block 4640. Initially, each line is compared to an initial threshold in processing step 4905. In step 4905, it is determined whether there are more than a predetermined number of pixels on the line. One skilled in the art will recognize that the predetermined number of pixels is selected to balance the number of missed detections verses false nominations. If there are not more than a predetermined number of pixels on the line, then the line is discarded in accordance with the processing step 4910. If, however, there are more than a predetermined number of pixels on the line, then the region surrounding the line is extracted in processing step 4915. Next the portions of the extracted region to the left and the right of the identified line are examined. If the identified line is a valid line of communication, then the portions of the region to the left and right of the line, which represent the background, should appear similar, and the identified line itself should appear different from both the left and right regions. Accordingly, in step 4920 a mean value and standard deviation of intensities is calculated for the left, middle and right portions of the extracted region.

In step 4925 the extracted region is segmented and each segment is uniquely labeled. The segmentation is accomplished by thresholding the extracted region with a threshold of the mean intensity minus half of the sigma of the intensity of the extracted region. The length, width, longest cord, and cord angle are calculated in accordance with steps 4930 and 4935. It will be recognized that the cord is a line between the minimum X and Y pixel coordinate and the maximum X and Y pixel coordinate. The cord angle is the angle with respect to the Hough line. To avoid being rejected as clutter, each line segment should have a cord angle which lines up with the center line, the cord end points of the segment should be close to the center line, the segment should be narrow, the segment should be long, and the average distance of segment pixels from the center line should be small. Each of the labeled segments which satisfy these characteristics, has its length summed, and its mean width averaged. In step 4940 four rejection values are employed for eliminating clutter. These rejection values are the mean width, the sum of the segment lengths, the sigma of the left and right portions of the extracted region, and the mean intensity of the left and right portions of the extracted region. If these values pass the thresholds, then the line is considered an element of a line of communication. Since as the Hough processing is scrolled through the image, a single element of a line of communication may possess several nominated lines, the final step of the processing is to eliminate multiple lines nominating the same element of the lines of communication.

Figures 50, 51:
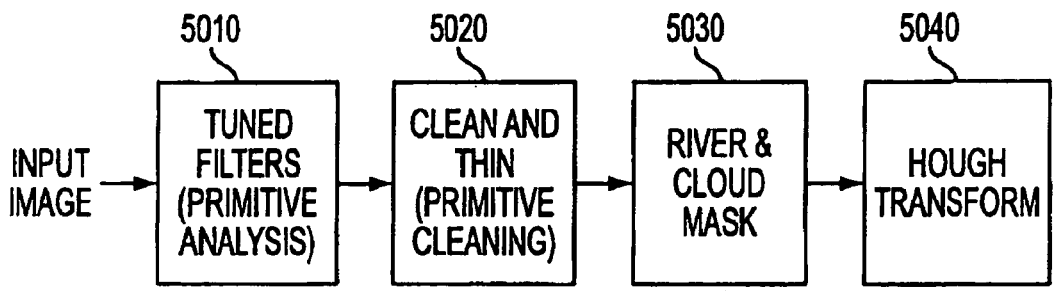
FIG. 50 illustrates the processing performed to detect lines of communication in mid scale resolution imagery.
FIG. 51 illustrates the tuned filter employed in accordance with exemplary embodiments of the present invention.

FIG. 50 illustrates the processing performed in the detection of lines of communication in the mid-scale resolution image. Initially, the image with a second resolution is input to tuned filter processing step 5010. FIG. 51 illustrates the tuned filter employed in the present invention. The filter illustrated in FIG. 51 is applied to the image at the second resolution. Then the filter is rotated through 22.5 degrees and applied to the image at the second resolution again. This is repeated for all angles, and requires 16 rotations of the filter. The number of filter applications can be reduced to 8 via symmetry, and hence, eight different filtered images are produced. The results from each pass are output into one file. The output of the filter is employed as an input to the clean and thinning processing step 5020.

Figures 52, 53:
FIG. 52 illustrates the cleaning filter employed to remove small regions in accordance with exemplary embodiments in the present the present invention.
FIG. 53 illustrates thinning templates in accordance with exemplary embodiments of the present invention.

FIG. 52 illustrates the cleaning filter which is employed to remove any small regions from the image. The image may contain long linear lines which are several pixels wide after cleaning. Since the Hough analysis requires the lines to be one pixel wide, a thinning step is performed. The thinning step examines each pixel's neighbors, and removes the pixel if it does not break continuity of the region. FIG. 53 illustrates several examples of 3×3 pixel areas where the center pixel would be set to zero. Every eight connected pixel grouping in the thinned tuned filter image is labeled with a unique value. A pixel is eight connected if one of its immediate eight neighbors is also a member of the set. Recorded with this unique group value is the length and pixels of the line segment, and the mean and maximum value of all the members of the line segment. Since clutter regions tend to have all low values, while long linear objects have at least one or more large values, thresholds are set on the length, mean intensity and maximum intensity values of each line segment to reject clutter in the image. The maximum value threshold is a function of the segment mean line. The larger the mean line segment, the larger the threshold of the maximum value. If the maximum value is less than the threshold, the line segment or region is removed. All line segments with just a few pixels are also removed. The remaining line segments are next checked to determine if they are linear, thereby forming a straight line.

Figure 54:
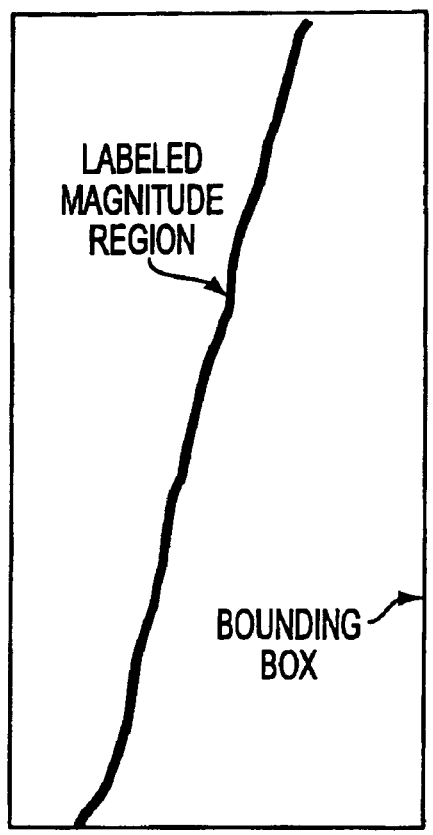
FIG. 54 illustrates a bounding box in accordance with exemplary embodiments of the present invention.

The cleaned and thinned image is provided to river and cloud mask processing block 5030 which outputs the cleaned and thinned image with all regions where rivers and clouds are identified with a value of zero. This image is input to Hough transform processing block 5040 which is used to determine if the line segment is linear or curved. Before applying the Hough transform processing, each line segment is cleaned using a dilate morphological filter. The dilate morphological filter checks each pixel to determine whether it is a line segment pixel. If one of its neighbors is on the line segment, this pixel is converted to a line segment pixel. For each line segment a bounding box is determined that completely encloses the line segment. The Hough processing is performed on the region contained within the bounding box. FIG. 54 illustrates a bounding box in accordance with exemplary embodiments of the present invention. The Hough transform processing outputs the best fit angle and the magnitude of the match or maximum value. The number of pixels in the bounding box is divided into this maximum value to form a percentage "r". If the count of the number of pixels in the labeled region is greater than 100 and if the "r" is greater than 80%, it is determined that the line in the bounding box is an acceptable straight line. If the count is less than 100 pixels, then the following relationship is used to determine if it is an acceptable straight line:

if $r \geq (1.0-0.002 \times count)$ then accept as straight line.

Figure 55:
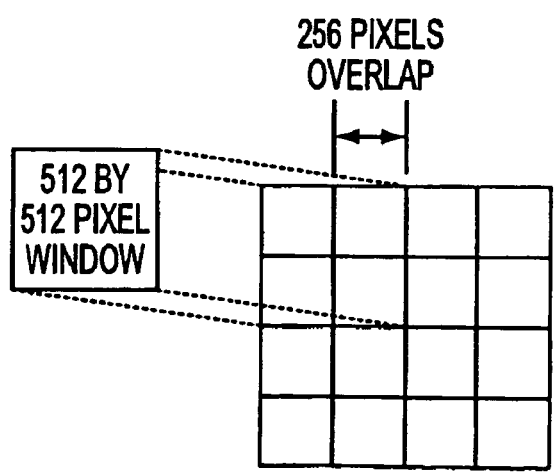
FIG. 55 illustrates the application of the Hough transform to an image in accordance with exemplary embodiments of the present invention.

The Hough processing is next performed on the entire image rather than just the bounding box. The Hough transform processing is applied to the entire image to try to connect separate regions that lie in the same Hough transform space. The Hough transform processing is performed on 512 pixel square windows with 256 pixel overlaps as illustrated in FIG. 55. This process is performed enough times to cover the total size of the image. Again a threshold is placed on the number of counts in the maximum bin. If this threshold is not exceeded, the lines are discarded. If it is exceeded, the maximum tuned filter magnitude of the two regions is summed, and the tuned filter mean is calculated for this maximum bin. Using the mean value, the maximum sum is tested against a threshold. If it passes the threshold, the line is identified as a mid-scale line of communication. Since scan line artifacts may exist, the residual line scanned segments can be tested to determine if it is a true line segment or a scan line artifact. All scan line artifacts are eliminated, and if necessary, are stored or are sent out as a flag.

Contextual Line Reasoning

Figure 56:
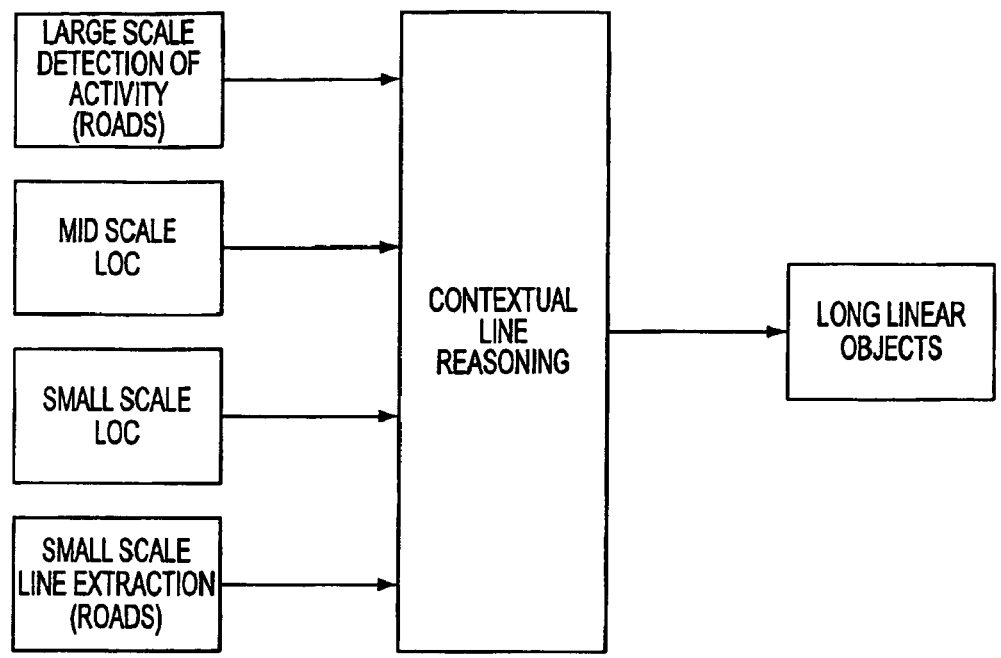
FIG. 56 illustrates a high level block diagram of the contextual line reasoning processing in accordance with exemplary embodiments of the present invention.

FIG. 56 illustrates a high level block diagram of the contextual line reasoning processing. As illustrated in FIG. 56, the contextual line reasoning processing has inputs of large scale detection of activity, including roads, mid-scale lines of communication, small scale lines of communication, and small scale linear objects such as roads. The contextual line reasoning processing uses these inputs to output an image identifying long linear objects. The purpose of the contextual line reasoning is to remove redundancy among the detection techniques so that all of the nominations are fused into one unified set of detection vectors. The contextual line reasoning also attempts to connect identified objects from all of the linear detection techniques, for example combining roads identified in large scale resolution imagery and roads identified in small scale resolution imagery. The contextual line reasoning processing will also remove spurious detections that do not meet physically realizable roads or lines of communication. These spurious detections may manifest themselves as zig-zag structures that are detectable and can be eliminated. It will be recognized that in all detection routines it is possible to miss sections of roads or lines of communication. Accordingly, the contextual line reasoning provides the framework and data to improve connectivity by bridging gaps in roads and/or lines of communication. However, contextual line reasoning will not eliminate lines that can be used to detect agriculture or which support urban city streets.

Figure 57:
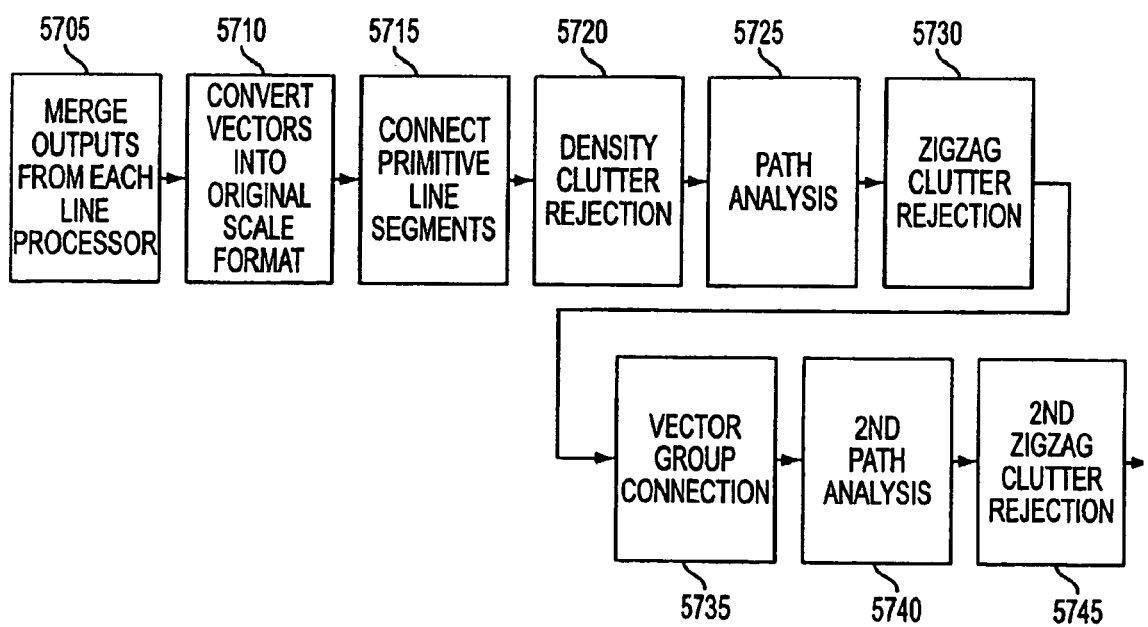
FIG. 57 illustrates the processing performed in the contextual line reasoning processing.

FIG. 57 illustrates the processing performed by the contextual line reasoning process. Initially, the outputs from each line processor are merged in processing step 5705. Next the vectors are converted into the original scale format so that all of the detections are mapped into a common framework. Accordingly, the large scale images at a third resolution will be upsampled twice into the small scale images at first resolution, and the mid-scale images at a second resolution will be upconverted one time to achieve the small scale images at a first resolution. In processing step 5715 the primitive line segments are connected.

Figure 58:
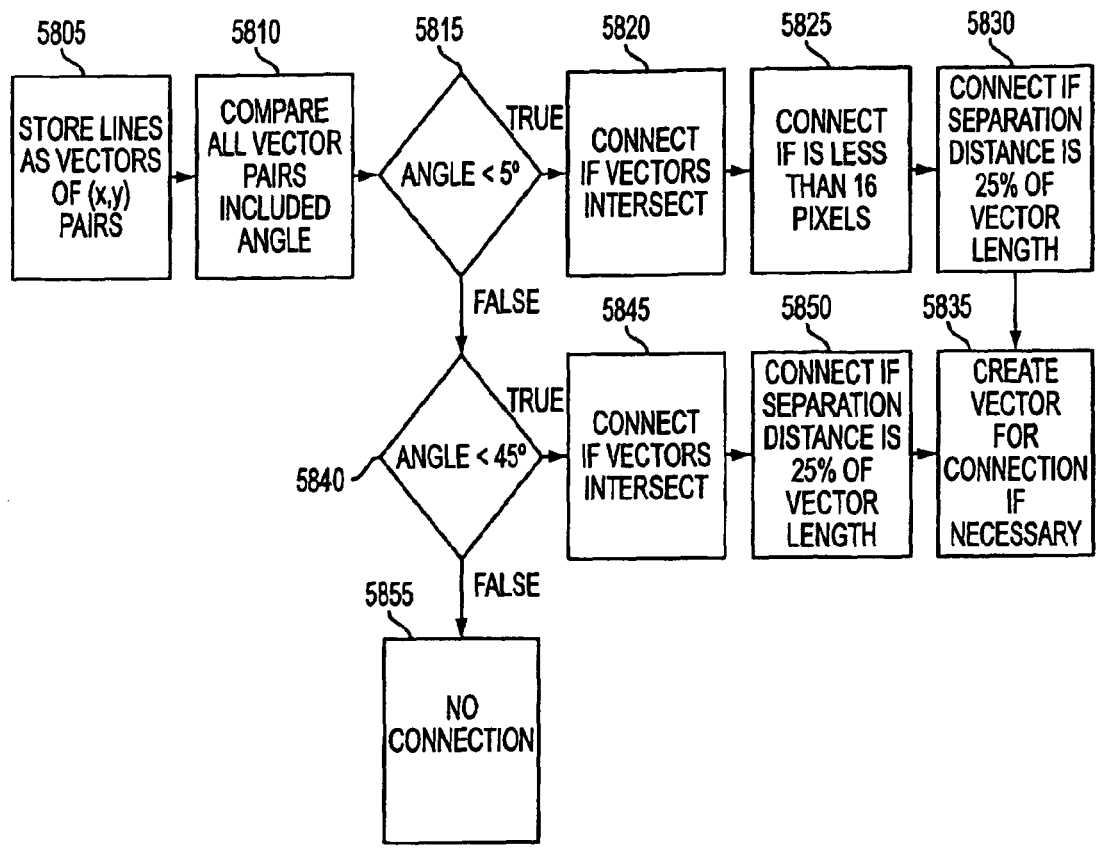
FIG. 58 illustrates the processing steps for connecting primitive line segments.
Figure 59A:
FIGS. 59A-59C illustrate various relations between line pairs.
Figure 59B:
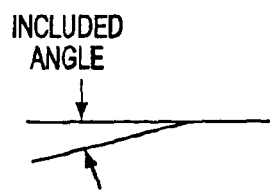
Figure 59C:
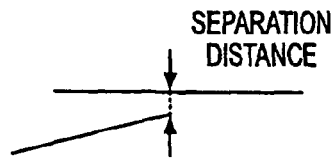

FIG. 58 illustrates the processing steps to connect the primitive line segments. Initially, in step 5805, the lines are stored as vectors of x, y coordinate pairs. The remainder of the processing measures the orientation of all of the line pairs. If a line pair has an included angle that is less than 5°, ("True" path out of decision step 5815), then the line pairs are evaluated for connection in steps 5820 through 5835. FIG. 59B illustrates the included angle. If the vectors intersect, if the vectors are less than 16 pixels apart, or if there is a separation that is less than 25% of the vector length (steps 5820, 5825 or 5830) then the line pairs are connected, and if necessary, a vector for connection is created in processing step 5835.

If the included angle is not less than 5° ("False" path out of decision step 5815), then it is determined if the included angle is less than 45° in processing step 5840. If the angle is less than 45° ("True" path out of decision step 5840) then the vectors are connected if they intersect (step 5845), or if there is a separation distance of less than 25% of the vector length (step 5850). If necessary, a vector is created for connection of the two vectors in processing step 5835. If the angle is not less than 45° ("False" path out of decision step 5840), then no connection is made in accordance with processing step 5855.

All pairs of lines are tested in accordance with the processing illustrated in FIG. 58 and connected if they pass. Once a pair of vectors are connected, the new vector is placed in the vector table and the two component vectors are marked as invalid. Any vector created to perform the connection is also associated with the new vector, but are placed in front of the base vector in the list since they are not to be treated as a created vector. Once all vectors have been scanned in the list, the base vector is advanced one position and the process is repeated until the base vector advances to the end of the list.

Returning now to FIG. 57, the connected primitive line segments are input to density clutter rejection processing step 5720. FIG. 60 illustrates in detail the processing performed in density clutter rejection processing step 5720. The density clutter rejection processing step is intended to eliminate vector groups that are non-linear-like. Accordingly, a vector group is selected in processing step 6005. Using the selected vector group, a minimum enclosing box which entirely surrounds the vector group is determined and the area of the minimum enclosing box is calculated in processing steps 6010 and 6015. In parallel with step 6010, the number of pixels in all of the lines in the vector group is calculated in processing step 6020. In processing step 6025 the area of the minimum enclosing box is divided by the number of pixels in all of the lines in the vector group. The result of the calculation in step 6025 is compared to determine whether it is less than 0.01. If the result of the calculation step 6025 is less than 0.01, then there is a low pixel to area ratio, and hence, it is likely that the vector group is in fact a linear detection. If, however, the result of the calculation and processing step 6025 is not less than 0.01, then there is a high pixel to area ratio indicating that the vector group tended to stay "balled up" and did not cover any appreciable distance as would be the case in a road like structure. Accordingly, such a vector group would be rejected as clutter.

Density clutter rejection is accomplished by processing a vector group at a time. Each vector group is scanned for the minimum and maximum x and y coordinates. Once these values are obtained, a $\Delta x$ and a $\Delta y$ are calculated. The maximum of these deltas is then used to define the area of the box encompassing the vector group. Next each vector in the vector group is scanned for their $\Delta x$ and $\Delta y$. The maximum of these two deltas defines the number of pixels comprising that vector. These vector pixel counts are then summed, and the total is then divided by the area of the box calculated earlier. This value is then tested against the threshold value of 0.01, and rejected as clutter if greater.

Returning again to FIG. 57, after the density clutter rejection processing step 5720, the remaining linear structures are processed in path analysis processing step 5725. The path analysis processing step is intended to find the best path through the vector. The best path is defined to be the longest, most direct path between any two end points in the vector group. This path usually occurs along the major axis of the vector group. This path is found by calculating the most direct distance between every possible pair of end points within a vector group. These lengths are then scanned to find the two end points with the longest path length. Once this path has been determined, all vectors associated with this vector group, but not involved in the path, are deleted from the group. This results in a cleaner line segment.

In order to perform path analysis, a matrix of single path distances is formed for all the vectors in the group. This matrix is denoted as $M^1$, which is the single jump matrix, and represents the shortest distance from any node A to any node B in the vector using at most one vector. As illustrated in FIG. 61, by a matrix operation of $M^1$ with itself, matrix $M^2$ can be produced. Matrix $M^2$ represents the shortest distance from any node A to any node B in the vector group using at most two connecting vectors. Matrix $M^2$ is calculated by iterating through each node pair, A and B, to determine the shortest distance using another node C. If there is more than one node C where this is possible, the shortest distance is placed in the location (A, B). Let $\otimes$ be the shortest distance operator, so $M^2 = M^1 \otimes M^1$.

FIGS. 62A-62E illustrate the best path analysis. Specifically, FIG. 62A illustrates the distance between a plurality of nodes 1 through 5. FIGS. 62B through 62E respectively illustrate the single jump matrix through the four jump matrix of the nodes illustrated in FIG. 62A. Accordingly, in the matrix $M^1$ it can be seen that the 4,2 value in the matrix is 15, which represents the value of the length between nodes 2 and 4 in FIG. 62A. It should be noted that the matrix is triangularly symmetric, so that only the upper triangle needs to be filled in. Since matrix $M^3$ covers all possible connections between the nodes, as illustrated in FIG. 62A, matrix $M^3 = M^4$. This equality determines the end of the processing. Since there can be relatively long paths contained in the inner nodes, it may require several iterations to solve all of the matrices. By performing the higher iteration count on a smaller matrix first, operations can be saved. Once the inner node matrix has been solved, and since all end points are connected to inner nodes, it will take two iterations of the full matrix to complete it.

Once the matrix has been completed, the distance from each node to all other nodes is known. Now the matrix is scanned to find the nodes that are the farthest apart. These two nodes will always be end points. Once the two end points are found the correct path must be traced. First choosing one of the end points as the current node, then calculating the distance to each neighbor node using the $M^1$ single node matrix plus the distance from that node to the other end point using the solved matrix. Then proceed to the node which yields the shortest overall distance. Each current node is recorded which builds the path, and the operation is stopped upon reaching the other end point. Once the path is known all other vectors can be removed, generally rendering a cleaner outline of the identified linear object. It has been recognized that $M^{2n} = M^n \otimes M^n$ the processing time can be logarithmically reduced. Arranging the interior nodes, the nodes with more than one single path connection, first in the list further reduces processing time.

Returning again to FIG. 57, the paths which remain after the path analysis processing step 5725 are processed in zig-zag clutter rejection processing step 5730. FIG. 63 illustrates the zig-zag clutter rejection processing step 5730 in more detail. Initially a vector group is selected and compared to a path length threshold in processing steps 6305 and 6310. The threshold can be, for example, 256 pixels in length. If the vector group has a path length which is less than the threshold path length then it is discarded. If, however, the selected vector group has a length exceeding the threshold than the number of angles greater than 90° is calculated in processing step 6315. The number of angles greater than 90° is divided by the length of the path in processing step 6320. If the result of the division is less than 0.01, then it is determined that there are no zig-zag line segments and the vector group is retained. If, however, the result of the division is greater than 0.01, then it is determined that it is a zig-zag line segment and the vector group is rejected.

Figure 64:
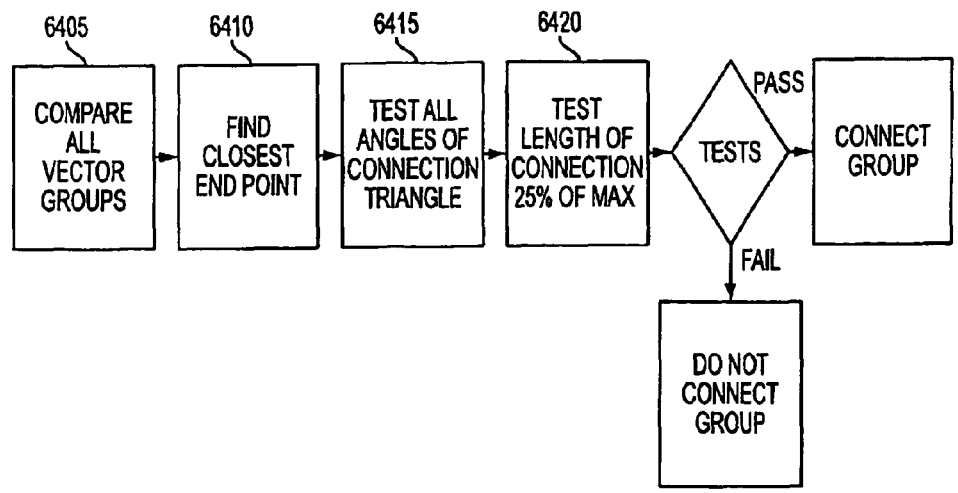
FIG. 64 illustrates vector group connection processing in accordance with exemplary embodiments of the present invention.
Figure 65:
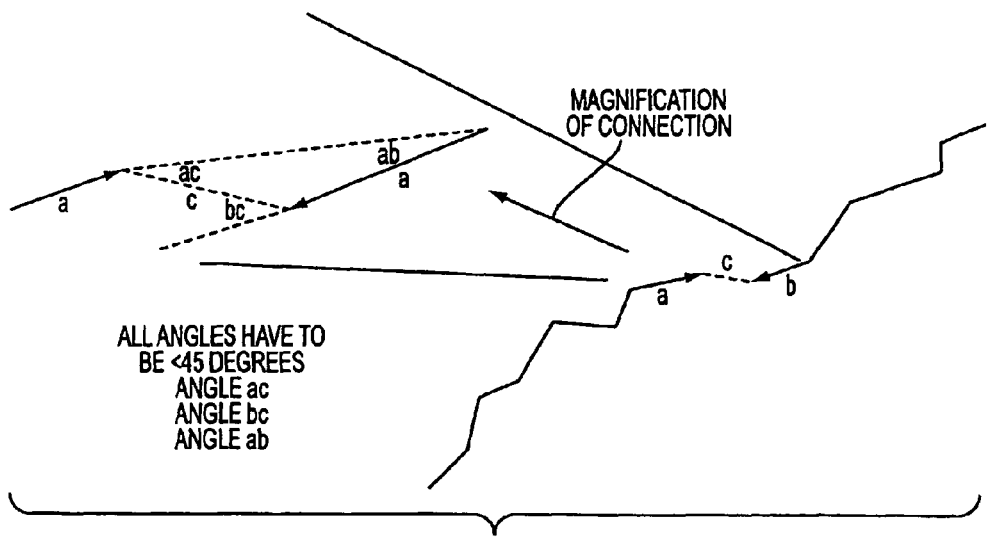
FIG. 65 illustrates the connection of vector groups in accordance with exemplary embodiments of the present invention.

Returning again to FIG. 57, the lines which have passed the zig-zag clutter rejection processing step 5730 are provided to vector group connection processing step 5735. FIG. 64 illustrates, in more detail, the processing performed in step 5735. FIG. 65 illustrates the connection of vector groups in accordance with exemplary embodiments of the present invention. At this point in the processing, vectors have been combined based on their orientation and location, all paths have been connected, large clutter groups have been removed and zig-zag groups have been eliminated. The remaining linear structures are long groups of linear structures. Accordingly, any breaks in these linear structures should be connected based on distance and line orientation. Breaks are usually caused by obstruction from clouds, terrain masking, or possibly roads or trails that have low contrast relative to the background. Accordingly, all vector groups are compared and the closest end point is determined in processing steps 6405 and 6410. Next, in processing step 6415, all angles of the connection triangle are tested to determine if they are all less than 45°. Next it is determined whether the length of the connection between the vector groups is less than 25% of the maximum length of the two vectors in processing step 6420. If the result of the tests in step 6415 and 6420 are successful then the vector groups are connected. If, however, one of the tests in steps 6415 and 6420 are not successful, then the vector groups are not connected.

Returning again to FIG. 57, after the vector group connection processing step 5735, a second path analysis and a second zig-zag clutter rejection processing step are performed in processing steps 5740 and 5745. The processing steps 5740 and 5745 are performed since clutter regions may be created in the vector group connection processing step 5735. In the processing steps 5740 and 5745, these are performed similar to the first path analysis processing step 5725 and the first zig-zag clutter rejection processing step 5730, however, the thresholds are twice the original values employed in the first processing steps. All lines or paths that make it through this process are labeled an output from the contextual line reasoning processing.

Scene Context Analysis

The present invention employs cultural paradigms to reduce false detections. Most of the detection processes described above employ local image operations to identify manmade activity. These detections are labeled with a confidence or strength measure that is expressed numerically. The confidences can vary from weak or low confidence to strong or high confidence. The scene context analysis is performed to test the plausibility or existence of the weak confidence manmade activity detections. This process improves the detections or classification performance without increasing the false selection or nominations. The scene context analysis is preferably employed in an expert system employing rules which specify the organization or structure of the plausible manmade activity relationship.

Figure 66:
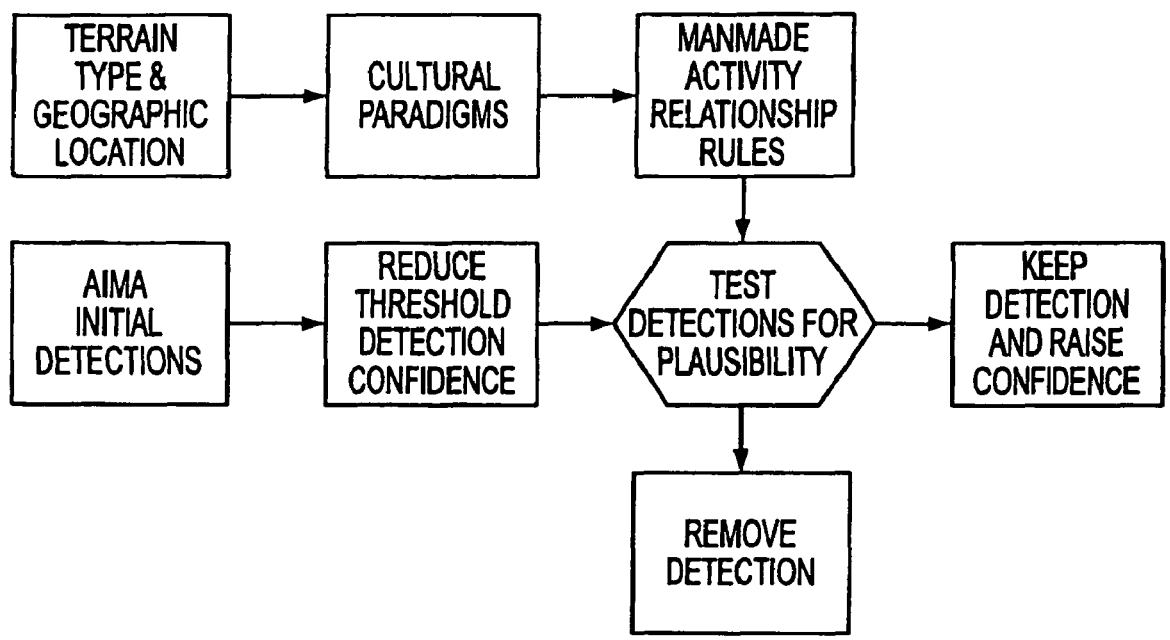
FIG. 66 illustrates processing performed foreseen context analysis in accordance with exemplary embodiments of the present invention.

FIG. 66 illustrates the processing performed in the scene context analysis. The terrain type and geographical location are employed in the selection of the cultural paradigms for the scene context analysis. These cultural paradigms determine the specific manmade activity rules employed. Each of the detection processes described above employ a set of criteria or thresholds that determine if the detected target is of a particular class type or is a clutter object. In the scene context analysis these final thresholds or criteria are removed or reduced, thereby providing more detections into the scene context analysis process. Using the determined relationship rules the various detections are tested for plausibility. If, based on the relationship rules, the detection is identified as plausible, the detection is kept and the confidence value associated therewith is raised. If, however, it is determined based on the relationship rules that the detection is not plausible, the detection is removed from any further processing.

It will be recognized that various relationship rules can be devised based upon various cultural paradigms. For example, a low confidence building can be retained if it is a specific distance from a detected road or trail. The particular geographic location and terrain type determine the maximum distance criteria. Distances measured as the shortest perpendicular from the building to a road or trail. If there are more than one road or trail running near this candidate building, the shortest distance road or trail is the one considered for this rule. Low confidence buildings may also be retained if they are a specific distance from a high confidence building. Again, this relationship is dependent on the geographical location and the terrain type. Typically, small buildings are missed in the detection processing because thresholds are set high to reduce the number of false nominations. Once a high confidence building is detected, it is possible that there are other buildings in the area. Using this distance criteria assists in identifying additional buildings in the area without significantly increasing the false nominations.

Although specific relationship rules have been discussed in connection with the scene context analysis, one skilled in the art will recognize that rules other than those specifically discussed above can be implemented. The selection of these rules is based on cultural paradigms for the specific portion of the world captured in the processed image. Employing cultural paradigms based on which portion of the world is captured in the image can reduce false identification of objects by accounting for how local cultures may layout manmade objects. For example, in some parts of the world, buildings will always be located near roads, whereas in other parts of the world buildings may not be located proximate to roads.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for identifying linear objects in an image comprising:
   identifying, in a processor of a computer processing device, terrain types in the image;
   generating, in the processor, a gradient vector image from the image, the gradient vector image identifying a gradient magnitude value and a gradient direction value for each pixel of the image;
   identifying, in the processor, lines in the gradient vector image using the identified terrain types in each portion of the image;
   determining, in the processor, whether the identified lines are perpendicular, collinear, or parallel to another line among the identified lines in the gradient vector image;
   eliminating, in the processor, lines among the identified lines which are determined to not be perpendicular, collinear, or parallel to another line among the identified lines in the gradient vector image; and
   identifying, in the processor, linear objects using the remaining identified lines which have not been eliminated.

2. The method of claim 1, wherein the step of identifying lines using the identified terrain types comprises:
   applying the identified terrain types to the gradient vector image;
   determining a threshold based on mean gradient magnitudes for each individual identified terrain type; and
   eliminating pixels in the gradient vector image having a gradient magnitude not greater than the threshold for the identified terrain type associated with the eliminated pixels.

3. The method of claim 2, wherein the step of identifying lines further comprises:
   comparing each remaining pixel that has not been eliminated in the gradient vector image to neighboring pixels; and
   eliminating a remaining pixel if the gradient magnitude value of the remaining pixel is less than the gradient magnitude value of one of the neighboring pixels.

4. The method of claim 3, wherein a pixel is determined to be a neighboring pixel based on the gradient direction value of the remaining pixel.

5. The method of claim 3, further comprising:
   grouping pixels in a line with the same gradient direction value into a region, wherein the grouping accounts for errors in a respectively corresponding gradient direction value of the grouped pixels.

6. The method of claim 5, further comprising:
   dividing the region into a plurality of subregions if the region is greater than a predetermined number of pixels; and
   determining a straight line approximation for at least one of the subregions, wherein the straight line approximation is based on a calculated slope and center of mass for the at least one of the subregions.

7. The method of claim 6, further comprising:
   determining a slope, endpoints, Y-intercept, and length of each of the identified lines or straight line approximations; and
   storing the slope, endpoints, Y-intercept, and length of each of the identified lines or straight line approximations.

8. The method of claim 7, wherein the determination of whether identified lines are collinear or parallel to another line among the identified lines in the gradient vector image comprises:
   comparing each identified line or determined straight line approximation to every other identified line or determined straight line approximation with a similar stored slope to determine (i) whether the identified line or determined straight line approximation is a predetermined distance from other identified lines or straight line approximation with a similar stored slope, (ii) whether the identified line or determined straight line approximation is antiparallel to the other identified lines or determined straight line approximations with a similar stored slope, and (iii) whether the identified line or determined straight line approximation and the other identified lines or determined straight line approximations with a similar stored slope possess gradient magnitudes within a predetermined tolerance.

9. The method of claim 8, wherein the determination of whether identified lines are parallel to another line among the identified lines in the gradient vector image comprises:
   determining whether each identified line or determined straight line approximation is within the same terrain type as the other identified line or determined straight line approximation, wherein if the lines are not within the same terrain type, the lines are determined not to be parallel.

10. The method of claim 1, further comprising:
    grouping identified lines determined to be parallel into a parallel line group; and
    dividing identified lines in each parallel line group into parallel line pairs based on a respective length of the lines.

11. The method of claim 10, wherein the linear objects are identified using the parallel line pairs.

12. A non-transitory computer-readable recording medium having a computer program recorded thereon that causes a computer to automatically identify linear objects in an image, the program causing the computer to perform operations comprising:
    identifying terrain types in the image;
    generating a gradient vector image from the image, the gradient vector image identifying a gradient magnitude value and a gradient direction value for each pixel of the image;
    identifying lines in the gradient vector image using the identified terrain types in each portion of the image;
    determining whether the identified lines are perpendicular, collinear, or parallel to another line among the identified lines in the gradient vector image;
    eliminating lines among the identified lines which are determined to not be perpendicular, collinear, or parallel to another line among the identified lines in the gradient vector image; and
    identifying linear objects using the remaining identified lines which have not been eliminated.

13. The non-transitory computer-readable recording medium of claim 12, wherein the wherein the operation of identifying lines using the identified terrain types comprises:
    applying the identified terrain types to the gradient vector image;
    determining a threshold based on mean gradient magnitudes for each individual identified terrain type; and
    eliminating pixels in the gradient vector image having a gradient magnitude not greater than the threshold for the identified terrain type associated with the eliminated pixels.

14. An apparatus for identifying linear objects in an image, comprising:
    a memory configured to store the image; and
    a processor configured to:
        identify terrain types in the image;
        generate a gradient vector image from the image, the gradient vector image identifying a gradient magnitude value and a gradient direction value for each pixel of the image;
        identify lines in the gradient vector image using the identified terrain types in each portion of the image;
        determine whether the identified lines are perpendicular, collinear, or parallel to another line among the identified lines in the gradient vector image;
        eliminate lines among the identified lines which are determined to not be perpendicular, collinear, or parallel to another line among the identified lines in the gradient vector image; and
        identify linear objects using the remaining identified lines which have not been eliminated.

15. The apparatus of claim 14, wherein the processor in identifying the lines using the identified terrain types is configured to:
    apply the identified terrain types to the gradient vector image;
    determine a threshold based on mean gradient magnitudes for each individual identified terrain type; and
    eliminate pixels in the gradient vector image having a gradient magnitude not greater than the threshold for the identified terrain type associated with the eliminated pixels.

* * * * *